(12) United States Patent
Lee et al.

(10) Patent No.: US 12,355,992 B2
(45) Date of Patent: Jul. 8, 2025

(54) METHOD AND APPARATUS FOR ARTIFICIAL INTELLIGENCE DOWNSCALING AND UPSCALING DURING VIDEO CONFERENCE

(71) Applicant: SAMSUNG ELECTRONICS CO., LTD., Suwon-si (KR)

(72) Inventors: Chaeeun Lee, Suwon-si (KR); Jaehwan Kim, Suwon-si (KR); Youngo Park, Suwon-si (KR); Jongseok Lee, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 17/895,561

(22) Filed: Aug. 25, 2022

(65) Prior Publication Data

US 2023/0085530 A1 Mar. 16, 2023

Related U.S. Application Data

(63) Continuation of application No. PCT/KR2022/012646, filed on Aug. 24, 2022.

(30) Foreign Application Priority Data

Aug. 25, 2021 (KR) .................. 10-2021-0112653

(51) Int. Cl.
*H04N 19/30* (2014.01)
*H04N 19/136* (2014.01)
(Continued)

(52) U.S. Cl.
CPC .......... *H04N 19/30* (2014.11); *H04N 19/136* (2014.11); *H04N 19/164* (2014.11); *H04N 19/436* (2014.11)

(58) Field of Classification Search
CPC .... H04N 19/30; H04N 19/136; H04N 19/164; H04N 19/436
(Continued)

(56) References Cited

U.S. PATENT DOCUMENTS 10,817,990 B1\* 10/2020 Yang ..................... G06T 3/4053
10,825,139 B2 11/2020 Kim et al.
(Continued)

FOREIGN PATENT DOCUMENTS

JP 2001-313938 A 11/2001
JP 2020-53741 A 4/2020
(Continued)

OTHER PUBLICATIONS

Jiang, Feng, et al. "An end-to-end compression framework based on convolutional neural networks." (Year: 2017).*
(Continued)

*Primary Examiner* — Binh Kien Tieu
(74) *Attorney, Agent, or Firm* — Sughrue Mion, PLLC

(57) ABSTRACT

Provided is an electronic device configured to participate in video conference by using artificial intelligence (AI), the electronic device including a display and a processor configured to execute one or more instructions. The processor configured to obtain, from a server, image data generated by first encoding first image related to another electronic device participating in video conference, and AI data related to AI downscaling from original image to first image, obtain second image corresponding to first image by performing first decoding on image data, determine whether to perform AI upscaling on second image, based on importance of the other electronic device, based on determining to perform AI upscaling, obtain third image by performing AI upscaling on second image through an upscaling deep neural network and
(Continued)

provide third image to display, and based on determining not to perform AI upscaling, provide second image to display.

13 Claims, 24 Drawing Sheets

(51) Int. Cl.
 *H04N 19/164* (2014.01)
 *H04N 19/436* (2014.01)
(58) Field of Classification Search
 USPC ....................................................... 348/14.13
 See application file for complete search history.

(56) References Cited

U.S. PATENT DOCUMENTS

| | | | |
|---|---|---|---|
| 10,825,205 | B2 | 11/2020 | Kim et al. |
| 11,200,702 | B2 | 12/2021 | Dinh et al. |
| 11,349,893 | B1* | 5/2022 | Viswanathan ........ H04L 65/756 |
| 11,893,067 | B1* | 2/2024 | Solh .................... G06F 16/9535 |
| 12,069,121 | B1* | 8/2024 | Garcia .................... H04L 65/75 |
| 2015/0009276 | A1 | 1/2015 | Maxwell |
| 2016/0275354 | A1 | 9/2016 | Andalo et al. |
| 2018/0070054 | A1 | 3/2018 | Miyamoto |
| 2019/0373293 | A1 | 12/2019 | Bortman et al. |
| 2020/0099889 | A1 | 3/2020 | Sugihara |
| 2020/0267349 | A1 | 8/2020 | Garrido et al. |
| 2021/0056666 | A1 | 2/2021 | Park et al. |
| 2021/0166343 | A1 | 6/2021 | Kim et al. |
| 2021/0174552 | A1 | 6/2021 | Lee et al. |
| 2021/0211739 | A1* | 7/2021 | Andreopoulos ..... H04N 19/154 |
| 2021/0390662 | A1 | 12/2021 | Kim et al. |
| 2022/0138904 | A1 | 5/2022 | Kim et al. |
| 2022/0229626 | A1* | 7/2022 | Lysdal ................ H04L 12/1827 |
| 2024/0089136 | A1* | 3/2024 | Tandra ................ H04L 12/1831 |
| 2024/0098123 | A1* | 3/2024 | Gan ...................... H04L 65/403 |

FOREIGN PATENT DOCUMENTS

| | | |
|---|---|---|
| KR | 10-2018-0082672 A | 7/2018 |
| KR | 10-2020-0044662 A | 4/2020 |
| KR | 10-2020-0044666 A | 4/2020 |
| KR | 10-2020-0044667 A | 4/2020 |
| KR | 10-2020-0140368 A | 12/2020 |
| KR | 10-2021-0050186 A | 5/2021 |
| KR | 10-2021-0154700 A | 12/2021 |
| WO | 2016/151974 A1 | 9/2016 |
| WO | 2020/080873 A1 | 4/2020 |

OTHER PUBLICATIONS

International Search Report (PCT/ISA/220 and PCT/ISA/210) and Written Opinion (PCT/ISA/237) dated Nov. 28, 2022 by the International Searching Authority in International Application No. PCT/KR2022/012646.

Extended European Search Report dated May 17, 2024, issued by the European Patent Office in European Application No. 22861712.2.

* cited by examiner

FIG. 5

| IMAGE-RELATED INFORMATION | DNN SETTING INFORMATION |
|---|---|
| SD, 10Mbps, AV1 | DNN SETTING INFORMATION A |
| HD, 15Mbps, H.264 | DNN SETTING INFORMATION B |
| Full HD, 20Mbps, HEVC | DNN SETTING INFORMATION C |
| Full HD, 15Mbps, HEVC | DNN SETTING INFORMATION D |

METHOD AND APPARATUS FOR ARTIFICIAL INTELLIGENCE DOWNSCALING AND UPSCALING DURING VIDEO CONFERENCE

CROSS-REFERENCE TO RELATED APPLICATIONS

This application is a Continuation Application of International Application PCT/KR2022/012646 filed on Aug. 24, 2022, which claims benefit of Korean Patent Application No. 10-2021-0112653 filed on Aug. 25, 2021, at the Korean Intellectual Property Office, the disclosures of which are incorporated herein in their entireties by reference.

FIELD

The disclosure relates to a method and apparatus for processing an image during a video conference, and more particularly, to a method and apparatus for artificial intelligence (AI) image downscaling and upscaling during a video conference.

BACKGROUND

Images are encoded by a codec according to a designated data compression standard, e.g., a moving picture expert group (MPEG) compression standard, and are then stored on a recording medium or are transmitted via a communication channel in the form of bit streams.

As hardware capable of video conferencing has been developed and supplied, a need for a codec capable of effectively encoding and decoding images during a video conference is increasing.

SUMMARY

A result of down-scaling an image during a video conference by using artificial intelligence (AI) is transmitted, and a downscaled image is adaptively up-scaled by using AI according to the importance or priority of the video conference image transmitted.

According to an embodiment of the disclosure, an electronic device participating in a video conference by using artificial intelligence (AI) includes a display and a processor configured to execute one or more instructions stored in the electronic device. The processor is configured to execute the one or more instructions to obtain, from a server, image data generated as a result of first encoding on a first image related to another electronic device participating in the video conference, and AI data related to AI downscaling from an original image to the first image, obtain a second image corresponding to the first image by performing first decoding on the image data, determine whether to perform AI upscaling on the second image, based on importance of the other electronic device, when it is determined to perform AI upscaling, obtain a third image by performing AI upscaling on the second image through an upscaling deep neural network (DNN) and provide the third image to a display, and, when it is determined not to perform AI upscaling, provide the second image to the display.

According to an embodiment of the disclosure, a server managing a video conference by using AI includes a processor configured to execute one or more instructions stored in the server, wherein the processor is configured to execute the one or more instructions to obtain, from a first electronic device participating in the video conference, first image data generated as a result of first encoding on a first image, and AI data related to AI downscaling from an original image to the first image, obtain a second image corresponding to the first image by performing first decoding on the first image data, when importance of the first electronic device indicates that a user of the first electronic device is a listener, transmit, to the second electronic device, second image data obtained by performing first encoding on the second image, and when the importance of the first electronic device indicates that the user of the first electronic device is a presenter, obtain a third image by performing AI upscaling on the second image through an upscaling DNN, and transmit, to a second electronic device, third image data obtained by performing first encoding on the third image.

According to an embodiment of the disclosure, a video conference image processing method performed by an electronic device participating in a video conference by using AI includes obtaining, from a server, image data generated as a result of first encoding on a first image related to another electronic device participating in the video conference, and AI data related to AI downscaling from an original image to the first image, obtaining a second image corresponding to the first image by performing first decoding on the image data, determining whether to perform AI upscaling on the second image, based on importance of the other electronic device, when it is determined to perform the AI upscaling, performing AI upscaling on the second image through an upscaling DNN to obtain a third image, and providing the third image to a display, and, when it is determined not to perform AI upscaling, providing the second image to the display.

According to an embodiment of the disclosure, a video conference image processing method performed by a server managing a video conference by using AI includes obtaining, from a first electronic device participating in the video conference, first image data generated as a result of first encoding on a first image, and AI data related to AI downscaling from an original image to the first image, obtaining a second image corresponding to the first image by performing first decoding on the first image data, when importance of the first electronic device indicates that a user of the first electronic device is a listener, transmitting, to a second electronic device, second image data obtained by performing first encoding on the second image, and, when the importance of the first electronic device indicates that the user of the first electronic device is a presenter, obtaining a third image by performing AI upscaling on the second image through an upscaling DNN, and transmitting, to the second electronic device, third image data obtained by performing first encoding on the third image.

By applying AI upscaling or AI downscaling to a video conference image, based on whether AI upscaling or AI downscaling of a video conference participant's electronic device and a video conference server can be performed during video conference, a user's data usage may be reduced while a high-definition video conference image is being maintained, unlike a conventional art in which a large number of users send and receive an image at a fixed bitrate and with a fixed resolution.

BRIEF DESCRIPTION OF DRAWINGS

A brief description of each drawing is provided for better understanding of the drawings cited herein.

FIG. 5 is a table showing a mapping relationship between several pieces of image-related information and several pieces of DNN setting information.

DETAILED DESCRIPTION

Figure 1:
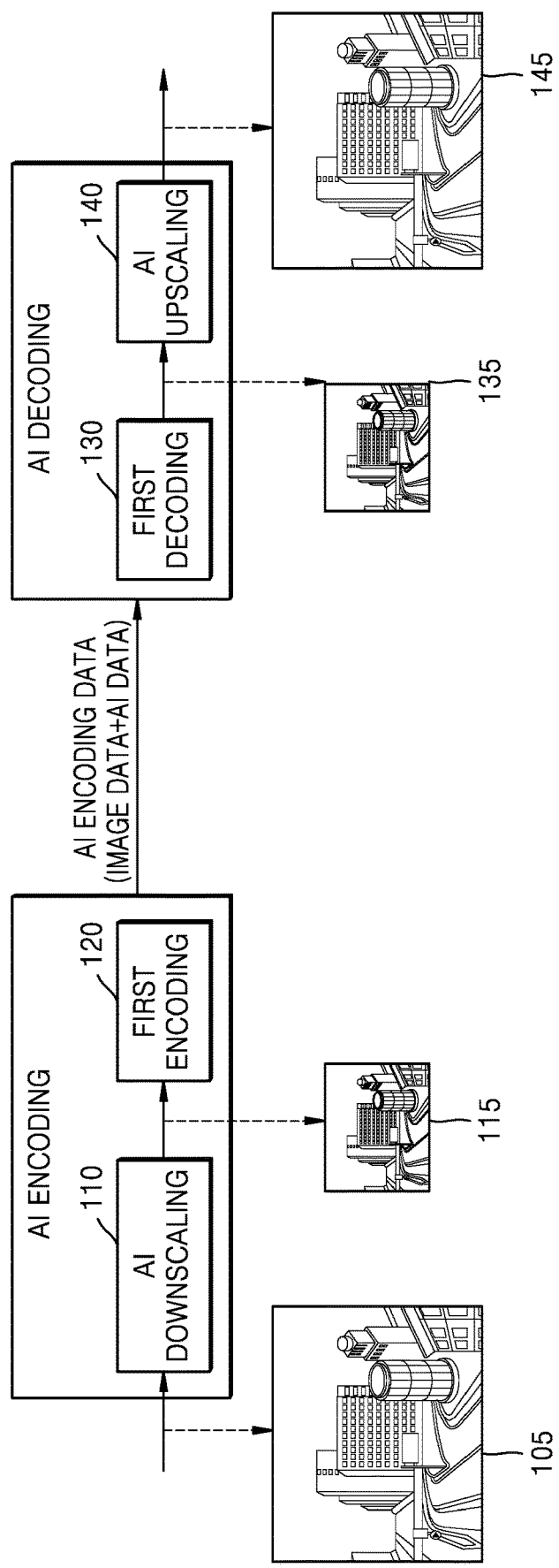
FIG. 1 is a diagram for describing an artificial intelligence (AI) encoding process and an AI decoding process, according to an embodiment.

Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' or a 'picture' may indicate a still image, a moving picture composed of a plurality of continuous still images (or frames), or a video.

A 'deep neural network (DNN)' is a representative example of an artificial neural network model simulating a brain nerve, and is not limited to an artificial neural network model using a specific algorithm.

A 'parameter', which is a value used in a computation process of each layer constituting a neural network, may include a weight used when an input value is applied to a certain operation expression. Here, the parameter may be expressed in a matrix form. The parameter, which is a value set as a result of training, may be updated through separate training data according to need.

A 'first DNN' indicates a DNN used for artificial intelligence (AI) down-scaling an image, and a 'second DNN' indicates a DNN used for AI up-scaling an image.

'DNN setting information' includes information related to an element constituting a DNN. The first DNN or the second DNN may be set by using the DNN setting information.

An 'original image' denotes an image to be an object of AI encoding, and a 'first image' denotes an image obtained as a result of performing AI down-scaling on the original image during an AI encoding process. A 'second image' denotes an image obtained via first decoding during an AI decoding process, and a 'third image' denotes an image obtained by AI up-scaling the second image during the AI decoding process.

'AI down-scaling' denotes a process of decreasing resolution of an image based on AI, and 'first encoding' denotes an encoding process according to an image compression method based on frequency transformation. 'first decoding' denotes a decoding process according to an image reconstruction method based on frequency transformation, and 'AI up-scaling' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding 120 and the first decoding 130 are performed on the original image 105.

In particular, in FIG. 1, the first image 115 is obtained by performing the AI down-scaling 110 on the original image 105 and the first encoding 120 is performed on the first image 115, during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution and/or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding, and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 needs to be performed on the second image 135 according to the up-scaling target verified based on the AI data.

The AI for the AI down-scaling 110 and the AI for the AI up-scaling 140 may be embodied as a DNN. As will be described later with reference to FIG. 11, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target image quality and/or resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among the image compression methods using frequency transformation, such as MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or image quality, based on the AI data.

The AI data may be transmitted together with the image data in a form of a bitstream. Alternatively, according to an embodiment, the AI data may be transmitted separately from the image data, in a form of a frame or a packet.

Alternatively, according to an embodiment, the AI data may be transmitted by being included in the image data.

The AI data and the image data may be transmitted through the same network or through different networks.

Figure 2:
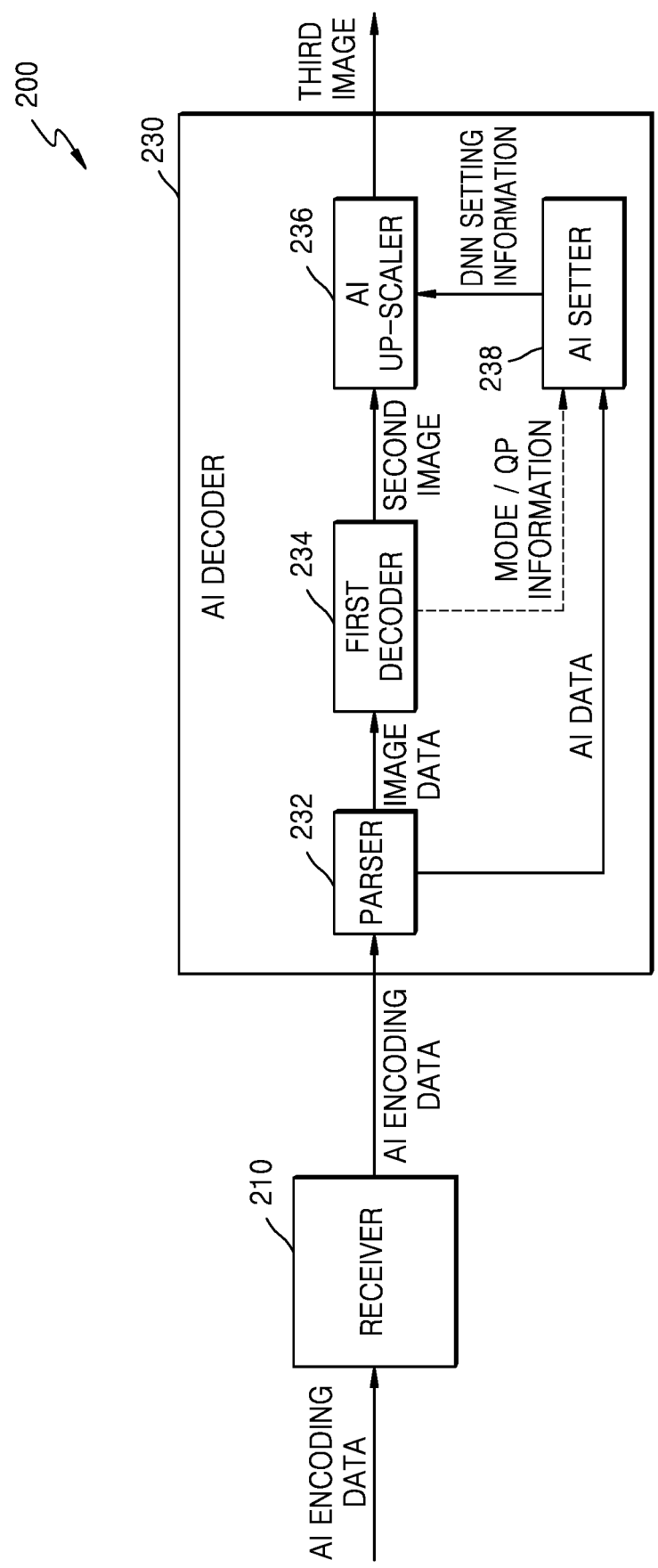
FIG. 2 is a block diagram of a structure of an AI decoding apparatus according to an embodiment.

FIG. 2 is a block diagram of a structure of an AI decoding apparatus 200 according to an embodiment.

Referring to FIG. 2, the AI decoding apparatus 200 includes a receiver 210 and an AI decoder 230. The AI decoder 230 may include a parser 232, a first decoder 234, an AI up-scaler 236, and an AI setter 238.

Although the receiver 210 and the AI decoder 230 are illustrated as separate devices in FIG. 2, the receiver 210 and the AI decoder 230 may be implemented through one processor. In this case, the receiver 210 and the AI decoder 230 may be implemented as a dedicated processor, or may be implemented through a combination of software and a general-purpose processor such as an application processor (AP), a central processing unit (CPU), or a graphic processing unit (GPU). The dedicated processor may include a memory for implementing an embodiment of the disclosure or a memory processing unit for using an external memory.

The receiver 210 and the AI decoder 230 may be configured by a plurality of processors. In this case, the receiver 210 and the AI decoder 230 may be implemented as a combination of dedicated processors, or may be implemented through a combination of software and a plurality of general-purpose processors such as an AP, a CPU, or a GPU. According to an embodiment, the receiver 210 may be implemented as a first processor, the first decoder 234 may be implemented as a second processor different from the first processor, and the parser 232, the AI up-scaler 236, and the AI setter 238 may be implemented as a third processor different from the first processor and the second processor.

The receiver 210 receives the AI encoding data obtained as a result of the AI encoding. For example, the AI encoding data may be a video file having a file format such as mp4 or mov.

The receiver 210 may receive the AI encoding data transmitted through a network. The receiver 210 outputs the AI encoding data to the AI decoder 230.

According to an embodiment, the AI encoding data may be data obtained from a data storage medium including a magnetic medium (such as a hard disk, a floppy disk, or a magnetic tape), an optical recording medium (such as CD-ROM or DVD), or a magneto-optical medium (such as a floptical disk).

The parser 232 parses the AI encoding data, and transmits the image data generated as a result of the first encoding of the first image 115 to the first decoder 234 and transmits the AI data to the AI setter 238.

According to an embodiment, the parser 232 may parse the image data and the AI data separately included in the AI encoding data. The parser 232 may distinguish the image data and the AI data included in the AI encoding data, by reading a header within the AI encoding data. For example, the AI data may be included in a Vendor Specific InfoFrame (VSIF) in an HDMI stream.

The structure of the AI encoding data including the AI data and the image data separated from each other will be described later with reference to FIG. 9.

According to another embodiment, the parser 232 may parse the image data from the AI encoding data, extract the AI data from the image data, transmit the AI data to the AI setter 238, and transmit the remaining image data to the first decoder 234. In other words, the AI data may be included in the image data. For example, the AI data may be included in supplemental enhancement information (SEI), which is an additional information area of a bitstream corresponding to the image data. The structure of the AI encoding data including the image data including the AI data will be described later with reference to FIG. 10.

According to another embodiment, the parser 232 may split the bitstream corresponding to the image data into a bitstream to be processed by the first decoder 234 and a bitstream corresponding to the AI data, and may output the two bitstreams to the first decoder 234 and the AI setter 238, respectively.

The parser 232 may verify that the image data included in the AI encoding data is image data obtained via a certain codec (for example, MPEG-2, H.264 AVC, MPEG-4, HEVC, VC-1, VP8, VP9, or AV1). In this case, corresponding information may be transmitted to the first decoder 234 such that the image data is processed via the verified codec.

The first decoder 234 reconstructs the second image 135 corresponding to the first image 115, based on the image data received from the parser 232. The second image 135 obtained by the first decoder 234 is provided to the AI up-scaler 236.

According to an embodiment, first decoding related information, such as prediction mode information, motion information, quantization parameter information, or the like, may be provided by the first decoder 234 to the AI setter 238. The first decoding related information may be used to obtain DNN setting information.

The AI data provided to the AI setter 238 includes pieces of information enabling the second image 135 to be processed via AI up-scaling. Here, an up-scaling target of the second image 135 should correspond to a down-scaling target of a first DNN. Accordingly, the AI data needs to include information for verifying the down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of resolution of the first image 115, a bitrate of the image data obtained as the result of performing first encoding on the first image 115, or a codec type used during the first encoding of the first image 115.

The AI setter 238 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 236 performs AI up-scaling on the second image 135 through a second DNN to obtain the third image 145 corresponding to the up-scaling target.

Before describing a method, performed by the AI setter 238, of determining the up-scaling target, an AI up-scaling process through the second DNN will be described with reference to FIGS. 3 and 4.

Figure 3:
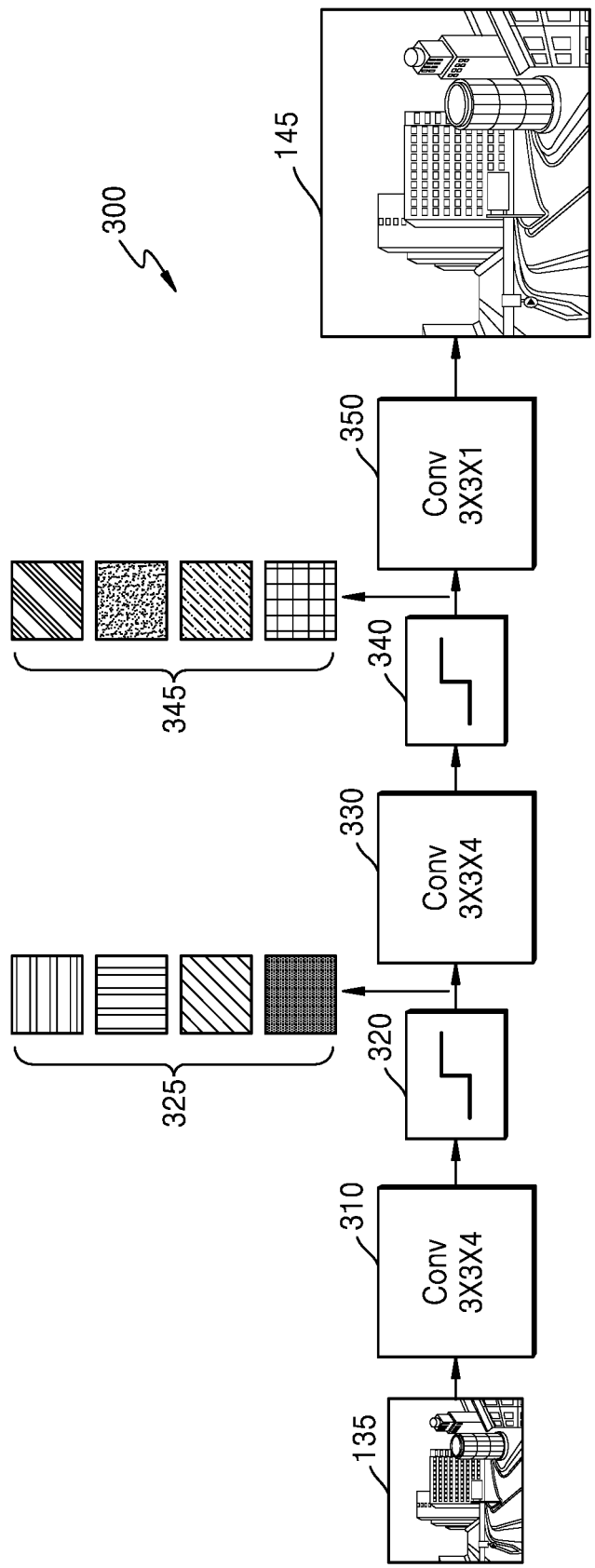
FIG. 3 is a diagram illustrating a second deep neural network (DNN) for AI upscaling of a second image.
Figure 4:
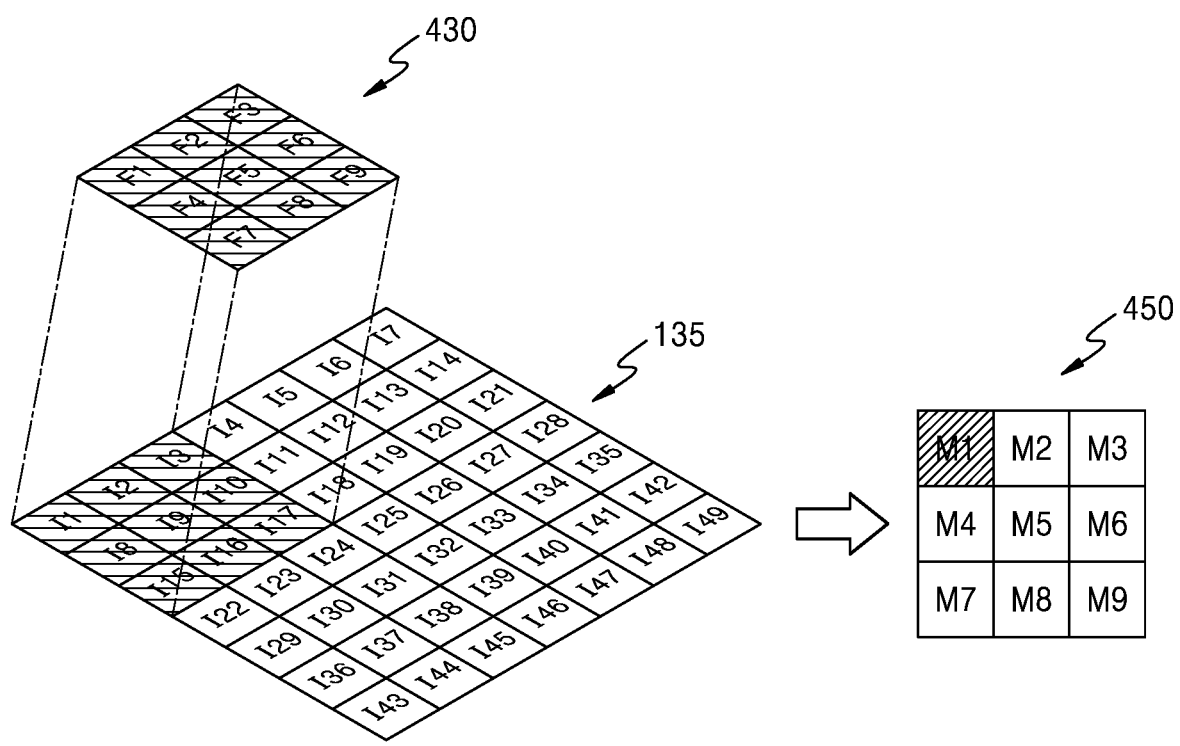
FIG. 4 is a view for explaining a convolution operation carried out by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 displayed on the first convolution layer 310 of FIG. 3 illustrates that a convolution process is performed on one image by using four filter kernels each having a 3×3 size. Four feature maps are generated by the four filter kernels as a result of the convention process. Each feature map represents unique characteristics of the second image 135. For example, each feature map may represent the vertical direction characteristics, the horizontal direction characteristics, or the edge characteristics of the second image 135.

A convolution operation in the first convolution layer 310 will be described below in detail with reference to FIG. 4.

A single feature map 450 may be generated through a multiplication operation and an addition operation between parameters of a filter kernel 430 having a size of 3×3 used in the first convolution layer 310 and pixel values in the second image 135 corresponding to the parameters. Because the four filter kernels are used in the first convolution layer 310, the four feature maps may be generated through a convolution operation process using the four filter kernels.

In FIG. 4, I1 through I49 displayed on the second image 135 represent the pixels of the second image 135, and F1 through F9 displayed on the filter kernel 430 represent the parameters of the filter kernel 430. M1 through M9 displayed on the feature map 450 represent the samples of the feature map 450.

FIG. 4 illustrates inclusion of 49 pixels in the second image 135, but this is merely an example. When the second image 135 has a resolution of 4K, the second image 135 may include 3840×2160 pixels, for example.

In a convolution operation process, a multiplication operation between each of the pixel values of I1, I2, I3, I8, I9, I10, I15, I16, and I17 of the second image 135 and each of F1, F2, F3, F4, F5, F6, F7, F8 and F9 of the filter kernel 430 may be performed, and a value of a combination of result values of the multiplication operations (for example, an addition operation) may be allocated as the value of M1 of the feature map 450. When the stride of a convolution operation is 2, a multiplication operation between each of the pixel values of I3, I4, I5, I10, I11, I12, I17, I18, and I19 of the second image 135 and each of F1, F2, F3, F4, F5, F6, F7, F8 and F9 of the filter kernel 430 may be performed, and a value of a combination of result values of the multiplication operations may be allocated as the value of M2 of the feature map 450.

While the filter kernel 430 is moving according to the stride until reaching the last pixel of the second image 135, a convolution operation between the pixel values within the second image 135 and the parameters of the filter kernel 430 may be performed, and thus the feature map 450 having a certain size may be obtained.

According to the disclosure, values of the parameters of the first DNN, for example, the parameters of a filter kernel used in the convolution layers of the second DNN (e.g., F1, F2, F3, F4, F5, F6, F7, F8 and F9 of the filter kernel 430), may be optimized through joint training of the first and second DNNs. The AI setter 238 may determine an up-scaling target corresponding to a down-scaling target of the first DNN, based on AI data, and determine parameters corresponding to the determined up-scaling target as the parameters of the filter kernel used in the convolution layers of the second DNN.

The convolution layers included in the first and second DNNs may be processed according to the convolution operation process described above with reference to FIG. 4, but the convolution operation process described above with reference to FIG. 4 is only an example. Embodiments are not limited thereto.

Referring back to FIG. 3, feature maps output by the first convolution layer 310 are input to a first activation layer 320.

The first activation layer 320 may impart non-linear characteristics to each of the feature maps. The first activation layer 320 may include, but is not limited to, a sigmoid function, a Tan h function, a Rectified Linear Unit (ReLU) function, and the like.

The first activation layer 320 imparting non-linear characteristics refers to changing and outputting some sample values of the feature maps output by the first convolution layer 310. This change is performed using the non-linear characteristics.

The first activation layer 320 determines whether to transmit the sample values of the feature maps output by the first convolution layer 310 to a second convolution layer 330. For example, some of the sample values of the feature maps are activated by the first activation layer 320 and transmitted to the second convolution layer 330, and some sample values are not activated by the first activation layer 320 and not transmitted to the second convolution layer 330. Unique characteristics of the second image 135 that are indicated by the feature maps are emphasized by the first activation layer 320.

Feature maps 325 output by the first activation layer 320 are input to a second activation layer 330. One of the feature maps 325 of FIG. 3 is a result obtained by processing the feature map 450 described above with reference to FIG. 4 in the first activation layer 320.

3×3×4 displayed on the second convolution layer 330 illustrates that a convolution process is performed on the input feature maps 325 by using four filter kernels each having a 3×3 size. An output of the second convolution layer 330 is input to a second activation layer 340. The second activation layer 340 may impart non-linear characteristics to input data.

Feature maps 345 output by the second activation layer 340 are input to a third convolution layer 350. 3×3×1 displayed on the third convolution layer 350 of FIG. 3 illustrates that a convolution process is performed to generate one output image by using one filter kernel having a size of 3×3. The third convolution layer 350, which is a layer for outputting a final image, generates one output by using one filter kernel. According to an embodiment of the disclosure, the third convolution layer 350 may output the third image 145 through a convolution operation.

There may be a plurality of pieces of DNN setting information indicating the numbers of filter kernels of the first, second, and third convolution layers 310, 330, and 350 of the second DNN 300, respective parameters of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

FIG. 3 illustrates the second DNN 300 including the three first, second, and third convolution layers 310, 330, and 350 and the two first and second activation layers 320 and 340, but this is merely an example. In some cases, the number of convolution layers and the number of activation layers may vary. In some cases, the second DNN 300 may be implemented as a recurrent neural network (RNN). This case refers to changing a CNN structure of the second DNN 300 according to an embodiment of the disclosure to an RNN structure.

According to an embodiment, the AI up-scaler 236 may include at least one arithmetic logic unit (ALU) for the above-described convolution operation and an operation of an activation layer. The ALU may be implemented as a processor. For the convolution operation, the ALU may include a multiplier that performs a multiplication operation between the sample values of the second image 135 or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tan h function, or ReLU function, and a comparator that compares a result of the multiplication with a predetermined value to determine whether to transmit an input sample value to the next layer.

A method, performed by the AI setter 238, of determining an up-scale target, and a method, performed by the AI up-scaler 236, of AI up-scaling the second image 135 according to the up-scaling target will now be described.

According to an embodiment, the AI setter 238 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 238 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include pieces of information for obtaining the third image 145 of resolution twice higher than resolution of the second image 135, for example, the third image 145 of 4 K (4096×2160) twice higher than 2 K (2048×1080) of the second image 135, and another piece of DNN setting information may include pieces of information for obtaining the third image 145 of resolution four times higher than the resolution of the second image 135, for example, the third image 145 of 8 K (8192×4320) four times higher than 2 K (2048×1080) of the second image 135.

Figure 7:
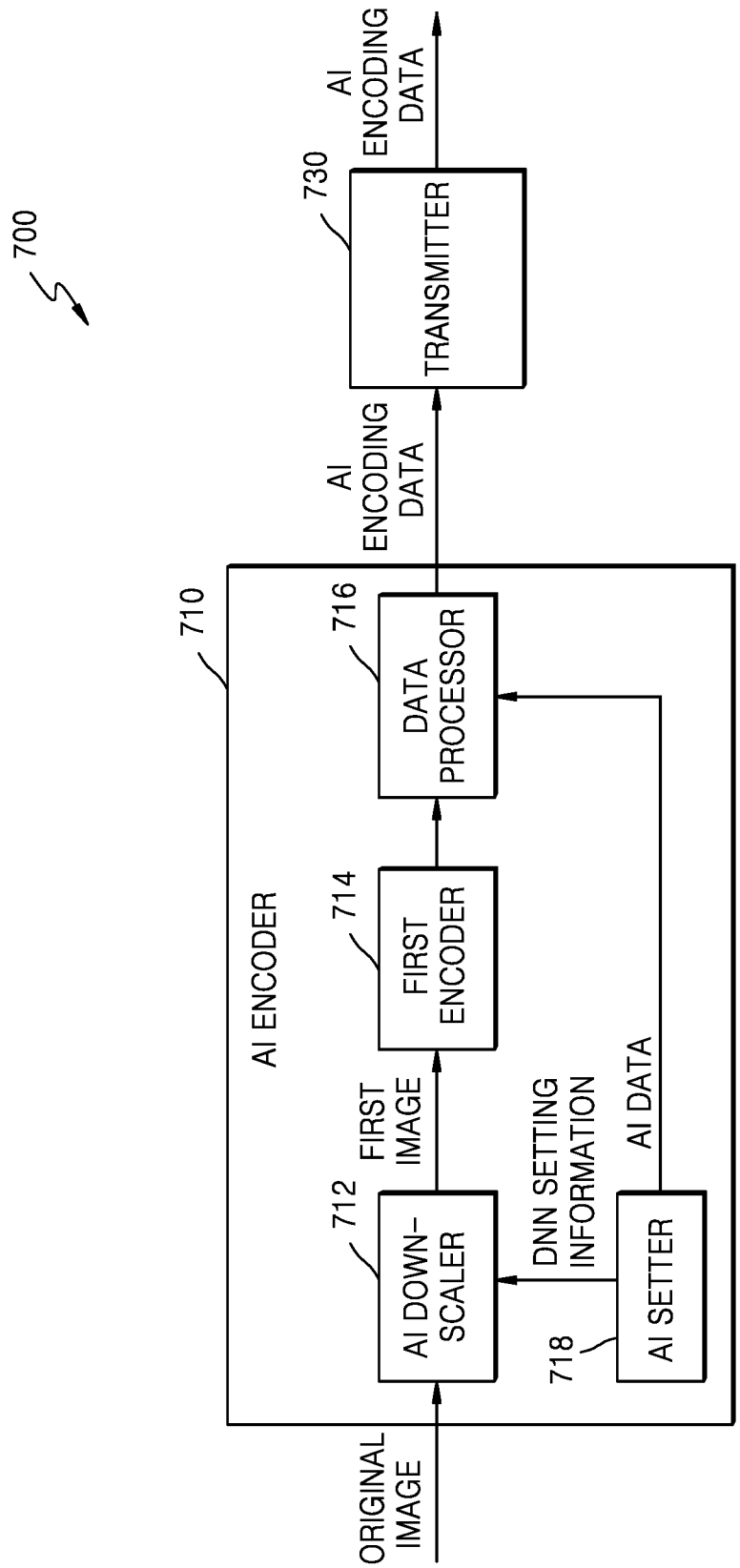
FIG. 7 is a block diagram of a structure of an AI encoding apparatus according to an embodiment.

Each of the plurality of pieces of DNN setting information is obtained jointly with DNN setting information of the first DNN of an AI encoding apparatus 600 of FIG. 7, and the AI setter 238 obtains one piece of DNN setting information among the plurality of pieces of DNN setting information according to an enlargement ratio corresponding to a reduction ratio of the DNN setting information of the first DNN. To this end, the AI setter 238 may verify information of the first DNN. In order for the AI setter 238 to verify the information of the first DNN, the AI decoding apparatus 200 according to an embodiment receives AI data including the information of the first DNN from the AI encoding apparatus 700.

In other words, the AI setter 238 may verify information targeted by DNN setting information of the first DNN used to obtain the first image 115 and obtain the DNN setting information of the second DNN trained jointly with the DNN setting information of the first DNN, by using pieces of information received from the AI encoding apparatus 700.

When DNN setting information for performing the AI up-scaling on the second image 135 is obtained from among the plurality of pieces of DNN setting information, the obtained DNN setting information may be transmitted to the AI up-scaler 236, and input data may be processed based on the second DNN operating according to the obtained DNN setting information.

For example, when any one piece of DNN setting information is obtained, the AI up-scaler 236 may set the number of filter kernels included in each of the first, second, and third convolution layers 310, 330, and 350 of the second DNN 300 of FIG. 3, and the respective parameters of the filter kernels to be values included in the obtained DNN setting information.

In detail, when parameters of a filter kernel of 3×3 used in any one convolution layer of the second DNN of FIG. 4 are {1, 1, 1, 1, 1, 1, 1, 1, 1} and there is a change in DNN setting information, the AI up-scaler 236 may replace the parameters of the filter kernel with {2, 2, 2, 2, 2, 2, 2, 2, 2}, which are parameters included in the changed DNN setting information.

The AI setter 238 may obtain the DNN setting information for AI up-scaling the second image 135 from among the plurality of pieces of DNN setting information, based on information included in the AI data, and the AI data used to obtain the DNN setting information will now be described.

According to an embodiment, the AI setter 238 may obtain the DNN setting information for AI up-scaling the second image 135 from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI setter 238 may obtain the DNN setting information for increasing the resolution of the second image 135 two times.

According to another embodiment, the AI setter 238 may obtain the DNN setting information for AI up-scaling the second image 135 from among the plurality of pieces of DNN setting information, based on information related to the first image 115 included in the AI data. The AI setter 238 may pre-determine a mapping relationship between pieces of image-related information and pieces of DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change in resolution. As shown in FIG. 5, DNN setting information may be selected considering resolution (such as standard definition (SD), high definition (HD), or full HD), a bitrate (such as 10 Mbps, 15 Mbps, or 20 Mbps), and codec information (such as AV1, H.264, or HEVC), individually or collectively. For such consideration of the resolution, the bitrate and the codec information, training in consideration of each element should be jointly performed with encoding and decoding processes during an AI training process (see FIG. 11).

Accordingly, when a plurality of pieces of DNN setting information are provided based on image-related information including a codec type, resolution of an image, and the like, as shown in FIG. 5, according to training, the DNN setting information for AI up-scaling the second image 135 may be obtained based on the information related to the first image 115 received during the AI decoding process.

In other words, the AI setter 238 is capable of using DNN setting information according to image-related information, by matching the image-related information at the left of the table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI setter 238 may obtain DNN setting information A among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed on the first image 115 via H.264 codec, the AI setter 238 may obtain DNN setting information B among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed on the first image 115 via HEVC codec, the AI setter 238 may obtain DNN setting information C among the plurality of pieces of DNN setting information, and when it is verified that the resolution of the first image 115 is full HD, the bitrate of the image data obtained as the result of performing the first encoding is 15 Mbps, and the first encoding is performed on the first image 115 via HEVC codec, the AI setter 238 may obtain DNN setting information D among the plurality of pieces of DNN setting information. One of the DNN setting information C and the DNN setting information D is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI setter 239 may obtain DNN setting information according to a bitrate of image data indicating the quality of the second image 135.

According to another embodiment, the AI setter 238 may obtain the DNN setting information for performing AI up-scaling on the second image 135 from among the plurality of pieces of DNN setting information by considering both information (prediction mode information, motion information, quantization parameter information, and the like) provided from the first decoder 234 and the information related to the first image 115 included in the AI data. For example, the AI setter 238 may receive quantization parameter information used during a first encoding process of the first image 115 from the first decoder 234, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 234 are/is considered together, compared to when only the AI data is used.

According to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI setter 238 may obtain the identifier of the DNN setting information included in the AI data and then obtain the DNN setting information corresponding to the identifier of the DNN setting information, and the AI up-scaler 236 may perform AI up-scaling on the second image 135 by using the DNN setting information corresponding to the identifier of the DNN setting information. For example, identifiers respectively indicating the plurality of pieces of DNN setting information settable in the first DNN and identifiers respectively indicating the plurality of pieces of DNN setting information settable in the second DNN may be previously designated. In this case, the same identifier may be designated for a pair of pieces of DNN setting information settable in each of the first DNN and the second DNN. The AI data may include an identifier of DNN setting information set in the first DNN for AI down-scaling of the original image 105. The AI setter 238 that receives the AI data may obtain the DNN setting information indicated by the identifier included in the AI data among the plurality of pieces of DNN setting information, and the AI up-scaler 236 may perform AI up-scaling on the second image 135 by using the DNN setting information indicated by the identifier included in the AI data.

Also, according to an embodiment, the AI data may include the DNN setting information. The AI setter 238 may obtain the DNN setting information included in the AI data, and the AI up-scaler 236 may perform AI up-scaling on the second image 135 by using the obtained DNN setting information.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 235 may obtain the DNN setting information by combining some values selected from values in the lookup table, based on information included in the AI data, and the AI up-scaler 236 may perform AI up-scaling on the second image 135 by using the obtained DNN setting information.

According to an embodiment, when a structure of DNN corresponding to the up-scaling target is determined, the AI setter 238 may obtain the DNN setting information, for example, parameters of a filter kernel, corresponding to the determined structure of DNN.

As described above, the AI setter 238 obtains the DNN setting information of the second DNN through the AI data including information related to the first DNN, and the AI up-scaler 236 performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI setter 238 may independently obtain DNN setting information for a certain number of frames, or may obtain common DNN setting information for entire frames.

Figure 6:
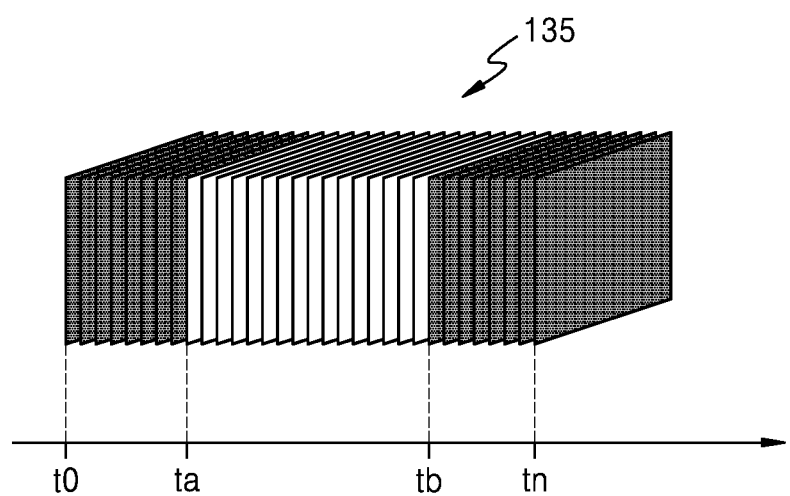
FIG. 6 is a diagram showing a second image including a plurality of frames.

FIG. 6 is a diagram showing the second image 135 including a plurality of frames.

As shown in FIG. 6, the second image 135 may include frames t0 through tn.

According to an embodiment, the AI setter 238 may obtain DNN setting information of a second DNN through AI data, and the AI up-scaler 236 may perform AI up-scaling on the frames t0 through tn based on the obtained DNN setting information. In other words, the frames t0 through tn may be processed via AI up-scaling based on common DNN setting information.

According to another embodiment, the AI setter 238 may obtain 'A' DNN setting information from AI data for some of the frames t0 through tn, for example, the frames t0 through ta, and may obtain 'B' DNN setting information from the AI data for the frames ta+1 through tb. Also, the AI setter 238 may obtain 'C' DNN setting information from the AI data for the frames tb+1 through tn. In other words, the AI setter 238 may independently obtain DNN setting information for each group including a certain number of frames among the plurality of frames, and the AI up-scaler 236 may perform AI up-scaling on frames included in each group by using the independently obtained DNN setting information.

According to another embodiment, the AI setter 238 may independently obtain DNN setting information for each frame forming the second image 135. For example, when the second image 135 includes three frames, the AI setter 238 may obtain DNN setting information in relation to a first frame, obtain DNN setting information in relation to a second frame, and obtain DNN setting information in relation to a third frame. In other words, DNN setting information may be independently obtained for each of the first frame, the second frame, and the third frame. DNN setting information may be independently obtained for each frame included in the second image 135, according to a method of obtaining DNN setting information based on information (prediction mode information, motion information, quantization parameter information, or the like) provided from the first decoder 234 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI setter 238 obtains DNN setting information based on the AI data, and the AI up-scaler 236 performs AI up-scaling on the frames t0 through ta by using the obtained DNN setting information. Also, when another piece of AI data includes information indicating that DNN setting information is valid up to the frame tn, the AI setter 238 may obtain DNN setting information based on the other piece of AI data, and the AI up-scaler 236 may perform AI up-scaling on the frames ta+1 through tn by using the obtained DNN setting information.

The AI encoding apparatus 700 for performing AI encoding on the original image 105 will be described with reference to FIG. 7.

FIG. 7 is a block diagram of a structure of the AI encoding apparatus 700 according to an embodiment.

Referring to FIG. 7, the AI encoding apparatus 700 may include an AI encoder 710 and a transmitter 730. The AI encoder 710 may include an AI down-scaler 712, a first encoder 714, a data processor 716, and an AI setter 718.

In FIG. 7, the AI encoder 710 and the transmitter 730 are illustrated as separate devices, but the AI encoder 710 and the transmitter 730 may be implemented through one processor. In this case, the AI encoder 710 and the transmitter 730 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The AI encoder 710 and the transmitter 730 may be configured by a plurality of processors. In this case, the AI encoder 710 and the transmitter 730 may be implemented as a combination of dedicated processors, or may be implemented through a combination of software and a plurality of general-purpose processors such as an AP, a CPU, or a GPU.

According to an embodiment, the first encoder 714 may be implemented as a first processor, the AI down-scaler 712, the data processor 716, and the AI setter 718 may be implemented as a second processor different from the first processor, and the transmitter 730 may be implemented as a third processor different from the first processor and the second processor. The AI encoder 710 performs AI down-scaling on the original image 105 and first encoding on the first image 115, and transmits AI encoding data to the transmitter 730. The transmitter 730 transmits the AI encoding data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes pieces of information used during the first encoding performed on the first image 115. For example, the image data may include prediction mode information, motion information, and information related to quantization parameter used during the first encoding performed on the first image 115.

The AI data includes pieces of information enabling the AI up-scaler 236 to perform AI up-scaling on the second image 135 to an up-scaling target corresponding to a down-scaling target of a first DNN. For example, the AI data may include difference information between the original image 105 and the first image 115. For example, the AI data may include information related to the first image 115. The information related to the first image 115 may include information about at least one of resolution of the first image 115, a bitrate of the image data obtained as the result of performing first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 712 may obtain the first image 115 by performing the AI down-scaling on the original image 105 through the first DNN. The AI down-scaler 712 may perform the AI down-scaling on the original image 105 by using the DNN setting information provided by the AI setter 718. The AI setter 718 may determine the down-scaling target of the original image 105, based on a pre-determined standard.

In order to obtain the first image 115 matching the down-scaling target, the AI setter 718 may store a plurality of pieces of DNN setting information settable in the first DNN. The AI setter 718 obtains DNN setting information corresponding to the down-scaling target from among the plurality of pieces of DNN setting information, and provides the obtained DNN setting information to the AI down-scaler 712.

Each of the plurality of pieces of DNN setting information may be trained to obtain the first image 115 of pre-determined resolution and/or pre-determined quality. For example, any one piece of DNN setting information among the plurality of pieces of DNN setting information may include pieces of information for obtaining the first image 115 of a resolution that is half the resolution of the original image 105, for example, the first image 115 of 2 K (2048×1080) that is half 4 K (4096×2160) of the original image 105, and another piece of DNN setting information may include pieces of information for obtaining the first image 115 of a resolution that is quarter the resolution of the original image 105, for example, the first image 115 of 2 K (2048×1080) that is quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 718 may provide, to the AI down-scaler 712, the DNN setting information obtained by combining some values selected from values in the lookup table, based on the down-scaling target.

According to an embodiment, the AI setter 718 may determine a structure of DNN corresponding to the down-scaling target, and may obtain the DNN setting information, for example, parameters of a filter kernel, corresponding to the determined structure of DNN.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 712 may set the first DNN with the DNN setting information determined to perform the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on pieces of information included in the DNN setting information.

A method, performed by the AI setter 718, of determining the down-scaling target will now be described. The down-scaling target may indicate, for example, by how much is resolution decreased from the original image 105 to obtain the first image 115.

The AI setter 718 obtains one or more pieces of input information. According to an embodiment, the input information may include at least one of a target resolution of the first image 115, a target bitrate of the image data, a bitrate type of the image data (e.g., a variable bitrate type, a constant bitrate type, or an average bitrate type), a color format (luminance component, chrominance component, red component, green component, blue component, or the like) to which AI downscaling is applied, a codec type for the first encoding of the first image 115, compression history information, and a resolution of the original image 105, or a type of the original image 105.

The one or more pieces of input information may include information previously stored in the AI encoding apparatus 700 or received from a user.

The AI setter 718 controls an operation of the AI down-scaler 712, based on the input information. According to an embodiment, the AI setter 718 may determine the down-scaling target according to the input information, and may provide DNN setting information corresponding to the determined down-scaling target to the AI down-scaler 712.

According to an embodiment, the AI setter 718 may transmit at least a portion of the input information to the first encoder 714 so that the first encoder 714 may perform first encoding on the first image 115 via a bitrate of a certain value, a bitrate of a certain type, and a certain codec.

According to an embodiment, the AI setter 718 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI setter 718 may determine the down-scaling target based on the compression ratio, the compression quality, or the like, which is pre-set or input from a user.

As another example, the AI setter 718 may determine the down-scaling target by using the compression history information stored in the AI encoding apparatus 700. For example, according to the compression history information usable by the AI encoding apparatus 700, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI setter 718 may determine the down-scaling target based on the encoding quality that has been used more frequently than a certain threshold value (for example, average quality of the encoding quality that has been used more frequently than the certain threshold value), according to the compression history information.

As another example, the AI setter 718 may determine the down-scaling target, based on the resolution, type (for example, a file format), or the like of the original image 105.

According to an embodiment, when the original image 105 includes a plurality of frames, the AI setter 718 may independently obtain DNN setting information for a certain number of frames, and may provide the independently-obtained DNN setting information to the AI down-scaler 712.

According to an embodiment, the AI setter 718 may divide the frames included in the original image 105 into a certain number of groups, and independently obtain the DNN setting information for each group. The same or different pieces of DNN setting information may be obtained for each group. The number of frames included in the groups may be the same or different according to each group.

According to another embodiment, the AI setter 718 may independently determine DNN setting information for each frame forming the original image 105. The same or different pieces of DNN setting information may be obtained for each frame.

An example of a structure of a first DNN 800 on which AI down-scaling is based will now be described.

Figure 8:
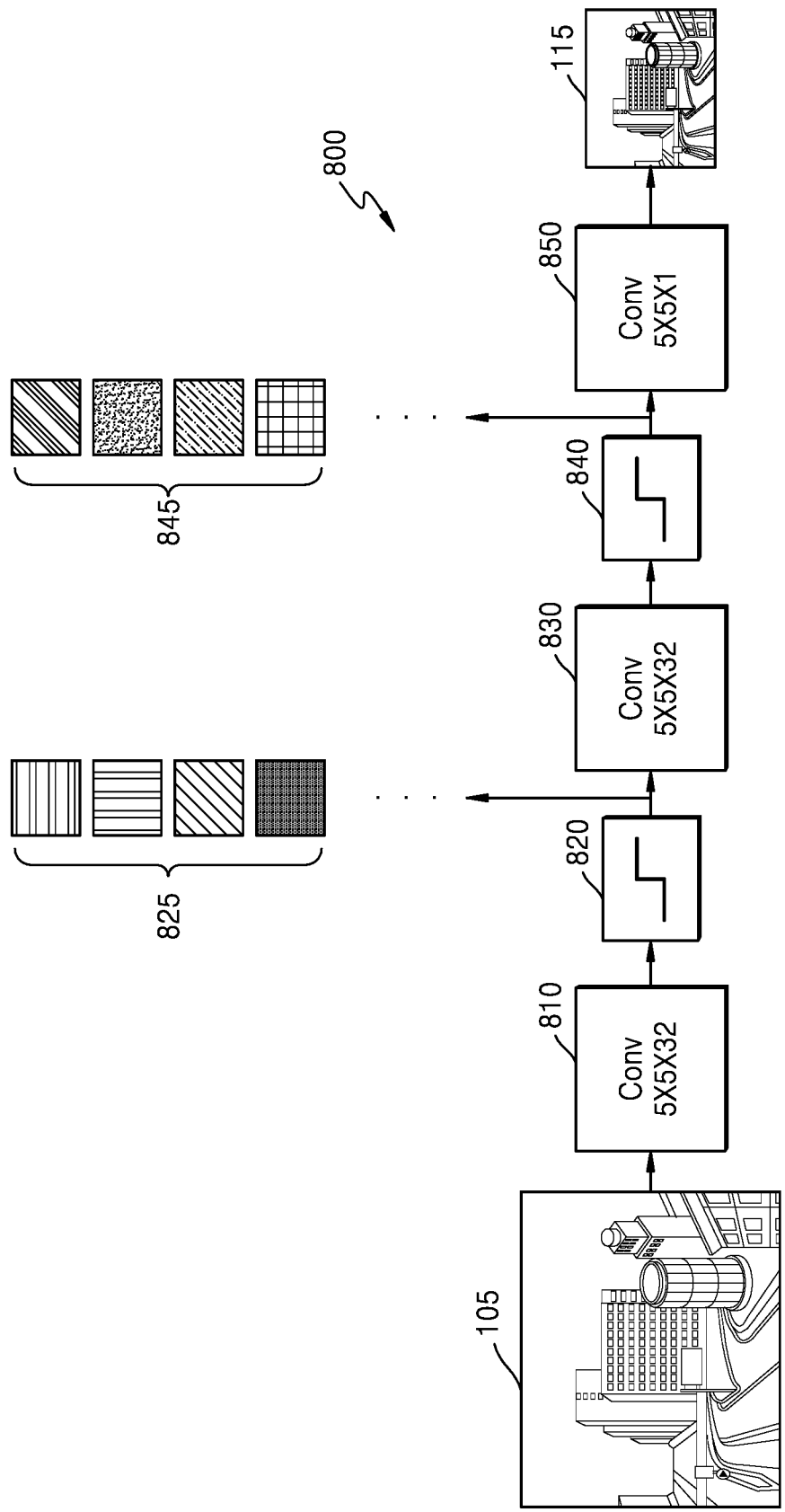
FIG. 8 is a diagram illustrating a first DNN for AI downscaling of an original image.

FIG. 8 is a diagram showing the first DNN 800 for performing AI down-scaling on the original image 105.

As shown in FIG. 8, the original image 105 is input to a first convolution layer 810. The first convolution layer 810 performs a convolution process on the original image 105 by using 32 filter kernels having a size of 5×5. 32 feature maps generated as a result of the convolution process are input to a first activation layer 820. The first activation layer 820 may impart non-linear characteristics to each of the 32 feature maps.

The first activation layer 820 determines whether to transmit the sample values of the feature maps output by the first convolution layer 810 to a second convolution layer 830. For example, some of the sample values of the feature maps are activated by the first activation layer 820 and transmitted to the second convolution layer 830, and some sample values are not activated by the first activation layer 820 and not transmitted to the second convolution layer 830.

Information represented by the feature maps output from the first convolution layer 810 is emphasized by the first activation layer 820.

An output 825 of the first activation layer 820 is input to the second convolution layer 830. The second convolution layer 830 performs a convolution process on input data by using 32 filter kernels having a size of 5×5. 32 feature maps output as a result of the convolution process are input to a second activation layer 840, and the second activation layer 840 may impart non-linear characteristics to each of the 32 feature maps.

An output 845 of the second activation layer 840 is input to a third convolution layer 850. The third convolution layer 850 performs a convolution process on the input data by using one filter kernel having a size of 5×5. As a result of the convolution process, one image may be output from the third convolution layer 850. The third convolution layer 850, which is a layer for outputting a final image, obtains one output by using one filter kernel. According to an embodiment of the disclosure, the third convolution layer 850 may output the first image 115 through a convolution operation result.

There may be a plurality of pieces of DNN setting information indicating the numbers of filter kernels of the first, second, and third convolution layers 810, 830, and 850 of the first DNN 800, respective parameters of filter kernels of the first, second, and third convolution layers 810, 830, and 850 of the first DNN 800, and the like, and the plurality of pieces of DNN setting information should be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

FIG. 8 illustrates the first DNN 800 including the three first, second, and third convolution layers 810, 830, and 850 and the two first and second activation layers 820 and 840, but this is merely an example. In some cases, the number of convolution layers and the number of activation layers may vary. In some cases, the first DNN 800 may be implemented as an RNN. This case refers to changing a CNN structure of the first DNN 800 according to an embodiment of the disclosure to an RNN structure.

According to an embodiment, the AI down-scaler 712 may include at least one ALU for a convolution operation and an operation of an activation layer. The ALU may be implemented as a processor. For the convolution operation, the ALU may include a multiplier that performs a multiplication operation between the sample values of the original image 105 or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tan h function, or ReLU function, and a comparator that compares a result of the multiplication with a predetermined value to determine whether to transmit an input sample value to the next layer.

Referring back to FIG. 7, the AI setter 718 transmits the AI data to the data processor 716. The AI data includes pieces of information enabling the AI up-scaler 236 to perform AI up-scaling on the second image 135 to an up-scaling target corresponding to a down-scaling target of a first DNN. Upon receiving the first image 115 from the AI down-scaler 712, the first encoder 714 may reduce an information amount of the first image 115 by performing first encoding on the first image 115 according to a frequency transformation-based image compression method. The image data may be obtained as a result of the first encoding via a certain codec (for example, MPEG-2, H.264, MPEG-4, HEVC, VC-1, VP8, VP9, or AV1). The image data may be obtained according to the rule of the certain codec, namely, according to a syntax. For example, the image data may include residual data that is a difference between the first image 115 and prediction data of the first image 115, and prediction mode information, motion information, and quantization parameter related information that are used during the first encoding performed on the first image 115. The image data obtained as a result of the first encoding by the first encoder 714 is provided to the data processor 716.

The data processor 716 generates AI encoding data including the image data received from the first encoder 714 and the AI data received from the AI setter 718.

According to an embodiment, the data processor 716 may generate the AI encoding data including the image data and the AI data in a separate state. For example, the AI data may be included in a VSIF in an HDMI stream.

According to another embodiment, the data processor 716 may include AI data in the image data obtained as a result of the first encoding by the first encoder 714, and may generate AI encoding data including the image data. For example, the data processor 716 may generate image data in the form of one bitstream by combining a bitstream corresponding to the image data with a bitstream corresponding to the AI data. To this end, the data processor 716 may represent the AI data as bits each having a value of 0 or 1, namely, as a bitstream. According to an embodiment, the data processor 716 may include a bitstream corresponding to the AI data in the SEI, which is an additional information area of a bitstream obtained as a result of the first encoding.

The AI encoding data is transmitted to the transmitter 730. The transmitter 730 transmits the AI encoding data through a network. According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

Figure 9:
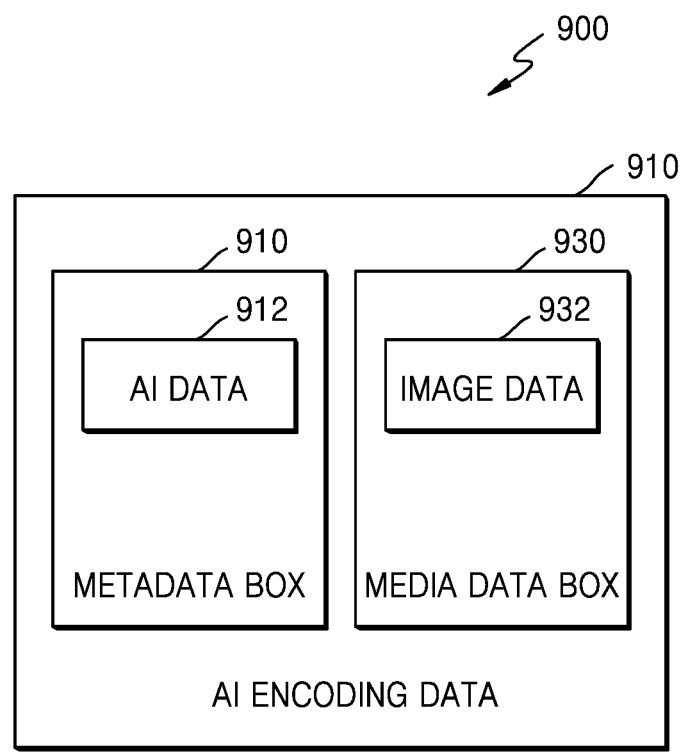
FIG. 9 is a block diagram of a structure of AI encoding data according to an embodiment.

FIG. 9 is a block diagram of a structure of AI encoding data 900 according to an embodiment.

As described above, AI data 912 and image data 932 may be separately included in the AI encoding data 900. The AI encoding data 900 may be in a container format such as MP4, AVI, MKV, or FLV. The AI encoding data 900 may include a metadata box 910 and a media data box 930.

The metadata box 910 includes information about the image data 932 included in the media data box 930. For example, the metadata box 910 may include information about the type of the first image 115, the type of codec used to encode the first image 115, and the playback time of the first image 115. The metadata box 910 may also include the AI data 912. The AI data 912 may be encoded according to an encoding method provided by a certain container format, and may be stored in the metadata box 910.

The media data box 930 may include the image data 932 generated according to the syntax of a certain image compression method.

Figure 10:
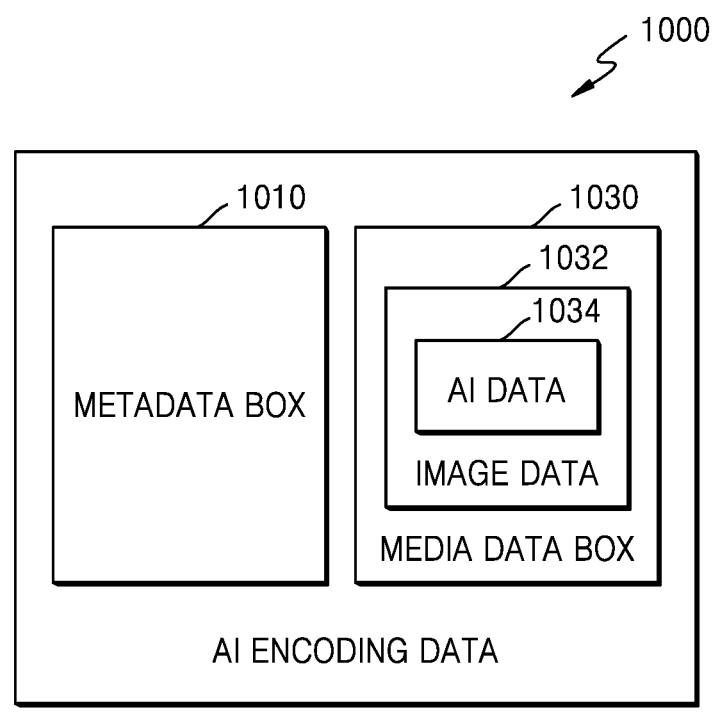
FIG. 10 is a block diagram of a structure of AI encoding data according to another embodiment.

FIG. 10 is a block diagram of a structure of AI encoding data 1000 according to another embodiment.

Referring to FIG. 10, AI data 1034 may be included in image data 1032. The AI encoding data 1000 may include a metadata box 1010 and a media data box 1030. When the AI data 1034 is included in the image data 1032, the metadata box 1010 may not include the AI data 1034.

The media data box 1030 includes the image data 1032 including the AI data 1034. For example, the AI data 1034 may be included in an additional information area of the image data 1032.

A method of jointly training the first DNN 800 and the second DNN 300 will now be described with reference to FIG. 11.

Figure 11:
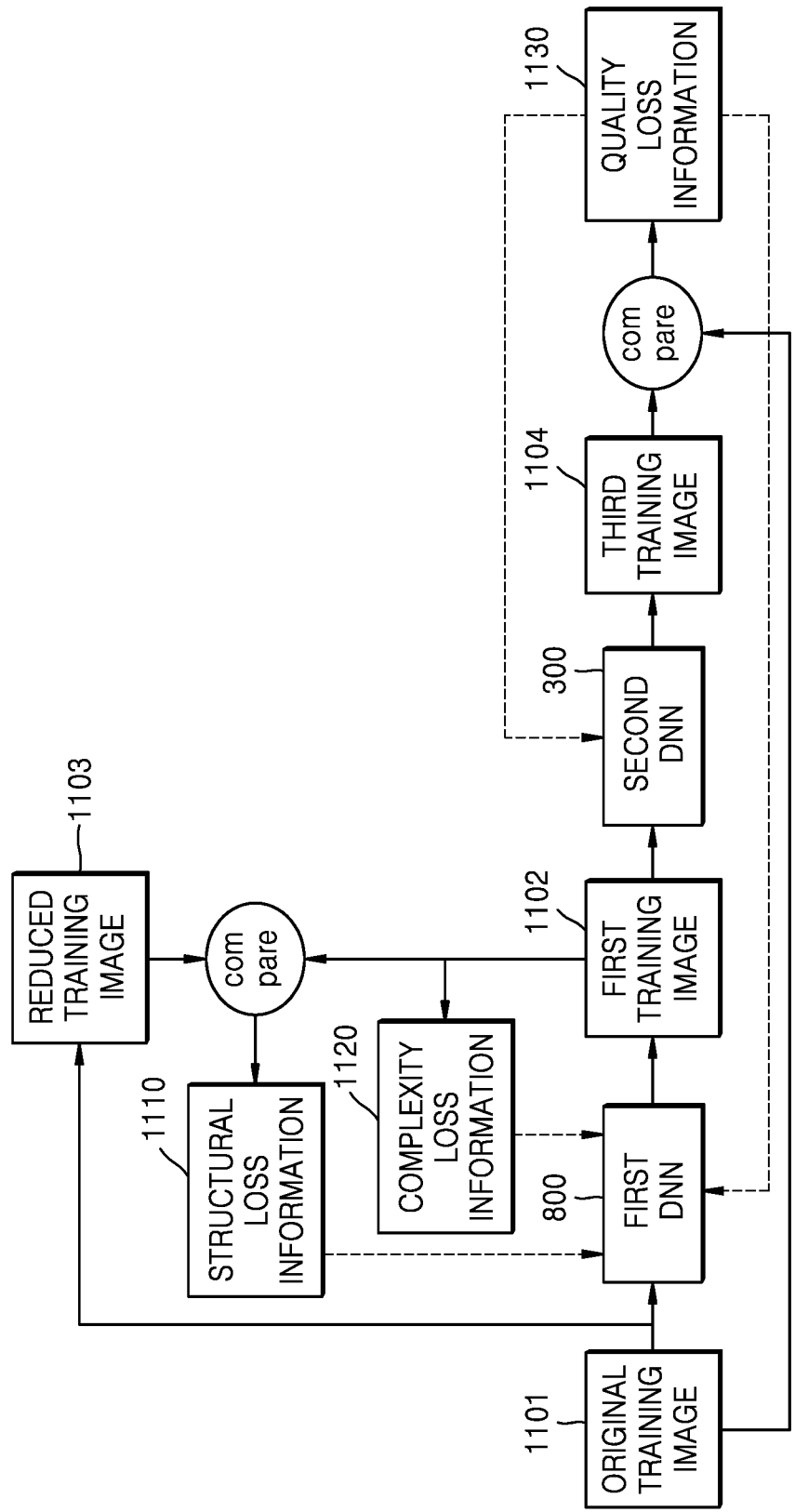
FIG. 11 is a diagram for describing a method of training a first DNN and a second DNN.

FIG. 11 is a diagram for describing a method of training the first DNN 800 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity between the AI encoding process and the AI decoding process is required. In other words, information lost in the AI encoding process needs to be reconstructed during the AI decoding process, and, to this end, the first DNN 800 and the second DNN 300 need to be jointly trained.

For accurate AI decoding, ultimately, quality loss information 1130 corresponding to a result of comparing a third training image 1104 and an original training image 1101 shown in FIG. 11 needs to be reduced. Accordingly, the quality loss information 1130 is used to train both of the first DNN 800 and the second DNN 300.

First, a training process shown in FIG. 11 will be described.

In FIG. 11, the original training image 1101 is an image on which AI down-scaling is to be performed, and a first training image 1102 is an image obtained by performing AI down-scaling on the original training image 1101. A third training image 1104 is an image obtained by performing AI up-scaling on the first training image 1102.

The original training image 1101 includes a still image or a moving image including a plurality of frames. According to an embodiment, the original training image 1101 may include a luminance image extracted from the still image or the moving image including the plurality of frames. According to an embodiment, the original training image 1101 may include a patch image extracted from the still image or the moving image including the plurality of frames. When the original training image 1101 includes the plurality of frames, the first training image 1102, a second training image, and the third training image 1104 also each include a plurality of frames. When the plurality of frames of the original training image 1101 are sequentially input to the first DNN 800, the plurality of frames of the first training image 1102, the second training image, and the third training image 1104 may be sequentially obtained through the first DNN 800 and the second DNN 300.

For joint training of the first DNN 800 and the second DNN 300, the original training image 1101 is input to the first DNN 800. The original training image 1101 input to the first DNN 800 is output as the first training image 1102 via the AI down-scaling, and the first training image 1102 is input to the second DNN 300. The third training image 1104 is output as a result of performing the AI up-scaling on the first training image 1102.

Referring to FIG. 11, the first training image 1102 is input to the second DNN 300, and according to an embodiment, a second training image obtained as first encoding and first decoding are performed on the first training image 1102 may be input to the second DNN 300. The second training image may be input to the second DNN 300 by using any one codec among MPEG-2, H.264, MPEG-4, HEVC, VC-1, VP8, VP9, and AV1. In detail, any one codec among MPEG-2, H.264, MPEG-4, HEVC, VC-1, VP8, VP9, and AV1 may be used to perform first encoding on the first training image 1102 and first decoding on image data corresponding to the first training image 1102.

Referring to FIG. 11, separate from the first training image 1102 being output through the first DNN 800, a reduced training image 1103 obtained by performing legacy down-scaling on the original training image 1101 is obtained. The legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 1103 is obtained to preserve the structural feature of the original training image 1101.

Before training is performed, the first DNN 800 and the second DNN 300 may be set to pre-determined DNN setting information. When the training is performed, structural loss information 1110, complexity loss information 1120, and the quality loss information 1130 may be determined.

The structural loss information 1110 may be determined based on a result of comparing the reduced training image 1103 and the first training image 1102. For example, the structural loss information 1110 may correspond to a difference between structural information of the reduced training image 1103 and structural information of the first training image 1102. Structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of image data obtained by performing first encoding on the first training image 1102. It is defined that the bitrate of the image data is low when the complexity loss information 1120 is small.

The quality loss information 1130 may be determined based on a result of comparing the original training image 1101 and the third training image 1104. The quality loss information 1130 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 1101 and the third training image 1104. The quality loss information 1130 indicates how similar the third training image 1104 is to the original training image 1101. The third training image 1104 is more similar to the original training image 1101 when the quality loss information 1130 is small.

Referring to FIG. 11, the structural loss information 1110, the complexity loss information 1120 and the quality loss information 1130 are used to train the first DNN 800, and the quality loss information 1130 is used to train the second DNN 300. In other words, the quality loss information 1130 is used to train both the first and second DNNs 800 and 300.

The first DNN 800 may update a parameter such that final loss information determined based on the structural loss information 1110, the complexity loss information 1120 and the quality loss information 1130 is reduced or minimized. The second DNN 300 may update a parameter such that the quality loss information 1130 is reduced or minimized.

The final loss information for training the first DNN 800 and the second DNN 300 may be determined as Equation 1 below.

$$\text{LossDS} = a*\text{Structural toss infomation} + b*\text{Complexity loss information} + c*\text{Quality loss information}$$

$$\text{LossUS} = d*\text{Quality loss information} \quad [\text{Equation 1}]$$

In Equation 1, LossDS indicates final loss information to be reduced or minimized to train the first DNN 800, and LossUS indicates final loss information to be reduced or minimized to train the second DNN 300. Also, a, b, c and d may be pre-determined certain weights.

In other words, the first DNN 800 updates parameters in a direction LossDS of Equation 1 is reduced, and the second DNN 300 updates parameters in a direction LossUS is reduced. When the parameters of the first DNN 800 are updated according to LossDS derived during the training, the first training image 1102 obtained based on the updated parameters becomes different from a previous first training image 1102 obtained based on not updated parameters, and accordingly, the third training image 1104 also becomes different from a previous third training image 1104. When the third training image 1104 becomes different from the previous third training image 1104, the quality loss information 1130 is also newly determined, and the second DNN 300 updates the parameters accordingly. When the quality loss information 1130 is newly determined, LossDS is also newly determined, and the first DNN 800 updates the parameters according to newly determined LossDS. In other words, updating of the parameters of the first DNN 800 leads to updating of the parameters of the second DNN 300, and updating of the parameters of the second DNN 300 leads to updating of the parameters of the first DNN 800. In other words, because the first DNN 800 and the second DNN 300 are jointly trained by sharing the quality loss information 1130, the parameters of the first DNN 800 and the parameters of the second DNN 300 may be jointly optimized.

Referring to Equation 1, it is verified that LossUS is determined according to the quality loss information 1130, but this is only an example, and LossUS may be determined based on the quality loss information 1130 and at least one of the structural loss information 1110 or the complexity loss information 1120.

It has been described above that the AI setter 238 of the AI decoding apparatus 200 and the AI setter 718 of the AI encoding apparatus 700 store the plurality of pieces of DNN setting information. Methods of training each of the plurality of pieces of DNN setting information stored in the AI setter 238 and the AI setter 718 will now be described.

As described above with reference to Equation 1, the first DNN 800 updates the parameters considering the similarity (structural loss information 1110) between the structural information of the first training image 1102 and the structural information of the original training image 1101, the bitrate (complexity loss information 1120) of the image data obtained as a result of performing first encoding on the first training image 1102, and the difference (quality loss information 1130) between the third training image 1104 and the original training image 1101.

In detail, the parameters of the first DNN 800 may be updated such that the first training image 1102 having similar structural information as the original training image 1101 is obtained and the image data having a small bitrate is obtained when first encoding is performed on the first training image 1102, and at the same time, the second DNN 300 performing AI up-scaling on the first training image 1102 obtains the third training image 1104 similar to the original training image 1101.

A direction in which the parameters of the first DNN 800 are optimized may vary by adjusting the weights a, b, and c of Equation 1. For example, when the weight b is determined to be high, the parameters of the first DNN 800 may be updated by prioritizing a low bitrate over high quality of the third training image 1104. When the weight c is determined to be high, the parameters of the first DNN 800 may be updated by prioritizing high quality of the third training image 1104 over a high bitrate or maintenance of the structural information of the original training image 1101.

The direction in which the parameters of the first DNN 800 are optimized may vary according to a type of codec used to perform first encoding on the first training image 1102, because the second training image to be input to the second DNN 300 may vary according to the type of codec.

In other words, the parameters of the first DNN 800 and the parameters of the second DNN 300 may be jointly updated based on the weights a, b, and c, and the type of codec for performing first encoding on the first training image 1102. Accordingly, when the first DNN 800 and the second DNN 300 are trained after determining the weights a, b, and c as certain values, respectively, and determining the type of codec as a certain type, the parameters of the first DNN 800 and the parameters of the second DNN 300 connected and optimized to each other may be determined.

When the first DNN 800 and the second DNN 300 are trained after changing the weights a, b, and c, and the type of codec, the parameters of the first DNN 800 and the parameters of the second DNN 300 connected and optimized to each other may be determined. In other words, the plurality of pieces of DNN setting information jointly trained with each other may be determined in the first DNN 800 and the second DNN 300 when the first DNN 800 and the second DNN 300 are trained while changing values of the weights a, b, and c, and the type of codec.

As described above with reference to FIG. 5, the plurality of pieces of DNN setting information of the first DNN 800 and the second DNN 300 may be mapped to pieces of information related to the first image. To set such a mapping relationship, first encoding may be performed on the first training image 1102 output from the first DNN 800 via a certain codec according to a certain bitrate, and the second training image obtained by performing first decoding on a bitstream obtained as a result of performing the first encoding may be input to the second DNN 300. In other words, by training the first DNN 800 and the second DNN 300 after setting an environment such that the first encoding is performed on the first training image 1102 of a certain resolution via the certain codec according to the certain bitrate, a DNN setting information pair mapped to the resolution of the first training image 1102, a type of the codec used to perform the first encoding on the first training image 1102, and the bitrate of the bitstream obtained as a result of performing the first encoding on the first training image 1102 may be determined. By variously changing the resolution of the first training image 1102, the type of codec used to perform the first encoding on the first training image 1102, and the bitrate of the bitstream obtained according to the first encoding of the first training image 1102, the mapping relationships between the plurality of pieces of DNN setting information of the first DNN 800 and the second DNN 300 and the pieces of information related to the first image may be determined.

FIG. 10 is a diagram for describing training processes of the first DNN 800 and the second DNN 300 by a training apparatus 1200.

The training of the first DNN 800 and the second DNN 300 described above with reference to FIG. 11 may be performed by the training apparatus 1200. The training apparatus 1200 includes the first DNN 800 and the second DNN 300. The training apparatus 1200 may be, for example, the AI encoding apparatus 700 or a separate server. The pieces of DNN setting information of the second DNN 300 obtained as the training result are stored in the AI decoding apparatus 200.

Figure 12:
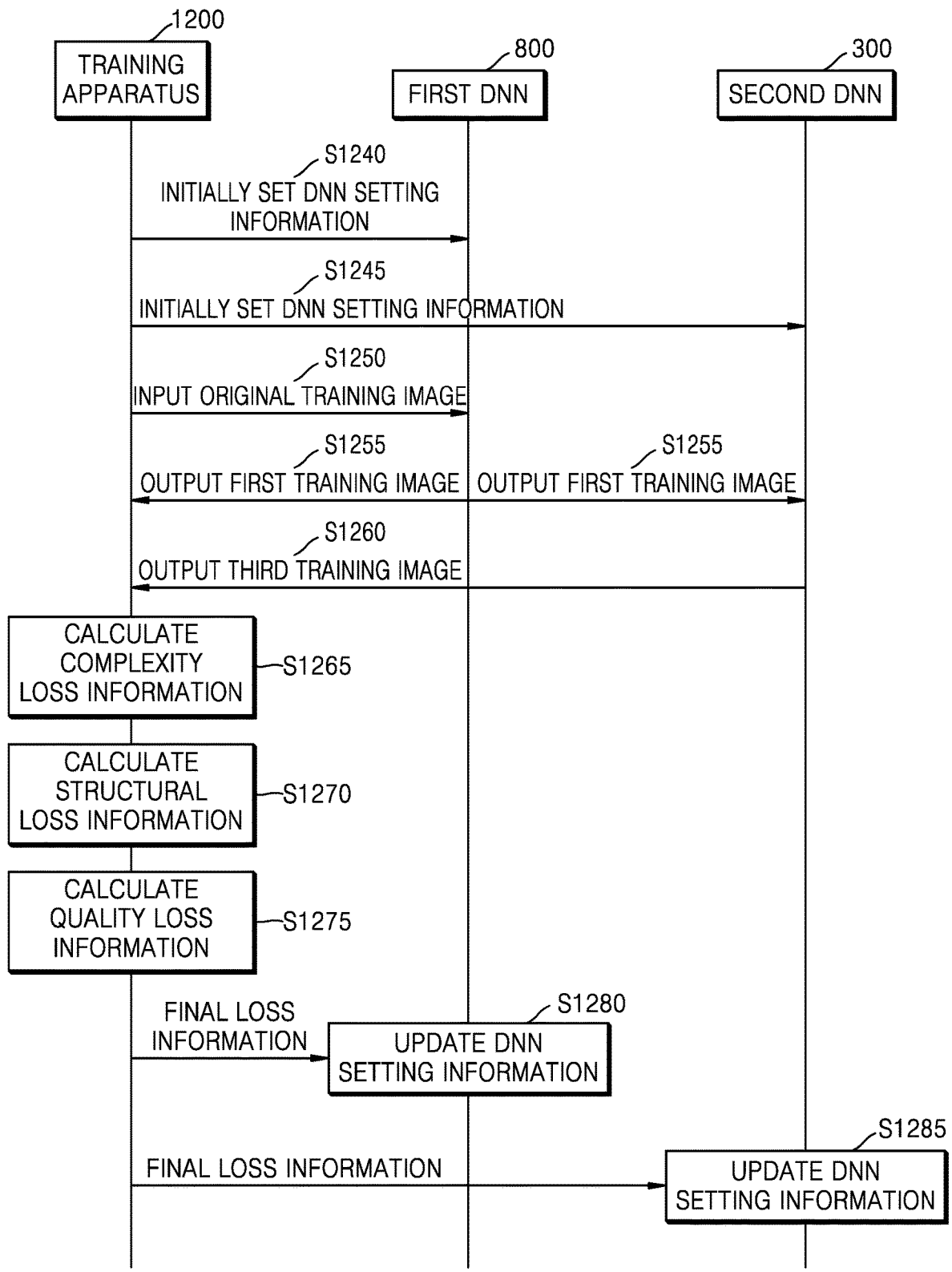
FIG. 12 is a diagram for describing training processes of a first DNN and a second DNN by a training apparatus.

Referring to FIG. 12, the training apparatus 1200 initially sets the DNN setting information of the first DNN 800 and the DNN setting information of the second DNN 300, in operations S1240 and S1245, respectively. Accordingly, the first DNN 800 and the second DNN 300 may operate according to pre-determined DNN setting information. The DNN setting information may include information about at least one of the numbers of convolution layers included in the first DNN 800 and the second DNN 300, the number of filter kernels for each convolution layer, the size of a filter kernel for each convolution layer, or a parameter of each filter kernel.

The training apparatus 1200 inputs the original training image 1101 to the first DNN 800, in operation S1250. The original training image 1101 may include a still image or at least one frame included in a moving image.

The first DNN 800 processes the original training image 1101 according to the initially set DNN setting information and outputs the first training image 1102 obtained by performing AI down-scaling on the original training image 1101, in operation S1255. In FIG. 12, the first training image 1102 output from the first DNN 800 is directly input to the second DNN 300. However, the first training image 1102 output from the first DNN 800 may be input to the second DNN 300 by the training apparatus 1200. The training apparatus 1200 may perform first encoding and first decoding on the first training image 1102 via a certain codec, and then input the second training image to the second DNN 300.

The second DNN 300 processes the first training image 1102 or the second training image according to the initially set DNN setting information and outputs the third training image 1104 obtained by performing AI up-scaling on the first training image 1102 or the second training image, in operation S1260.

The training apparatus 1200 calculates the complexity loss information 1120, based on the first training image 1102, in operation S1265.

The training apparatus 1200 calculates the structural loss information 1110 by comparing the reduced training image 1103 with the first training image 1102, in operation S1270.

The training apparatus 1200 calculates the quality loss information 1130 by comparing the original training image 1101 with the third training image 1104, in operation S1275.

The first DNN 800 updates the initially set DNN setting information via a back propagation process based on the final loss information, in operation S1280. The training apparatus 1200 may calculate the final loss information for training the first DNN 800, based on the complexity loss information 1120, the structural loss information 1110, and the quality loss information 1130.

The second DNN 300 updates the initially set DNN setting information via a back propagation process based on the quality loss information 1130 or the final loss information, in operation S1285. The training apparatus 1200 may calculate the final loss information for training the second DNN 300, based on the quality loss information 1130.

Then, the training apparatus 1200, the first DNN 800, and the second DNN 300 repeat operations S1250 through S1285 until the final loss information is minimized to update the DNN setting information. At this time, during each repetition, the first DNN 800 and the second DNN 300 operate according to the DNN setting information updated in a previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Number of frames | Information amount (Bitrate) (Mbps) | | Subjective image quality score (VMAF) | |
|---|---|---|---|---|---|---|
| | | | HEVC | AI encoding/ AI decoding | HEVC | AI encoding/ AI decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to an embodiment of the disclosure, is higher than subjective image quality when encoding and decoding are performed via HEVC, a bitrate is reduced by at least 50%.

Meanwhile, in a video conference in which several electronic devices participate, a lot of image data is transmitted/received between the electronic devices, so a load applied to the network may be significant. When the electronic devices participating in the video conference perform the aforementioned AI-based downscaling and upscaling, the amount of data transmitted/received through the network may be significantly reduced.

An electronic device or server participating in a video conference, based on the AI upscaling function and the AI downscaling function described above with reference to FIGS. 1 through 12 will now be described.

An electronic device and/or server, which will be described later, may reduce the amount of data transmitted/received through the network, by performing AI upscaling and/or AI downscaling on a video conference image. The electronic device and/or server described later does not perform AI downscaling/AI upscaling on all video conference images at once, but adaptively performs AI upscaling and/or AI downscaling on a video conference image according to the importance of the electronic device of a video conference participant, that is, the importance of the video conference images. This enables smooth video conferences.

In detail, embodiments described below with reference to FIGS. 13 through 24 relate to a method, performed by an electronic device participating in a video conference or a server managing a video conference, of performing AI downscaling or AI upscaling on a video conference image, according to whether AI downscaling or AI upscaling is supported and according to the importance of the electronic device.

Figure 13:
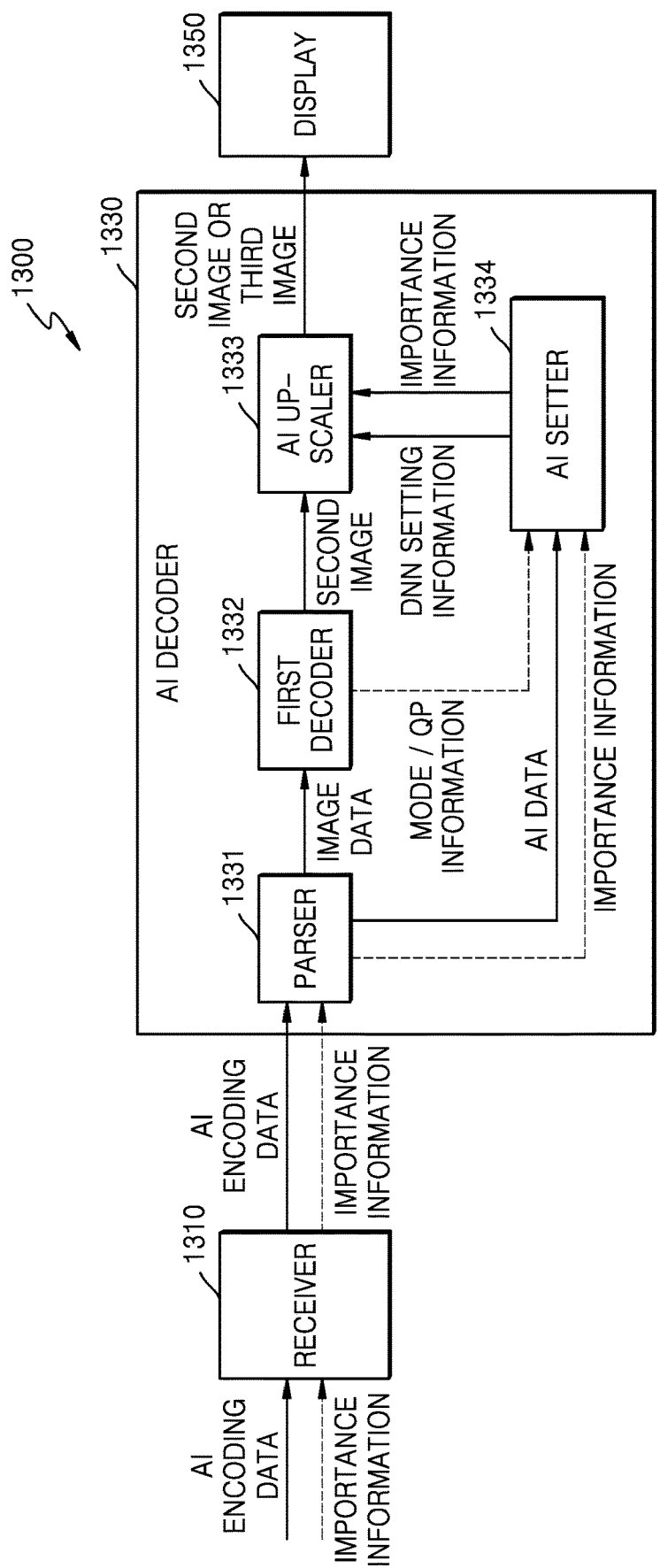
FIG. 13 is a block diagram of a configuration of an electronic device for AI upscaling, during a video conference, a video conference image according to the importance of another electronic device participating in the video conference, according to an embodiment.

FIG. 13 is a block diagram of a configuration of an electronic device for AI upscaling a video conference image according to the importance of another electronic device participating in a video conference, during the video conference, according to an embodiment.

Referring to FIG. 13, an electronic device 1300 may include a receiver 1310, an AI decoder 1330, and a display 1350. The AI decoder 1330 may include a parser 1331, a first decoder 1332, an AI up-scaler 1333, and an AI setter 1334.

In FIG. 13, the receiver 1310, the AI decoder 1330, and the display 1350 are illustrated as separate devices, but the receiver 1310, the AI decoder 1330, and the display 1350 may be implemented through one processor. In this case, the receiver 1310, the AI decoder 1330, and the display 1350 may be implemented as a dedicated processor, or may be implemented through a combination of software and a general-purpose processor such as AP, CPU, or GPU. The dedicated processor may include a memory for implementing an embodiment of the disclosure or a memory processing unit for using an external memory.

The receiver 1310, the AI decoder 1330, and the display 1350 may be configured by a plurality of processors. In this case, the receiver 1310, the AI decoder 1330, and the display 1350 may be implemented as a combination of dedicated processors, or may be implemented through a combination of software and a plurality of general-purpose processors such as an AP, a CPU, or a GPU.

According to an embodiment, the receiver 1310 may be implemented as a first processor, the first decoder 1332 may be implemented as a second processor different from the first processor, the parser 1331, the AI up-scaler 1333, and the AI setter 1334 may be implemented as a third processor different from the first processor and the second processor, and the display 1350 may be implemented as a fourth processor different from the first processor, the second processor, and the third processor.

The receiver 1310 receives, from a server managing a video conference, AI encoding data obtained as a result of AI encoding and importance information of other electronic devices participating in the video conference. For example, the AI encoding data may be a video file having a file format such as mp4 or mov. The AI encoding data that the receiver 1310 obtains from the server is data related to a first image obtained by the server performing AI downscaling on an original image of the other electronic device, or data related to a first image obtained by the other electronic device performing AI downscaling on the original image.

The receiver 1310 may receive, through a communication network, the AI encoding data transmitted by the server managing the video conference and the importance information of the other electronic device participating in the video conference. The receiver 1310 outputs the AI encoding data and the importance information to the AI decoder 1330. The importance information may be transmitted by being included in AI data of the AI encoding data. According to an embodiment, the importance information may be received as metadata separately from the AI-encoded data from the server or the other electronic device.

The parser 1331 parses the AI encoding data, and transmits image data generated as a result of first encoding of the video conference image to the first decoder 1332 and transmits the AI data and the importance information to the AI setter 1334.

According to an embodiment, the parser 1331 may parse the image data and the AI data separately included in the AI encoding data. The parser 1331 may distinguish the image data and the AI data included in the AI encoding data, by reading a header within the AI encoding data.

The structure of the AI encoding data including the AI data and the image data separated from each other has been described above with reference to FIG. 9, and thus a description thereof will be omitted.

According to another embodiment, the parser 1331 may parse the image data from the AI encoding data, extract the AI data from the image data, transmit the AI data to the AI setter 1334, and transmit the remaining image data to the first decoder 1332. In other words, the AI data may be included in the image data. For example, the AI data may be included in SEI, which is an additional information area of a bitstream corresponding to the image data. The structure of the AI encoding data including the image data including the AI data has been described above with reference to FIG. 10, and thus a description thereof will be omitted.

According to another embodiment, the parser 1331 may split the bitstream corresponding to the image data into a bitstream to be processed by the first decoder 1332 and a bitstream corresponding to the AI data, and may output the two bitstreams to the first decoder 1332 and the AI setter 1334, respectively.

The parser 1331 may verify that the image data included in the AI encoding data is image data obtained via a certain codec (for example, MPEG-2, H.264 AVC, MPEG-4, HEVC, VC-1, VP8, VP9, or AV1). In this case, corresponding information may be transmitted to the first decoder 1332 such that the image data is processed via the verified codec.

The first decoder 1332 reconstructs a second image corresponding to a first image, which is the video conference image, based on the image data received from the parser 1331. The second image obtained by the first decoder 1332 is provided to the AI up-scaler 1333.

The importance information may also be provided by the AI setter 1334 to the AI up-scaler 1333.

The AI up-scaler 1333 provides the second image without changes to the display 1350 or provides to the display 1350 a third image obtained by AI upscaling the second image, according to importance.

The importance information is information indicating whether the user of the electronic device participating in the video conference is a presenter or a listener, and is information used to determine whether to perform AI upscaling on the video conference image. The presenter refers to a participant who describes important meeting contents in the video conference and has the right to control the screen, and the listener refers to a participant who simply listens to the contents explained by the presenter in the video conference and does not have the right to control the screen. Therefore, because the video conference image of the presenter contains a relatively large amount of important information, its importance is high and thus it is important to reconstruct a downscaled image to the quality of the original image to reduce data usage, and, because the video conference image of the listener contains a relatively small amount of important information, its importance is low, and thus, there is no need to reconstruct a downscaled image to the original image.

In detail, the AI up-scaler 1333 provides the third image obtained by AI-upscaling the second image to the display 1350 when the importance information represents that the user of the other electronic device is a presenter, and provides the second image to the display 1350 when the importance information represents that the user of the other electronic device is a listener. In other words, because the video conference image of the presenter contains a lot of important information, the third image obtained by the AI-upscaling to correspond to the original image of the presenter's electronic device is displayed, and, because the video conference image of the listener is not important compared to the presenter, the second image is displayed without changes.

According to an embodiment, the importance information may be flag information set to be 1 when the user of the other electronic device is a presenter and set to be 0 when the user is a listener.

According to an embodiment, when starting the video conference, the other electronic device participating in the video conference generates and transmits importance information of the other electronic device to the server, and, when the electronic device 1300 is able to use the importance information, the server may transmit the importance information to the electronic device 1300. When an input to change the importance of the other electronic device is received during the video conference, the other electronic device generates changed importance information or updates the importance information and transmits the changed importance information or the updated importance information to the server, and, when the electronic device 1300 is able to use the importance information, the server may transmit the importance information to the electronic device 1300. In other words, the importance information is not always transmitted, but the changed or updated importance information may be transmitted when a video conference starts and when there is a change in importance. In this case, when the video conference starts, the electronic device 1300 obtains and stores the importance information of the other electronic device received through the server, and, when the importance of the other electronic device is changed while performing AI upscaling based on the importance information, obtains changed importance information of the other electronic device from the server, updates the changed importance information, and performs AI upscaling based on the updated importance information.

According to an embodiment, first decoding related information, such as prediction mode information, motion information, quantization parameter information, or the like, may be provided by the first decoder 1332 to the AI setter 1334. The first decoding related information may be used to obtain DNN setting information.

The AI data provided to the AI setter 1334 includes pieces of information enabling the second image to be processed via AI up-scaling. Here, an up-scaling target of the second image should correspond to a down-scaling target of a first DNN. Accordingly, the AI data needs to include information for verifying the down-scaling target of the first DNN.

Examples of the information included in the AI data include difference information between resolution of the original image and resolution of the first image obtained by AI-downscaling the original image, and information related to the first image.

The difference information may be expressed as information about a resolution conversion degree of the first image compared to the original image (for example, resolution conversion rate information). Because the resolution of the first image is verified through the resolution of the reconstructed second image and the resolution conversion degree is verified accordingly, the difference information may be expressed only as resolution information of the original image. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image may include information about at least one of the resolution of the first image, a bitrate of the image data obtained as the result of performing first encoding on the first image, or a codec type used during the first encoding of the first image.

The AI setter 1334 may determine the up-scaling target of the second image, based on at least one of the difference information or the information related to the first image, which are included in the AI data. The up-scaling target may indicate, for example, to what degree resolution is to be up-scaled for the second image. When the up-scaling target is determined, the AI up-scaler 1333 performs AI up-scaling on the second image through a second DNN to obtain the third image corresponding to the up-scaling target.

A method, performed by the AI setter 1334, of determining an up-scale target, and a method, performed by the AI up-scaler 1333, of AI up-scaling the second image according to the up-scaling target will now be described.

According to an embodiment, the AI setter 1334 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 1334 may obtain the DNN setting information for performing AI up-scaling on the second image, among the plurality of pieces of DNN setting information. Each of the plurality of pieces of DNN setting information used at this time is information for obtaining the third image of pre-determined resolution and/or pre-determined quality, and is trained jointly with a first DNN.

For example, one piece of DNN setting information among the plurality of pieces of DNN setting information may include pieces of information for obtaining the third image of resolution twice higher than the resolution of the second image, for example, the third image of 1080p twice higher than 540p of the second image, or pieces of information for obtaining the third image of resolution four times higher than the resolution of the second image, for example, the third image of 1080p four times higher than 270p of the second image.

A training method of a DNN for AI downscaling and a training method of a DNN for AI upscaling have already described above in detail with reference to FIGS. 11 and 12, and thus descriptions thereof will be omitted. However, each DNN may be trained in consideration of the resolution of an image used during a video conference. For example, when the size of the original image used in the video conference is 1080p, the DNN for AI downscaling may be trained to output a first image of 540p, which is ½ the size of the original image, or a first image of 270p, which is ¼ the size of the original image, and the DNN for AI upscaling may be trained to output a third image of 1080p from a second image of 540p or a second image of 270p.

Each of the plurality of pieces of DNN setting information is obtained jointly with DNN setting information of the first DNN of the other electronic device or the server, and the AI setter 1334 obtains one piece of DNN setting information among the plurality of pieces of DNN setting information according to an enlargement ratio corresponding to a reduction ratio of the DNN setting information of the first DNN. To this end, the AI setter 1334 may verify information of the first DNN. In order for the AI setter 1334 to verify the information of the first DNN, the electronic device 1300 according to an embodiment receives AI data including the information of the first DNN from the server managing the video conference.

In other words, the AI setter 1334 may verify information targeted by DNN setting information of the first DNN used to obtain the first image and obtain the DNN setting information of the second DNN trained jointly with the DNN setting information of the first DNN, by using pieces of information received from the server.

When DNN setting information for performing the AI up-scaling on the second image is obtained from among the plurality of pieces of DNN setting information, the obtained DNN setting information may be transmitted to the AI up-scaler 1333, and input data may be processed based on the second DNN operating according to the obtained DNN setting information.

For example, when any one piece of DNN setting information is obtained, the AI up-scaler 1333 may set the number of filter kernels included in each of the first, second, and third convolution layers 310,330, and 350 of the second DNN 300 of FIG. 3, and the respective parameters of the filter kernels to be values included in the obtained DNN setting information.

In detail, when parameters of a filter kernel of 3×3 used in any one convolution layer of the second DNN of FIG. 4 are {1, 1, 1, 1, 1, 1, 1, 1, 1} and there is a change in DNN setting information, the AI up-scaler 1333 may replace the parameters of the filter kernel with {2, 2, 2, 2, 2, 2, 2, 2, 2}, which are parameters included in the changed DNN setting information.

The AI setter 1334 may obtain the DNN setting information for AI up-scaling the second image from among the plurality of pieces of DNN setting information, based on information included in the AI data, and the AI data used to obtain the DNN setting information will now be described.

According to an embodiment, the AI setter 1334 may obtain the DNN setting information for AI up-scaling the second image from among the plurality of pieces of DNN setting information, based on difference information included in the AI data. For example, when it is verified that the resolution (for example, 1080p) of the original image is twice higher than the resolution (for example, 540p) of the first image, based on the difference information, the AI setter 1334 may obtain the DNN setting information for increasing the resolution of the second image two times.

According to another embodiment, the AI setter 1334 may obtain the DNN setting information for AI up-scaling the second image from among the plurality of pieces of DNN setting information, based on the information related to the first image included in the AI data. The AI setter 1334 may pre-determine a mapping relationship between pieces of image-related information and pieces of DNN setting information, and obtain the DNN setting information mapped to the information related to the first image.

A plurality of pieces of DNN setting information for AI downscaling and a plurality of pieces of DNN setting information for AI upscaling may be obtained through the training process described above with reference to FIGS. 11 and 12. In some cases, a single piece of DNN setting information for AI downscaling and a single piece of DNN setting information for AI upscaling may be obtained through the training process described above with reference to FIGS. 11 and 12. In other words, a pair of pieces of DNN setting information may be obtained for AI downscaling and AI upscaling. In this case, one piece of DNN setting information for AI upscaling may be stored in an AI setter.

In detail, the AI setter 1334 may obtain one piece of DNN setting information for AI up-scaling the second image corresponding to a downscaled first image of 540p to the third image of 1080p, based on the information included in the AI data. In this case, the information included in the AI data is information indicating that the image data transmitted together is about an image obtained through AI downscaling, and the AI setter 1334 provides one piece of DNN setting information stored in the AI setter 1334 to the AI up-scaler 1333.

The AI up-scaler 1333 performs AI upscaling based on the DNN setting information and the importance provided by the AI setter 1334 to obtain a third image, and provides the third image to the display 1350.

According to an embodiment, when the DNN setting information provided by the AI setter 1334 is one piece of pre-determined DNN setting information (that is, DNN setting information with a scaling factor of 2) for AI upscaling the second image corresponding to the first image of 540p, which is a result of downscaling the original image of 1080p, the first image is 270p, the original image is 1080p, and the importance is high, the AI up-scaler 1333 obtains a third image of 1080p by performing AI upscaling twice by using the one piece of pre-determined DNN setting information, and provides the third image to the display 1350. The reason for performing the AI upscaling twice is to match the resolution of the third image to the original image.

According to another embodiment, when the DNN setting information provided by the AI setter 1334 is one piece of pre-determined DNN setting information for AI upscaling the second image corresponding to the downscaled first image of 540p, the first image is 270p, the original image is 1080p, and the importance is low, the AI up-scaler 1333 provides the second image of 270p to the display 1350 without performing AI upscaling.

According to another embodiment, when the DNN setting information provided by the AI setter 1334 is one piece of pre-determined DNN setting information for AI upscaling the second image corresponding to the downscaled first image of 540p, the first image is 270p, the original image is 1080p, and the importance is low, the AI up-scaler 1333 obtains a third image of 540p by performing AI upscaling once by using the one piece of pre-determined DNN setting information, and provides the third image to the display 1350.

The display 1350 displays a second image corresponding to a downscaled image of the other electronic device participating in the video conference or a third image corresponding to the original image.

Figure 14:
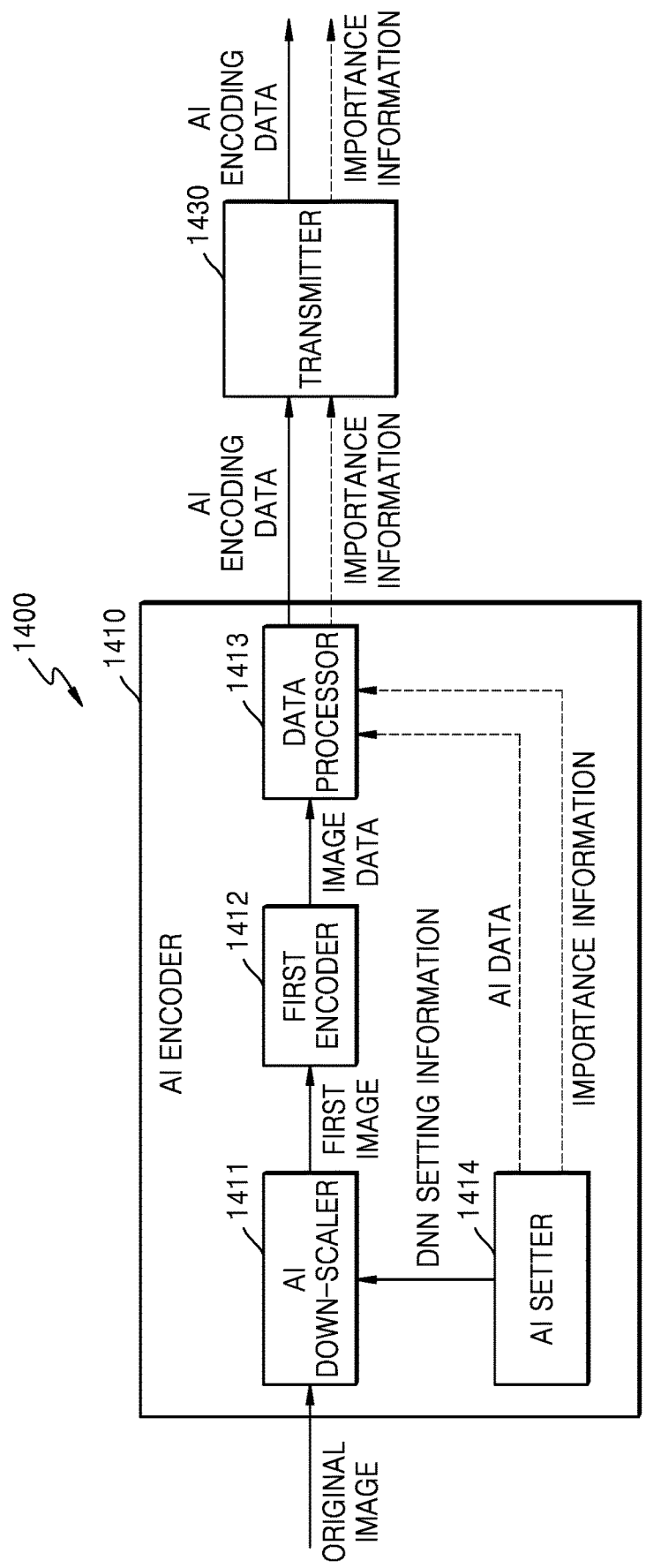
FIG. 14 is a block diagram of a configuration of an electronic device for AI downscaling, during a video conference, a video conference image of the electronic device participating in the video conference, according to an embodiment.

FIG. 14 is a block diagram of a configuration of an electronic device participating in a video conference for AI downscaling a video conference image of the electronic device during the video conference, according to an embodiment.

The electronic device 1300 of FIG. 13 receives the video conference image of the other electronic device, determines whether to perform the AI upscaling according to the importance of the other electronic device, and performs the AI upscaling, whereas an electronic device 1400 of FIG. 14 performs AI downscaling on a video conference image of the electronic device 1400 and transmits a result of the AI downscaling to another electronic device.

The electronic device 1300 of FIG. 13 and the electronic device 1400 of FIG. 14 respectively represent structures that perform different roles within electronic devices participating in the video conference, and the electronic device 1300 of FIG. 13 and the electronic device 1400 of FIG. 14 may be the same electronic devices.

The electronic device 1300 of FIG. 13 and the electronic device 1400 of FIG. 14 may be different electronic devices participating in the video conference.

The electronic device 1400 of FIG. 14 has the same overall configuration as the above-described AI encoding apparatus 700, and is different from the AI encoding apparatus 700 in that it additionally transmits importance information to the server.

The electronic device 1400 participating in the video conference transmits an AI downscaled image to the server by performing AI downscaling regardless of importance information in order to reduce data usage, but, in response to the video conference image transmitted by the electronic device 1400, the electronic device 1300 or the server determines whether to AI-upscale the video conference image based on the importance.

Referring to FIG. 14, the electronic device 1400 may include an AI encoder 1410 and a transmitter 1430. The AI encoder 1410 may include an AI down-scaler 1411, a first encoder 1412, a data processor 1413, and an AI setter 1414.

In FIG. 14, the AI encoder 1410 and the transmitter 1430 are illustrated as separate devices, but the AI encoder 1410 and the transmitter 1430 may be implemented through one processor. In this case, the AI encoder 1410 and the transmitter 1430 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The AI encoder 1410 and the transmitter 1430 may be configured by a plurality of processors. In this case, the AI encoder 1410 and the transmitter 1430 may be implemented as a combination of dedicated processors, or may be implemented through a combination of software and a plurality of general-purpose processors such as an AP, a CPU, or a GPU.

According to an embodiment, the first encoder 1412 may be implemented as a first processor, the AI down-scaler 1411, the data processor 1413, and the AI setter 1414 may be implemented as a second processor different from the first processor, and the transmitter 1430 may be implemented as a third processor different from the first processor and the second processor.

The AI encoder 1410 performs AI down-scaling on an original image of the electronic device 1400 participating in the video conference and first encoding on an AI-down-scaled first image, and transmits AI encoding data and importance information to the transmitter 1430. The transmitter 1430 transmits the AI encoding data and the importance information to the server that manages the video conference.

Image data includes data obtained as a result of performing the first encoding on the first image. The image data may include data obtained based on pixel values in the first image, for example, residual data that is a difference between the first image and prediction data of the first image. The image data also includes pieces of information used during the first encoding performed on the first image. For example, the image data may include prediction mode information, motion information, and information related to quantization parameter used during the first encoding performed on the first image.

AI data includes pieces of information enabling the AI up-scaler 1333 of the electronic device 1300 or an AI up-scaler 1533 of a server 1500 to perform AI upscaling on the second image to an up-scaling target corresponding to a down-scaling target of a first DNN. For example, the AI data may include difference information between the original image and the first image. For example, the AI data may include information related to the first image. The information related to the first image may include information about at least one of the resolution of the first image, a bitrate of the image data obtained as the result of performing first encoding on the first image, or a codec type used during the first encoding of the first image.

According to an embodiment, the AI data may include an identifier of mutually agreed DNN setting information such that the AI up-scaling is performed on the second image to the up-scaling target corresponding to the down-scaling target of the first DNN.

According to an embodiment, the AI data may include DNN setting information settable in a second DNN.

The AI down-scaler 1411 may obtain the first image by performing the AI down-scaling on the original image through the first DNN. The AI down-scaler 1411 may perform the AI down-scaling on the original image by using the DNN setting information provided by the AI setter 1414. The AI setter 1414 may determine the down-scaling target of the original image, based on a pre-determined standard.

In order to obtain the first image matching the down-scaling target, the AI setter 1414 may store a plurality of pieces of DNN setting information settable in the first DNN. The AI setter 1414 obtains DNN setting information corresponding to the down-scaling target from among the plurality of pieces of DNN setting information, and provides the obtained DNN setting information to the AI down-scaler 1411.

Each of the plurality of pieces of DNN setting information may be trained to obtain the first image of pre-determined resolution and/or pre-determined quality. For example, any one piece of DNN setting information among the plurality of pieces of DNN setting information may include pieces of information for obtaining a first image of a resolution that is half the resolution of the original image, for example, a first image of 540p that is half 1080p of the original image, and another piece of DNN setting information may include pieces of information for obtaining a first image of a resolution that is quarter the resolution of the original image, for example, a first image of 270p that is quarter 1080p of the original image.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 1414 may provide, to the AI down-scaler 1411, the DNN setting information obtained by combining some values selected from values in the lookup table, based on the down-scaling target.

According to an embodiment, the AI setter 1414 may determine a structure of DNN corresponding to the down-scaling target, and may obtain the DNN setting information, for example, parameters of a filter kernel, corresponding to the determined structure of DNN.

The plurality of pieces of DNN setting information for performing the AI down-scaling on the original image may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 1411 may set the first DNN with the DNN setting information determined to perform the AI down-scaling on the original image to obtain the first image of certain resolution and/or certain quality through the first DNN. When the DNN setting information for performing the AI down-scaling on the original image is obtained from the plurality of pieces of DNN setting information, each layer in the first DNN may process input data based on pieces of information included in the DNN setting information.

In some cases, in order to obtain the first image, the AI setter 1414 may store one piece of DNN setting information settable in the first DNN. For example, the AI setter 1414 obtains one piece of DNN setting information for AI-downscaling the original image of 1080p to the first image of 540p, and provides the obtained one piece of DNN setting information to the AI down-scaler 1411.

A method, performed by the AI setter 1414, of determining the down-scaling target will now be described. The down-scaling target may indicate, for example, by how much is resolution decreased from the original image to obtain the first image.

The AI setter 1414 obtains one or more pieces of input information. According to an embodiment, the input information may include at least one of a target resolution of the first image, a target bitrate of the image data, a bitrate type of the image data (e.g., a variable bitrate type, a constant bitrate type, or an average bitrate type), a color format (luminance component, chrominance component, red component, green component, blue component, or the like) to which AI downscaling is applied, a codec type for the first encoding of the first image, compression history information, and a resolution of the original image, or a type of the original image.

The one or more pieces of input information may include information previously stored in the electronic device 1400 or received from a user.

The AI setter 1414 controls an operation of the AI down-scaler 1411, based on the input information. According to an embodiment, the AI setter 1414 may determine the down-scaling target according to the input information, and may provide DNN setting information corresponding to the determined down-scaling target to the AI down-scaler 1411.

According to an embodiment, the AI setter 1414 may transmit at least a portion of the input information to the first encoder 1412 so that the first encoder 1412 may perform first encoding on the first image via a bitrate of a certain value, a bitrate of a certain type, and a certain codec.

According to an embodiment, the AI setter 1414 may determine the down-scaling target based on at least one of a compression ratio (for example, a resolution difference between the original image and the first image, target bitrate, or the like), compression quality (for example, type of bitrate), compression history information, or a type of the original image.

For example, the AI setter 1414 may determine the down-scaling target based on the compression ratio, the compression quality, or the like, which is pre-set or input from a user.

As another example, the AI setter 1414 may determine the down-scaling target by using the compression history information stored in the electronic device 1400. For example, according to the compression history information usable by the electronic device 1400, encoding quality, a compression ratio, or the like preferred by the user may be determined, and the down-scaling target may be determined according to the encoding quality determined based on the compression history information. For example, the resolution, quality, or the like of the first image may be determined according to the encoding quality that has been used most often according to the compression history information.

As another example, the AI setter 1414 may determine the down-scaling target based on the encoding quality that has been used more frequently than a certain threshold value (for example, average quality of the encoding quality that has been used more frequently than the certain threshold value), according to the compression history information.

As another example, the AI setter 1414 may determine the down-scaling target, based on the resolution, type (for example, a file format), or the like of the original image.

According to an embodiment, when the original image includes a plurality of frames, the AI setter 1414 may independently obtain DNN setting information for a certain number of frames, and may provide the independently-obtained DNN setting information to the AI down-scaler 1411.

According to an embodiment, the AI setter 1414 may divide the frames included in the original image into a certain number of groups, and independently obtain the DNN setting information for each group. The same or different pieces of DNN setting information may be obtained for each group. The number of frames included in the groups may be the same or different according to each group.

According to another embodiment, the AI setter 1414 may independently determine DNN setting information for each frame forming the original image. The same or different pieces of DNN setting information may be obtained for each frame.

An exemplary structure of the first DNN on which AI downscaling is based has been described above with reference to FIG. 8, and thus a description thereof will be omitted.

According to an embodiment, the AI down-scaler 1411 may include at least one ALU for a convolution operation and an operation of an activation layer. The ALU may be implemented as a processor. For the convolution operation, the ALU may include a multiplier that performs a multiplication operation between the sample values of the original image or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tan h function, or ReLU function, and a comparator that compares a result of the multiplication with a predetermined value to determine whether to transmit an input sample value to the next layer.

According to another embodiment, the AI down-scaler 1411 AI-downscales the original image based on the one piece of DNN setting information for AI-downscaling the original image of 1080p provided by the AI setter 1414 to the first image of 540p. In addition, the AI down-scaler 1411 may additionally receive importance information from the AI setter 1414, and, when the original image has low importance, may performer AI downscaling twice converts by using the one piece of DNN setting information for AI downscaling the original image of 1080p to the first image of 540p to obtain a first image of 270p, in order to further reduce data usage.

According to another embodiment, the AI down-scaler 1411 AI-downscales the original image twice, based on the one piece of DNN setting information for AI-downscaling the original image of 1080p provided by the AI setter 1414 to the first image of 540p regardless of importance. In this case, data usage may be further reduced by AI downscaling the original image of 1080p to the first image of 270p.

Referring back to FIG. 14, the AI setter 1414 transmits the AI data to the data processor 1413. The AI data includes pieces of information enabling the AI up-scalers 1333 and 1533 to perform AI up-scaling on the second image to an up-scaling target corresponding to a down-scaling target of a first DNN. Upon receiving the first image from the AI down-scaler 1411, the first encoder 1412 may reduce an information amount of the first image by performing first encoding on the first image according to a frequency transformation-based image compression method. The image data may be obtained as a result of the first encoding via a certain codec (for example, MPEG-2, H.264, MPEG-4, HEVC, VC-1, VP8, VP9, or AV1). The image data may be obtained according to the rule of the certain codec, namely, according to a syntax. For example, the image data may include residual data that is a difference between the first image and prediction data of the first image, and prediction mode information, motion information, and quantization parameter related information that are used during the first encoding performed on the first image. The image data obtained as a result of the first encoding by the first encoder 1412 is provided to the data processor 1413.

The AI setter 1414 generates importance information on importance indicating whether a user of the electronic device 1400 is a presenter or a listener, and transmits the importance information to the data processor 1413. The AI setter 1414 may include the importance information in the AI data and transmit the importance information included in the AI data.

According to an embodiment, the AI setter 1414 generates the importance information as metadata separate from the AI encoding data and transmits the importance information to the data processor 1413.

The data processor 1413 generates AI encoding data including the image data received from the first encoder 1412 and the AI data received from the AI setter 1414.

According to an embodiment, the data processor 1413 may generate the AI encoding data including the image data and the AI data in a separate state. For example, the AI data may be included in a VSIF in an HDMI stream.

According to another embodiment, the data processor 1413 may include AI data in the image data obtained as a result of the first encoding by the first encoder 1412, and may generate AI encoding data including the image data. For example, the data processor 1413 may generate image data in the form of one bitstream by combining a bitstream corresponding to the image data with a bitstream corresponding to the AI data. To this end, the data processor 1413 may represent the AI data as bits each having a value of 0 or 1, namely, as a bitstream. According to an embodiment, the data processor 1413 may include a bitstream corresponding to the AI data in the SEI, which is an additional information area of a bitstream obtained as a result of the first encoding.

The AI encoding data is transmitted to the transmitter 1430. The transmitter 1430 transmits the AI encoding data obtained as a result of the AI encoding through a network.

According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

The data processor 1413 transmits the AI encoding data based on the AI data including the importance information to the transmitter 1430. According to another embodiment, the data processor 1413 transmits the importance information together with the AI encoding data to the transmitter 1430. The transmitter 1430 transmits the AI encoding data obtained as a result of the AI encoding and the importance information through a network.

According to an embodiment, the importance information may be generated when the electronic device 1400 first participates in the video conference, and transmitted to the server that manages the video conference, and may be transmitted to the other electronic device capable of using the importance information through the server. In other words, when the video conference is opened, the server may generate and store importance information of devices participating in the video conference, and then, when images are transmitted/received between devices, the server may distribute the importance information to the devices. For example, when a video conference image of a first device is transmitted as a second image, the server may transmit importance information of the first device as a second image.

The importance information may be changed when there is a change in the importance of the electronic device 1400, and transmitted to the server that manages the video conference, and may be transmitted to the other electronic device capable of using the importance information through the server.

Unlike the electronic device 1300 of FIG. 13 and the electronic device 1400 of FIG. 14, an electronic device that does not support AI upscaling and AI downscaling may not generate and transmit the AI data or not obtain and process the AI data. Therefore, the electronic device participating in the video conference without supporting AI downscaling and AI upscaling transmits, to the server, image data obtained by encoding a video conference original image without changes, and displays an image reconstructed by decoding video conference image data obtained by the server without changes.

Meanwhile, the electronic device that does not support AI downscaling and AI upscaling may transmit importance information about the importance of the non-supporting electronic device as metadata separately from the image data or may include the importance information in the image data and transmit the importance information included in the image data.

Hereinafter, a "first electronic device" refers to an electronic device that supports AI downscaling for transmitting an image for a video conference to a server that participates in a video conference and manages the video conference, a "second electronic device" refers to an electronic device that participates in the video conference and receives an image, which received by the server from the first electronic device or a third electronic device, and the "third electronic device" refers to an electronic device that does not support AI downscaling for transmitting an image for a video conference to a server that participates in the video conference and manages the video conference. The terms "first electronic device", "second electronic device", and "third electronic device" are provided to describe an embodiment, but are not limited thereto.

Hereinafter, "first image data", "second image data", "third image data", "fourth image data", "fifth image data", etc. are used to distinguish pieces of image data from one another, and thus embodiments are not limited thereto.

Figure 15:
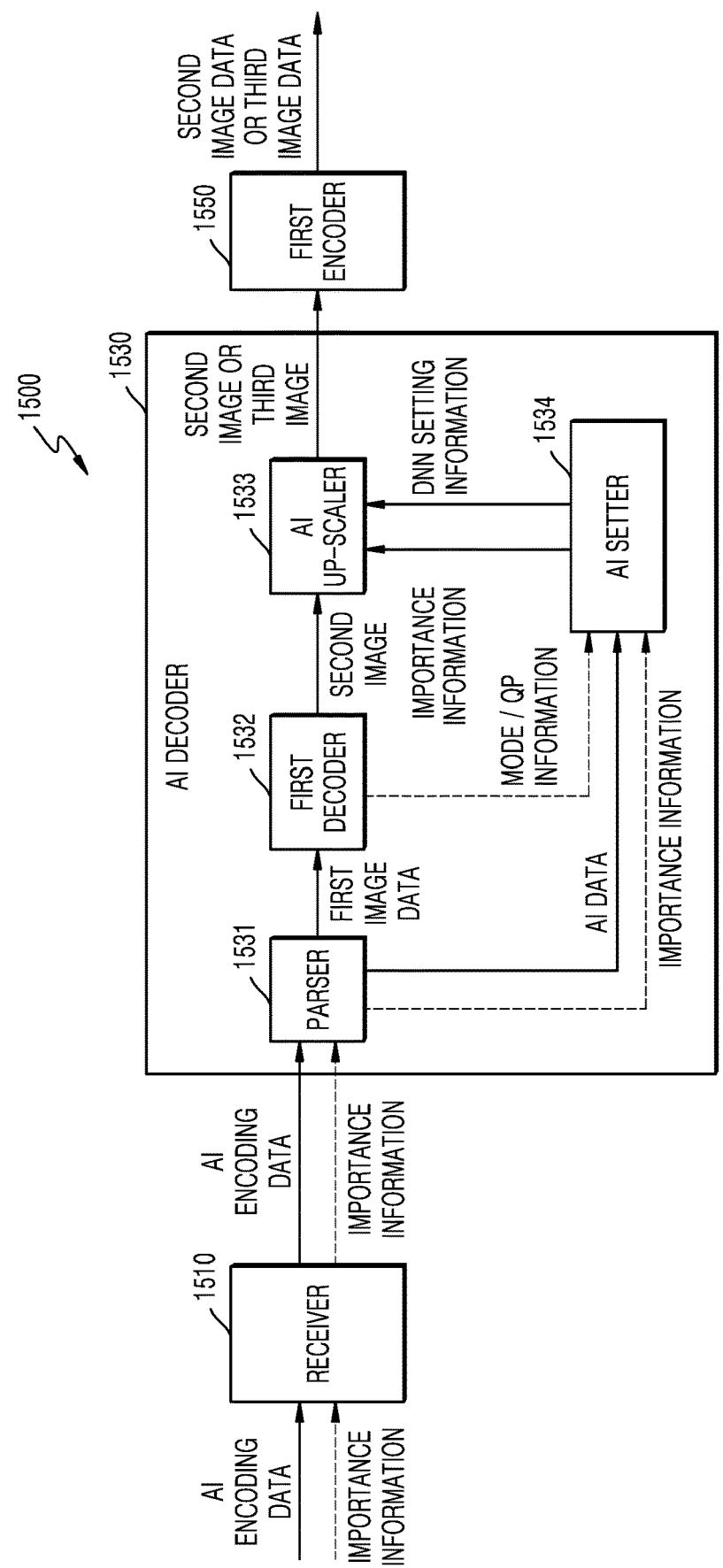
FIG. 15 is a block diagram illustrating a configuration of a server for AI upscaling a video conference image according to whether an electronic device of a participant supports AI upscaling and importance information during a video conference, according to an embodiment.

FIG. 15 is a block diagram illustrating a configuration of a server for AI upscaling a video conference image according to whether an electronic device of a participant supports AI upscaling and importance information during a video conference, according to an embodiment.

Referring to FIG. 15, the server 1500 may include a receiver 1510, an AI decoder 1530, and a first encoder 1550. The AI decoder 1530 may include a parser 1531, a first decoder 1532, the AI up-scaler 1533, and an AI setter 1534.

In FIG. 15, the receiver 1510, the AI decoder 1530, and the first encoder 1550 are illustrated as separate devices. However, the receiver 1510, the AI decoder 1530, and the first encoder 1550 may be implemented through one processor. In this case, the receiver 1510, the AI decoder 1530, and the first encoder 1550 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The receiver 1510, the AI decoder 1530, and the first encoder 1550 may be configured by a plurality of processors. In this case, the receiver 1510, the AI decoder 1530, and the first encoder 1550 may be implemented as a combination of dedicated processors, or may be implemented through a combination of software and a plurality of general-purpose processors such as an AP, a CPU, or a GPU.

According to an embodiment, the receiver 1510 and the parser 1531 may be implemented as a first processor, the first decoder 1532 may be implemented as a second processor different from the first processor, the AI up-scaler 1533 and the AI setter 1534 may be implemented as a third processor different from the first processor and the second processor, and the first encoder 1550 may be implemented as a fourth processor different from the first processor, the second processor, and the third processor.

The receiver 1510 receives, from a first electronic device participating in a video conference, AI encoding data obtained as a result of AI encoding and importance information of the first electronic device. For example, the AI encoding data may be a video file having a file format such as mp4 or mov. The AI encoding data obtained by the receiver 1510 from the first electronic device is data related to the first image obtained by the first electronic device AI-downscaling the original image.

The receiver 1510 may receive, through a communication network, the AI encoding data transmitted by the first electronic device and the importance information of the first electronic device. The receiver 1510 outputs the AI encoding data and the importance information to the parser 1531 of the AI decoder 1530. The importance information may be transmitted by being included in AI data of the AI encoding data. According to an embodiment, the importance information may be received as metadata separately from the AI encoding data from the first electronic device.

When the second electronic device receiving the video conference image from the server supports AI upscaling, the AI encoding data and the importance information of the first electronic device are bypassed through the server 1500 and transmitted to the second electronic device. In other words, the server performs only the role of simply transmitting files. Whether the second electronic device supports AI upscaling may be determined by whether the AI data is included in data transmitted from the second electronic device to the server or whether information indicating that AI upscaling is supported is received.

The parser 1531 parses the AI encoding data, and transmits image data generated as a result of first encoding of the video conference image to the first decoder 1532 and transmits the AI data and the importance information to the AI setter 1534. Because the AI data is obtained from the first electronic device, it may be seen that the first electronic device supports AI downscaling.

According to an embodiment, the parser 1531 may parse the image data and the AI data separately included in the AI encoding data. The parser 1531 may distinguish the image data and the AI data included in the AI encoding data, by reading a header within the AI encoding data. The parser 1331 may also distinguish AI-upscaling-related AI data included in the AI data from importance information on the video conference image.

The structure of the AI encoding data including the AI data and the image data separated from each other has been described above with reference to FIG. 9, and thus a description thereof will be omitted.

According to another embodiment, the parser 1531 may parse the image data from the AI encoding data, extract the AI data from the image data, transmit the AI data to the AI setter 1534, and transmit the remaining image data to the first decoder 1532. In other words, the AI data may be included in the image data. For example, the AI data may be included in SEI, which is an additional information area of a bitstream corresponding to the image data. The structure of the AI encoding data including the image data including the AI data has been described above with reference to FIG. 10, and thus a description thereof will be omitted.

According to another embodiment, the parser 1531 may split the bitstream corresponding to the image data into a bitstream to be processed by the first decoder 1532 and a bitstream corresponding to the AI data, and may output the two bitstreams to the first decoder 1532 and the AI setter 1534, respectively.

The parser 1531 may verify that the image data included in the AI encoding data is image data obtained via a certain codec (for example, MPEG-2, H.264 AVC, MPEG-4, HEVC, VC-1, VP8, VP9, or AV1). In this case, corresponding information may be transmitted to the first decoder 1532 such that the image data is processed via the verified codec.

The first decoder 1532 reconstructs a second image corresponding to a first image obtained by AI downscaling the video conference original image, based on the image data received from the parser 1531. The second image obtained by the first decoder 1532 is provided to the AI up-scaler 1533.

The importance information may also be provided by the AI setter 1534 to the AI up-scaler 1533.

The AI up-scaler 1533 provides the second image without changes to the first encoder 1550 or provides to the first encoder 1550 a third image obtained by AI upscaling the second image, according to the importance information.

In detail, the AI up-scaler 1533 provides, to the first encoder 1550, the third image obtained by AI-upscaling the second image, when the importance information represents that the user of the first electronic device is a presenter, and provides the second image to the first encoder 1550 when the importance information represents that the user of the first electronic device is a listener.

According to an embodiment, the importance information may be flag information set to be 1 when the user of the other electronic device is a presenter and set to be 0 when the user is a listener.

According to an embodiment, when a video conference starts, the server 1500 may obtain and store the importance information of the first electronic device from the first electronic device participating in the video conference, and, when the second electronic device uses the importance information, the server 1500 may transmit the importance information to the second electronic device, and, when the importance is changed, the server 1500 may obtain and store changed importance information from the first electronic device, and, when the second electronic device uses the importance information, the server 1500 may transmit the importance information to the second electronic device. In other words, the importance information is not always transmitted, but the changed importance information may be transmitted when a video conference starts and when there is a change in importance. When the second electronic device does not support AI upscaling, the server 1500 obtains and stores the importance information of the first electronic device received when the video conference starts, and, when the importance of the first electronic device is changed while performing AI upscaling based on the importance information, obtains and updates changed importance information of the first electronic device, and performs AI upscaling based on the updated importance information. When the second electronic device supports AI upscaling, the server 1500 transmits, to the second electronic device, the importance information of the first electronic device received when the video conference starts or the changed importance information of the first electronic device.

According to an embodiment, first decoding related information, such as prediction mode information, motion information, quantization parameter information, or the like, may be provided by the first decoder 1532 to the AI setter 1534. The first decoding related information may be used to obtain DNN setting information.

The AI data provided to the AI setter 1534 includes pieces of information enabling the second image to be processed via AI up-scaling. Here, an up-scaling target of the second image should correspond to a down-scaling target of a first DNN. Accordingly, the AI data needs to include information for verifying the down-scaling target of the first DNN.

Examples of the information included in the AI data include difference information between resolution of the original image during the video conference and resolution of the first image obtained by AI-downscaling the original image, and information related to the first image.

The difference information may be expressed as information about a resolution conversion degree of the first image compared to the original image (for example, resolution conversion rate information). Because the resolution of the first image is verified through the resolution of the reconstructed second image and the resolution conversion degree is verified accordingly, the difference information may be expressed only as resolution information of the original image. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image may include information about at least one of the resolution of the first image, a bitrate of the image data obtained as the result of performing first encoding on the first image, or a codec type used during the first encoding of the first image.

The AI setter 1534 may determine the up-scaling target of the second image, based on at least one of the difference information or the information related to the first image, which are included in the AI data. The up-scaling target may indicate, for example, to what degree resolution is to be up-scaled for the second image. When the up-scaling target is determined, the AI up-scaler 1533 performs AI up-scaling on the second image through a second DNN to obtain the third image corresponding to the up-scaling target.

A method, performed by the AI setter 1534, of determining an up-scale target, and a method, performed by the AI up-scaler 1533, of AI up-scaling the second image according to the up-scaling target will now be described.

According to an embodiment, the AI setter 1534 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI setter 1534 may obtain the DNN setting information for performing AI up-scaling on the second image, among the plurality of pieces of DNN setting information.

Each of the plurality of pieces of DNN setting information used at this time is information for obtaining a reconstructed image of pre-determined resolution and/or pre-determined quality, and is trained jointly with a first DNN.

For example, one piece of DNN setting information among the plurality of pieces of DNN setting information may include pieces of information for obtaining a reconstructed image of resolution twice higher than the resolution of the second image, for example, the third image of 1080p twice higher than 540p of the second image, or pieces of information for obtaining a reconstructed image of resolution four times higher than the resolution of the second image, for example, the third image of 1080p four times higher than 270p of the second image.

A training method of a DNN for AI downscaling and a training method of a DNN for AI upscaling have already described above in detail with reference to FIGS. 11 and 12, and thus descriptions thereof will be omitted. However, each DNN may be trained in consideration of the resolution of an image used during a video conference. For example, when the size of the original image used in the video conference is 1080p, the DNN for AI downscaling may be trained to mainly output a first image of 540p, which is ½ the size of the original image, or a first image of 270p, which is ¼ the size of the original image, and the DNN for AI upscaling may be trained to output a third image of 1080p from a second image of 540p or a second image of 270p.

Each of the plurality of pieces of DNN setting information is obtained jointly with DNN setting information of the first DNN of the other electronic device, and the AI setter 1534 obtains one piece of DNN setting information among the plurality of pieces of DNN setting information according to an enlargement ratio corresponding to a reduction ratio of the DNN setting information of the first DNN. To this end, the AI setter 1534 may verify information of the first DNN. In order for the AI setter 1534 to verify the information of the first DNN, the server 1500 according to an embodiment receives AI data including the information of the first DNN from an electronic device participating in the video conference.

In other words, the AI setter 1534 may verify information targeted by DNN setting information of the first DNN used to obtain the first image and obtain the DNN setting information of the second DNN trained jointly with the DNN setting information of the first DNN, by using pieces of information received from the electronic device participating in the video conference.

When DNN setting information for performing the AI up-scaling on the second image is obtained from among the plurality of pieces of DNN setting information, the obtained DNN setting information may be transmitted to the AI up-scaler 1533, and input data may be processed based on the second DNN operating according to the obtained DNN setting information.

For example, when any one piece of DNN setting information is obtained, the AI up-scaler 1533 may set the number of filter kernels included in each of the first, second, and third convolution layers 310, 330, and 350 of the second DNN 300 of FIG. 3, and the respective parameters of the filter kernels to be values included in the obtained DNN setting information.

In detail, when parameters of a filter kernel of 3×3 used in any one convolution layer of the second DNN of FIG. 4 are {1, 1, 1, 1, 1, 1, 1, 1, 1} and there is a change in DNN setting information, the AI up-scaler 1533 may replace the parameters of the filter kernel with {2, 2, 2, 2, 2, 2, 2, 2, 2}, which are parameters included in the changed DNN setting information.

The AI setter 1534 may obtain the DNN setting information for AI up-scaling the second image from among the plurality of pieces of DNN setting information, based on information included in the AI data, and the AI data used to obtain the DNN setting information will now be described.

According to an embodiment, the AI setter 1534 may obtain the DNN setting information for AI up-scaling the second image from among the plurality of pieces of DNN setting information, based on difference information included in the AI data. For example, when it is verified that the resolution (for example, 1080p) of the original image is twice higher than the resolution (for example, 540p) of the first image, based on the difference information, the AI setter 1534 may obtain the DNN setting information for increasing the resolution of the second image two times.

According to another embodiment, the AI setter 1534 may obtain the DNN setting information for AI up-scaling the second image from among the plurality of pieces of DNN setting information, based on the information related to the first image included in the AI data. The AI setter 1534 may pre-determine a mapping relationship between pieces of image-related information and pieces of DNN setting information, and obtain the DNN setting information mapped to the information related to the first image.

A plurality of pieces of DNN setting information for AI downscaling and a plurality of pieces of DNN setting information for AI upscaling may be obtained through the training process described above with reference to FIGS. 11 and 12. In some cases, a single piece of DNN setting information for AI downscaling and a single piece of DNN setting information for AI upscaling may be obtained through the training process described above with reference to FIGS. 11 and 12. In other words, a pair of pieces of DNN setting information may be obtained for AI downscaling and AI upscaling. In this case, one piece of DNN setting information for AI upscaling may be stored in an AI setter.

In detail, the AI setter 1534 may obtain one piece of DNN setting information for AI up-scaling the second image corresponding to a downscaled first image of 540p to the third image of 1080p, based on the information included in the AI data. In this case, the information included in the AI data is information indicating that the image data transmitted together is about an image obtained through AI downscaling, and the AI setter 1534 provides one piece of DNN setting information stored in the AI setter 1534 to the AI up-scaler 1533.

The AI up-scaler 1533 performs AI upscaling based on the DNN setting information provided by the AI setter 1534 to obtain a third image, and provides the third image to the first encoder 1550.

According to an embodiment, when the DNN setting information provided by the AI setter 1534 is one piece of pre-determined DNN setting information (that is, DNN setting information with a scaling factor of 2) for AI upscaling the second image corresponding to the first image of 540p, which is a result of downscaling the original image of 1080p, the first image is 270p, the original image is 1080p, and the importance is high, the AI up-scaler 1533 obtains a third image of 1080p by performing AI upscaling twice by using the one piece of pre-determined DNN setting information, and provides the third image to the first encoder 1550. The reason for performing the AI upscaling twice is to match the resolution of the third image to the original image.

According to another embodiment, when the DNN setting information provided by the AI setter 1534 is one piece of pre-determined DNN setting information for AI upscaling the second image corresponding to the downscaled first image of 540p, the first image is 270p, the original image is 1080p, and the importance is low, the AI up-scaler 1533 provides the second image of 270p to the first encoder 1550 without performing AI upscaling.

According to another embodiment, when the DNN setting information provided by the AI setter 1534 is one piece of pre-determined DNN setting information for AI upscaling the second image corresponding to the downscaled first image of 540p, the first image is 270p, the original image is 1080p, and the importance is low, the AI up-scaler 1533 obtains a third image of 540p by performing AI upscaling once by using the one piece of pre-determined DNN setting information, and provides the third image to the first encoder 1550.

The AI up-scaler 1533 does not perform AI upscaling based on the importance information provided by the AI setter 1534, and provides the second image to the first encoder 1550.

The first encoder 1550 obtains second image data by performing first encoding on the second image corresponding to the downscaled image of the first electronic device participating in the video conference, which is provided by the AI up-scaler 1533, or obtains third image data by performing first encoding on the third image corresponding to the original image, which is provided by the AI up-scaler 1533.

The first encoder 1550 transmits the second image data or the third image data to the second electronic device participating in the video conference.

Figure 16:
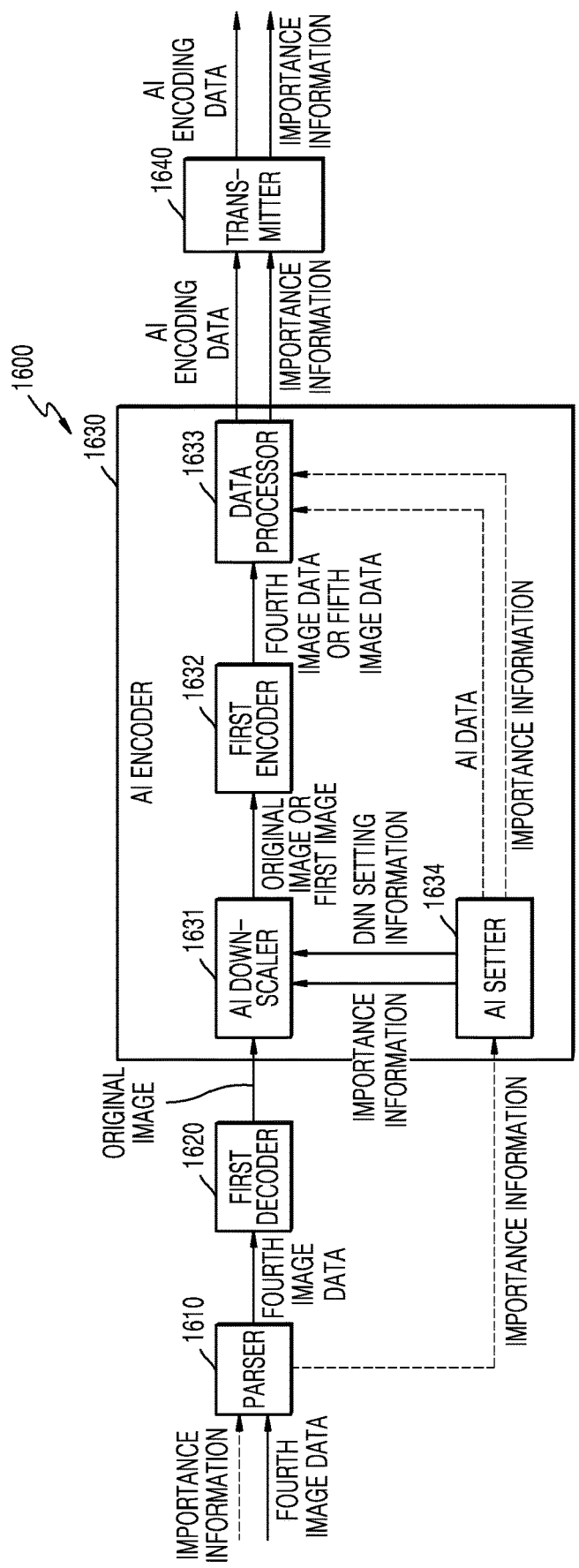
FIG. 16 is a block diagram of a configuration of a server that manages a video conference and performs AI downscaling on a video conference image, according to an embodiment.

FIG. 16 is a block diagram of a configuration of a server 1600 that manages a video conference that performs AI downscaling on a video conference image, according to an embodiment.

Referring to FIG. 16, the server 1600 may include a parser 1610, a first decoder 1620, an AI encoder 1630, and a transmitter 1640. The AI encoder 1630 may include an AI down-scaler 1631, a first encoder 1632, a data processor 1633, and an AI setter 1634.

In FIG. 16, the parser 1610, the first decoder 1620, the AI encoder 1630, and the transmitter 1640 are illustrated as separate devices. However, the parser 1610, the first decoder 1620, the AI encoder 1630, and the transmitter 1640 may be implemented as one processor. In this case, the parser 1610, the first decoder 1620, the AI encoder 1630, and the transmitter 1640 may be implemented as a dedicated processor, or may be implemented a combination of software and a general-purpose processor such as AP, CPU, or GPU. The dedicated processor may include a memory for implementing an embodiment of the disclosure or a memory processing unit for using an external memory.

The parser 1610, the first decoder 1620, the AI encoder 1630, and the transmitter 1640 may be configured by a plurality of processors. In this case, the parser 1610, the first decoder 1620, the AI encoder 1630, and the transmitter 1640 may be implemented as a combination of dedicated processors, or may be implemented through a combination of software and a plurality of general-purpose processors such as an AP, a CPU, or a GPU.

According to an embodiment, the parser 1610 may be implemented as a first processor, the first decoder 1620 may be implemented as a second processor different from the first processor, the AI encoder 1630 may be implemented as a third processor different from the first processor and the second processor, and the transmitter 1640 may be implemented as a fourth processor different from the first processor, the second processor, and the third processor.

The parser 1610 obtains fourth image data and importance information from a third electronic device. When the third electronic device supports AI downscaling, the server 1600 does not need to perform AI downscaling, and thus the fourth image data obtained by the server 1600 from the third electronic device is image data for the original image.

When a second electronic device supports AI upscaling, the server 1600 transmits, to the second electronic device, AI encoding data of a first image obtained by AI downscaling an original image of the third electronic device and importance information, regardless of the importance information.

When the second electronic device does not support AI upscaling, the server 1600 determines whether to perform AI downscaling on the original image of the third electronic device, based on the importance information. When the importance is high, the server 1600 transmits, to the second electronic device, the fourth image data of the original image of the third electronic device or image data generated by newly performing first encoding on the original image, and, when the importance is low, the server 1600 transmits, to the second electronic device, fifth image data of an image obtained by AI downscaling the original image of the third electronic device.

When the second electronic device supports AI upscaling, the server 1500 transmits the AI encoding data obtained from the first electronic device to the second electronic device without changes. When the second electronic device does not support AI upscaling, the server 1500 transmits the third image data for the third image obtained by performing the AI upscaling according to the importance of the first electronic device to the second electronic device, or transmits the second image data for the AI-downscaled second image to the second electronic device without performing the AI upscaling.

When the second electronic device supports AI upscaling, the server 1600 transmits the AI encoding data obtained by AI downscaling the original image of the third electronic device to the second electronic device. When the second electronic device does not support AI upscaling, the server 1600 transmits the fifth image data for the first image obtained by performing the AI downscaling according to the importance of the third electronic device to the second electronic device, or transmits the fourth image data corresponding to the original image to the second electronic device without performing the AI downscaling.

In other words, the server 1500 of FIG. 15 and the server 1600 of FIG. 16 represent structures configured to perform different roles in a server that manages a video conference in which the first electronic device, the second electronic device, and the third electronic device participate, and the server 1500 of FIG. 15 and the server 1600 of FIG. 16 are the same servers.

Because the parser 1610 needs to decode image data into an image in order to perform AI downscaling, the parser 1610 provides the fourth image data for the original image to the first decoder 1620, and provides the importance information to the AI setter 1634. The importance information may be transmitted by being included in the fourth image data for the original image. The importance information may be transmitted as metadata separately from the fourth image data for the original image.

The first decoder 1620 decodes the image data (fourth image data) for the original image of the third electronic device to reconstruct the original image of the video conference, and provides the reconstructed original image to the AI down-scaler 1631.

The AI encoder 1630 performs first encoding on the first image AI obtained by AI upscaling and AI downscaling the original image of the third electronic device participating in the video conference when the second electronic device participating in the video conference supports AI upscaling, and transmits AI encoding data and importance information to the transmitter 1640.

The AI encoder 1630 determines whether to perform AI downscaling on the original image of the third electronic device participating in the video conference, based on the importance information received from the parser 1610 when the second electronic device participating in the video conference does not support AI upscaling, performs first encoding on the original image or the AI-downscaled first image according to the importance information, and transmits AI encoding data and importance information to the transmitter 1640. In this case, the AI encoding data is the fourth image data for the original image or the fifth image data for the AI downscaled first image, and does not include AI data related to the AI downscaling. This is because the second electronic device does not support AI upscaling and thus does not need AI data.

The transmitter 1640 transmits the AI encoding data and the importance information to the second electronic device that manages the video conference.

The fourth image data includes data obtained as a result of newly performing first encoding on the original image, and the fifth image data includes data obtained as a result of the first encoding of the first image. The fourth image data or the fifth image data may include data obtained based on pixel values in the original image or the first image, for example, residual data that is a difference between the original image and prediction data of the original image or residual data that is a difference between the first image and prediction data of the first image, respectively. The fourth image data or the fifth image data also includes pieces of information used during the first encoding performed on the original image or the first image, respectively. For example, the fourth image data or the fifth image data may include prediction mode information, motion information, and information related to quantization parameter used during the first encoding performed on the original image or the first image, respectively.

The AI data includes pieces of information enabling the AI up-scaler 1333 of the electronic device 1300 to perform AI up-scaling on the second image to an up-scaling target corresponding to a down-scaling target of a first DNN. For example, the AI data may include difference information between the original image and the first image. For example, the AI data may include information related to the first image. The information related to the first image may include information about at least one of the resolution of the first image, a bitrate of the image data obtained as the result of performing first encoding on the first image, or a codec type used during the first encoding of the first image.

According to an embodiment, the AI data may include an identifier of mutually agreed DNN setting information such that the AI up-scaling is performed on the second image to the up-scaling target corresponding to the down-scaling target of the first DNN.

According to an embodiment, the AI data may include DNN setting information settable in a second DNN.

When the second electronic device supports AI upscaling, the AI down-scaler 1631 may obtain the first image by performing the AI down-scaling on the original image through the first DNN, regardless of the importance information. The AI down-scaler 1631 may perform the AI down-scaling on the original image by using the DNN setting information provided by the AI setter 1634.

When the second electronic device does not support AI upscaling, the AI down-scaler 1631 determines whether to perform AI downscaling based on the importance information provided from the AI setter 1634.

When the importance information indicates that the user of the third electronic device is a presenter, the AI down-scaler 1631 provides the original image to the first encoder 1632 without performing AI downscaling.

When the importance information indicates that the user of the third electronic device is a participant, the AI down-scaler 1631 may obtain the first image by performing the AI down-scaling on the original image through the first DNN. The AI down-scaler 1631 may perform the AI down-scaling on the original image by using the DNN setting information provided by the AI setter 1634.

Whether the second electronic device supports AI upscaling may be determined based on whether the server 1600 obtains AI data from the second electronic device or AI upscaling support information obtained from the second electronic device.

The AI setter 1634 may determine the down-scaling target of the original image, based on a pre-determined standard.

The AI setter 1634 may provide the importance information received from the parser 1610 to the AI down-scaler 1631 to determine whether to perform the AI downscaling.

In order to obtain the first image matching the down-scaling target, the AI setter 1634 may store a plurality of pieces of DNN setting information settable in the first DNN. The AI setter 1634 obtains DNN setting information corresponding to the down-scaling target from among the plurality of pieces of DNN setting information, and provides the obtained DNN setting information to the AI down-scaler 1631.

Each of the plurality of pieces of DNN setting information may be trained to obtain the first image of pre-determined resolution and/or pre-determined quality. For example, any one piece of DNN setting information among the plurality of pieces of DNN setting information may include pieces of information for obtaining a first image of a resolution that is half the resolution of the original image, for example, a first image of 540p that is half 1080p of the original image, or pieces of information for obtaining a first image of 270p that is quarter 1080p of the original image.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 1634 may provide, to the AI down-scaler 1631, the DNN setting information obtained by combining some values selected from values in the lookup table, based on the down-scaling target.

According to an embodiment, the AI setter 1634 may determine a structure of DNN corresponding to the down-scaling target, and may obtain the DNN setting information, for example, parameters of a filter kernel, corresponding to the determined structure of DNN.

The plurality of pieces of DNN setting information for performing the AI down-scaling on the original image may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 1631 may set the first DNN with the DNN setting information determined to perform the AI down-scaling on the original image to obtain the first image of certain resolution and/or certain quality through the first DNN. When the DNN setting information for performing the AI down-scaling on the original image is obtained from the plurality of pieces of DNN setting information, each layer in the first DNN may process input data based on pieces of information included in the DNN setting information.

In some cases, in order to obtain the first image, the AI setter 1634 may store one piece of DNN setting information settable in the first DNN. For example, the AI setter 1634 obtains one piece of DNN setting information for AI-downscaling the original image of 1080p to the first image of 540p, and provides the obtained one piece of DNN setting information to the AI down-scaler 1631.

A method, performed by the AI setter 1634, of determining the down-scaling target will now be described. The down-scaling target may indicate, for example, by how much is resolution decreased from the original image to obtain the first image.

The AI setter 1634 obtains one or more pieces of input information. According to an embodiment, the input information may include at least one of a target resolution of the first image, a target bitrate of the image data, a bitrate type of the image data (e.g., a variable bitrate type, a constant bitrate type, or an average bitrate type), a color format (luminance component, chrominance component, red component, green component, blue component, or the like) to which AI downscaling is applied, a codec type for the first encoding of the first image, compression history information, and a resolution of the original image, or a type of the original image.

The one or more pieces of input information may include information previously stored in the server 1600 or received from a user.

The AI setter 1634 controls an operation of the AI down-scaler 1631, based on the input information. According to an embodiment, the AI setter 1634 may determine the down-scaling target according to the input information, and may provide DNN setting information corresponding to the determined down-scaling target to the AI down-scaler 1631.

According to an embodiment, the AI setter 1634 may transmit at least a portion of the input information to the first encoder 1632 so that the first encoder 1632 may perform first encoding on the first image via a bitrate of a certain value, a bitrate of a certain type, and a certain codec.

According to an embodiment, the AI setter 1634 may determine the down-scaling target based on at least one of a compression ratio (for example, a resolution difference between the original image and the first image, target bitrate, or the like), compression quality (for example, type of bitrate), compression history information, or a type of the original image.

For example, the AI setter 1634 may determine the down-scaling target based on the compression ratio, the compression quality, or the like, which is pre-set or input from a user.

As another example, the AI setter 1634 may determine the down-scaling target by using the compression history information stored in the server 1600. For example, according to the compression history information usable by the server 1600, encoding quality, a compression ratio, or the like preferred by a participant of the video conference may be determined, and the down-scaling target may be determined according to the encoding quality determined based on the compression history information. For example, the resolution, quality, or the like of the first image may be determined according to the encoding quality that has been used most often according to the compression history information.

As another example, the AI setter 1634 may determine the down-scaling target based on the encoding quality that has been used more frequently than a certain threshold value (for example, average quality of the encoding quality that has been used more frequently than the certain threshold value), according to the compression history information.

As another example, the AI setter 1634 may determine the down-scaling target, based on the resolution, type (for example, a file format), or the like of the original image.

According to an embodiment, when the original image includes a plurality of frames, the AI setter 1634 may independently obtain DNN setting information for a certain number of frames, and may provide the independently-obtained DNN setting information to the AI down-scaler 1631.

According to an embodiment, the AI setter 1634 may divide the frames included in the original image into a certain number of groups, and independently obtain the DNN setting information for each group. The same or different pieces of DNN setting information may be obtained for each group. The number of frames included in the groups may be the same or different according to each group.

According to another embodiment, the AI setter 1634 may independently determine (DNN setting information for each frame forming the original image. The same or different pieces of DNN setting information may be obtained for each frame.

An exemplary structure of the first DNN on which AI downscaling is based has been described above with reference to FIG. 8, and thus a description thereof will be omitted.

According to an embodiment, the AI down-scaler 1631 may include at least one ALU for a convolution operation and an operation of an activation layer. The ALU may be implemented as a processor. For the convolution operation, the ALU may include a multiplier that performs a multiplication operation between the sample values of the original image or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tan h function, or ReLU function, and a comparator that compares a result of the multiplication with a predetermined value to determine whether to transmit an input sample value to the next layer.

According to another embodiment, the AI down-scaler 1631 AI-downscales the original image based on the one piece of DNN setting information for AI-downscaling the original image of 1080p provided by the AI setter 1634 to the first image of 540p. In addition, the AI down-scaler 1631 may additionally receive importance information from the AI setter 1634, and, when the original image has low importance, may performer AI downscaling twice converts by using the one piece of DNN setting information for AI downscaling the original image of 1080p to the first image of 540p to obtain a first image of 270p, in order to further reduce data usage.

According to another embodiment, the AI down-scaler 1631 AI-downscales the original image twice, based on the one piece of DNN setting information for AI-downscaling the original image of 1080p provided by the AI setter 1634 to the first image of 540p regardless of importance. In this case, data usage may be further reduced by AI downscaling the original image of 1080p to the first image of 270p.

Referring back to FIG. 16, when the second electronic device supports AI upscaling, the AI setter 1634 transmits the AI data to the data processor 1633. The AI data includes pieces of information enabling the AI up-scaler 1333 of the electronic device 1300 to perform AI up-scaling on the second image to an up-scaling target corresponding to a down-scaling target of a first DNN. Upon receiving the first image from the AI down-scaler 1631, the first encoder 1632 may reduce an information amount of the first image by performing first encoding on the first image according to a frequency transformation-based image compression method. The image data may be obtained as a result of the first encoding via a certain codec (for example, MPEG-2, H.264, MPEG-4, HEVC, VC-1, VP8, VP9, or AV1). The image data may be obtained according to the rule of the certain codec, namely, according to a syntax. For example, the image data may include residual data that is a difference between the first image and prediction data of the first image, and prediction mode information, motion information, and quantization parameter related information that are used during the first encoding performed on the first image. The image data obtained as a result of the first encoding by the first encoder 1632 is provided to the data processor 1633.

The AI setter 1634 generates importance information on importance indicating whether the user of the third electronic device is a presenter or a listener, and transmits the importance information to the data processor 1633. The AI setter 1634 may include the importance information in the AI data and transmit the importance information included in the AI data.

According to an embodiment, the AI setter 1634 obtains the importance information as metadata separate from the AI encoding data and transmits the importance information to the data processor 1633.

When the second electronic device supports AI upscaling, the first encoder 1632 obtains the first image by performing AI downscaling on the original image by using a downscaling DNN, regardless of the importance of the third electronic device, and transmits the fifth image data obtained by first encoding the first image to the data processor 1633.

When the second electronic device does not support AI upscaling and the importance of the third electronic device indicates that the user of the third electronic device is a presenter, the first encoder 1632 transmits image data generated by newly encoding the fourth image data or the original image to the data processor 1633. When the second electronic device does not support AI upscaling and the importance of the third electronic device indicates that the user of the third electronic device is a listener, the first encoder 1632 obtains the first image by AI downscaling the original image by using the downscaling DNN, and transmits the fifth image data obtained by first encoding the first image to the data processor 1633.

When the second electronic device supports AI upscaling, the data processor 1633 generates AI encoding data including the fifth image data received from the first encoder 1632 and the AI data received from the AI setter 1634. When the second electronic device does not support AI upscaling, the data processor 1633 generates AI encoding data including no AI data but including either the fourth image data or fifth image data received from the first encoder 1632.

According to an embodiment, the data processor 1633 may generate the AI encoding data including the image data and the AI data in a separate state. For example, the AI data may be included in a VSIF in an HDMI stream.

According to another embodiment, the data processor 1633 may include AI data in the image data obtained as a result of the first encoding by the first encoder 1632, and may generate AI encoding data including the image data. For example, the data processor 1633 may generate image data in the form of one bitstream by combining a bitstream corresponding to the image data with a bitstream corresponding to the AI data. To this end, the data processor 1633 may represent the AI data as bits each having a value of 0 or 1, namely, as a bitstream. According to an embodiment, the data processor 1633 may include a bitstream corresponding to the AI data in the SEI, which is an additional information area of a bitstream obtained as a result of the first encoding.

The AI encoding data is transmitted to the transmitter 1640. The transmitter 1640 transmits the AI encoding data obtained as a result of the AI encoding through a network.

According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

The data processor 1633 transmits the AI encoding data based on the AI data including the importance information to the transmitter 1640.

According to another embodiment, the data processor 1633 transmits the importance information together with the AI encoding data to the transmitter 1640. The transmitter 1640 transmits the AI encoding data obtained as a result of the AI encoding and the importance information through a network.

According to an embodiment, the importance information may be generated when the third electronic device participates in the video conference, transmitted to the server 1600, and stored in the server 1600, and the server 1600 may transmit the stored importance information to the second electronic device when the second electronic device is able to use the stored importance information. When there is a change in the importance of the third electronic device, changed importance information may be transmitted to and stored in the server 1600, and the server 1600 may transmit the changed importance information to the second electronic device when the second electronic device is able to use the changed importance information.

When the second electronic device does not support AI upscaling, the AI setter 1634 does not transmit the importance information and the AI data to the data processor 1633, because the second electronic device only decodes and displays the image data received from the server and does not need to perform any operation based on the importance information and the AI data.

The data processor 1633 transmits the AI encoding data based on the image data including no AI data to the transmitter 1640. The transmitter 1640 transmits the fourth image data for the original image or the fifth image data for the first image to the second electronic device.

A process in which video conference images are transmitted and received by devices and a server participating in a video conference will now be described with reference to FIGS. 17 through 21.

Figure 17:
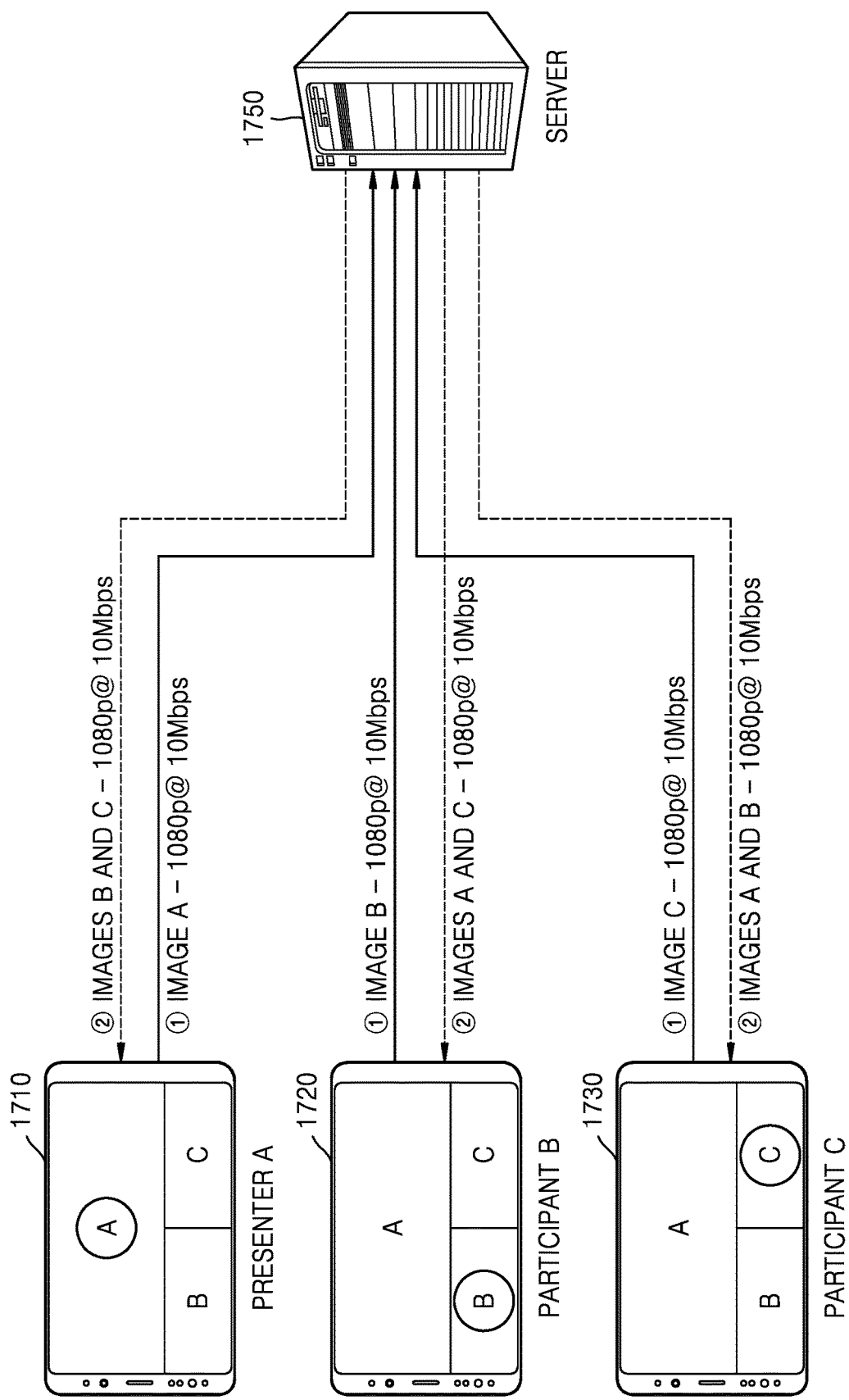
FIG. 17 is a view for explaining a data transmission relationship between electronic devices and a server in a conventional video conference.

FIG. 17 is a view for explaining a data transmission relationship between electronic devices and a server in a conventional video conference.

Referring to FIG. 17, in a video conference between three electronic devices, including an electronic device 1710 of participant (presenter) A, an electronic device 1720 of participant (listener) B, an electronic device 1730 of participant (listener) C, and a server 1750 managing the video conference, a video conference image of each electronic device is transmitted to the other electronic devices through a network and reproduced with a fixed bitrate and fixed resolution, without using AI downscaling and AI upscaling on all data.

In detail, the electronic device 1710 of presenter A transmits image data of an image of the presenter A with a resolution of 1080p to the server 1750 at 10 Mbps, the server 1750 transmits the image data of the image of the presenter A with the resolution of 1080p to the electronic devices 1720 and 1730 of the listener B and the listener C at 10 Mbps, the electronic device 1720 of the listener B transmits image data of an image of the listener B with the resolution of 1080p to the server 1750 at 10 Mbps, the server 1750 transmits the image data of the image of the listener B with the resolution of 1080p to the electronic devices 1710 and 1730 of the presenter A and the listener C at 10 Mbps, the electronic device 1730 of the listener C transmits image data of an image of the listener C with the resolution of 1080p to the server 1750 at 10 Mbps, the server 1750 transmits the image data of the image of the listener C with the resolution of 1080p to the electronic devices 1710 and 1720 of the presenter A and the listener B at 10 Mbps. In a conventional video conference, a plurality of electronic devices transmit and receive video conference images at a fixed bitrate and with fixed resolution through communication with a server.

As described above, in the conventional video conference, because a plurality of electronic devices transmit/receive image data at a fixed bitrate and with fixed resolution, data usage needs to be kept constant for high-quality images.

Figure 18:
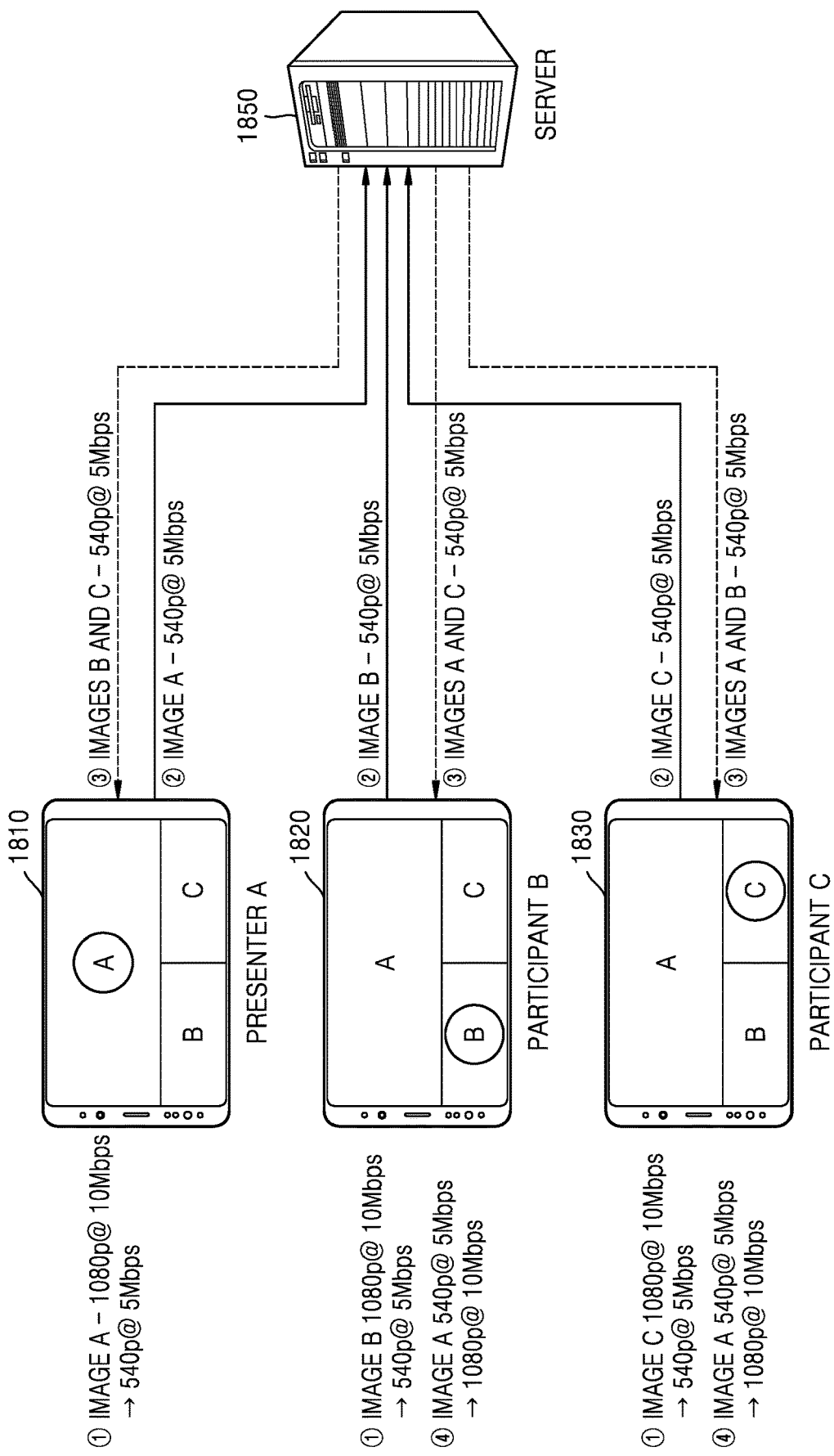
FIG. 18 is a view for explaining a data transmission relationship between electronic devices supporting AI downscaling and AI upscaling and a server supporting AI downscaling and AI upscaling in a video conference according to an embodiment.

FIG. 18 is a view for explaining a data transmission relationship between electronic devices supporting AI downscaling and AI upscaling and a server supporting AI downscaling and AI upscaling in a video conference according to an embodiment.

Referring to FIG. 18, in a video conference between three electronic devices, because an electronic device 1810 of participant (presenter) A, an electronic device 1820 of participant (listener) B, an electronic device 1830 of participant (listener) C supports both AI downscaling and AI upscaling, a video conference image of each participant is AI downscaled and transmitted, and, as needed, a AI downscaled image is AI upscaled and displayed. Accordingly, the usage of upload and download data of the electronic devices participating in the video conference is reduced and an image quality is maintained.

The electronic devices of the participants of the video conference image perform AI downscaling on the image conference image and transmits a result of the AI downscaling to the server. Because the electronic devices support both the AI downscaling and the AI upscaling, the server transmits an AI downscaled image of each electronic device to the other electronic devices without changes.

Because the participant A is a presenter, an image quality is more important to the participant A than the other participants B and C. Because an image of the presenter A may have many pieces of important information, the electronic devices of the other listeners B and C perform AI upscaling on the AI downscaled video conference image of the presenter A received from the electronic device of the presenter A through the server to reconstruct a video conference image with the original quality, and displays the reconstructed video conference image.

Because images of the remaining listeners are relatively less important than an image of the presenter, the presenter A's electronic device displays AI downscaled video conference images of the listeners B and C received from the electronic devices of the listeners B and C via the server without AI upscaling, namely, without changes. The electronic devices of the listeners B and C respectively display the listener C's AI downscaled video conference image and the listener B's AI downscaled video conference image without AI upscaling.

In detail, an electronic device 1810 of the presenter A applies AI downscaling to a video conference image of 1080p and 10 Mbps to transmit image data and AI data for a video conference image of 540p and 5 Mbps to a server 1850, the electronic device 1820 of the listener B applies AI downscaling to a video conference image of 1080p and 10 Mbps to transmit image data and AI data for a video conference image of 540p and 5 Mbps to the server 1850, and an electronic device 1830 of the listener C applies AI downscaling to a video conference image of 1080p and 10 Mbps to transmit image data and AI data for a video conference image of 540p and 5 Mbps to the server 1850.

The server 1850 transmits image data and AI data for an AI downscaled image received from each electronic device to the other electronic devices without changes. In other words, the server 1850 transmits the image data and the AI data for the image of 540p and 5 Mbps of the listener B and the image data and the AI data for the image of 540p and 5 Mbps of the listener C to the electronic device 1810 of the presenter A, transmits the image data and the AI data for the image of 540p and 5 Mbps of the presenter A and the image data and the AI data for the image of 540p and 5 Mbps of the listener C to the electronic device 1820 of the listener B, and transmits the image data and the AI data for the image of 540p and 5 Mbps of the presenter A and the image data and the AI data for the image of 540p and 5 Mbps of the listener B to the electronic device 1830 of the listener C.

Because images of the listeners B and C other than the presenter A are of relatively low importance, the electronic device 1810 of the presenter A does not perform AI upscaling on a received image of 540p and 5 Mbps of the listener B and a received image of 540p and 5 Mbps of the listener C and displays the received images without changes. Because an image of participant A, who is a presenter, is of high importance and an image of the listener C is of low importance, the electronic device 1820 of the listener B performs AI upscaling on a received image of 540p and 5 Mbps of the presenter A to obtain and display an image of 1080p and 10 Mbps, and does not perform AI upscaling on the received image of 540p and 5 Mbps of the listener C and displays the received image without changes. Because the image of participant A, who is a presenter, is of high importance and an image of the listener B is of low importance, the electronic device 1830 of the listener C performs AI upscaling on the received image of 540p and 5 Mbps of the presenter A to obtain and display an image of 1080p and 10 Mbps, and does not perform AI upscaling on the received image of 540p and 5 Mbps of the listener B and displays the received image without changes.

The importance of an electronic device may be changed by an input of the electronic device.

For example, when the listener B executes an input of activating a raise hand function (e.g., clicking a raise hand button) while the presenter A is making a presentation, the importance of the participant B is changed to indicate that the participant B is a presenter, and the importance of the presenter A is changed to indicate that the presenter A is a listener. In this case, the electronic device 1820 of the participant B who has become a presenter does not perform AI upscaling on a video conference image of 540p of the participant A who was a presenter, and displays the video conference image of 540p without changes, and the electronic device 1810 of the listener A and the electronic device 1830 of the listener C performs AI upscaling on a video conference image of 540p of the participant B who has become a presenter, according to a change in importance, and displays a video conference image of 1080p.

As another example, when the listener B executes an input of enlarging a video conference video of the listener C while the presenter A is making a presentation, the importance of the participant C is changed to indicate that the participant C is a presenter. In this case, the electronic device 1830 of the listener B performs AI upscaling on the 540p video conference image of the participant C who has been changed to a presenter, according to the change in importance, and displays a 1080p video conference image.

As another example, when the presenter A executes an input of granting the right to make a presentation to another participant B, the participant B is changed to a presenter, and thus the electronic device 1810 of the participant A and the electronic device 1830 of the participant C perform AI downscaling on an AI upscaled image of the presenter B to display a 1080p video conference image.

As another example, a plurality of electronic devices may be set as presenters. In this case, all images set as presenters may be AI upscaled to the original image.

The importance of another electronic device is determined through importance information obtained from the other electronic device through a server. The importance information may be transmitted by being included in AI data obtained from the other electronic device, or may be transmitted separately from the AI data. When a video conference starts, the importance information may be transmitted through the server, stored in each electronic device, and used. When there is a change in importance later, changed importance information may be transmitted through the server, stored in each electronic device, and used.

The importance information is set as 1 when the user of an electronic device is a presenter and set as 0 when the user is a listener. Thus, when the importance information indicates 1, AI upscaling may be performed, and, when the importance information indicates 0, AI upscaling may not be performed.

Figure 19:
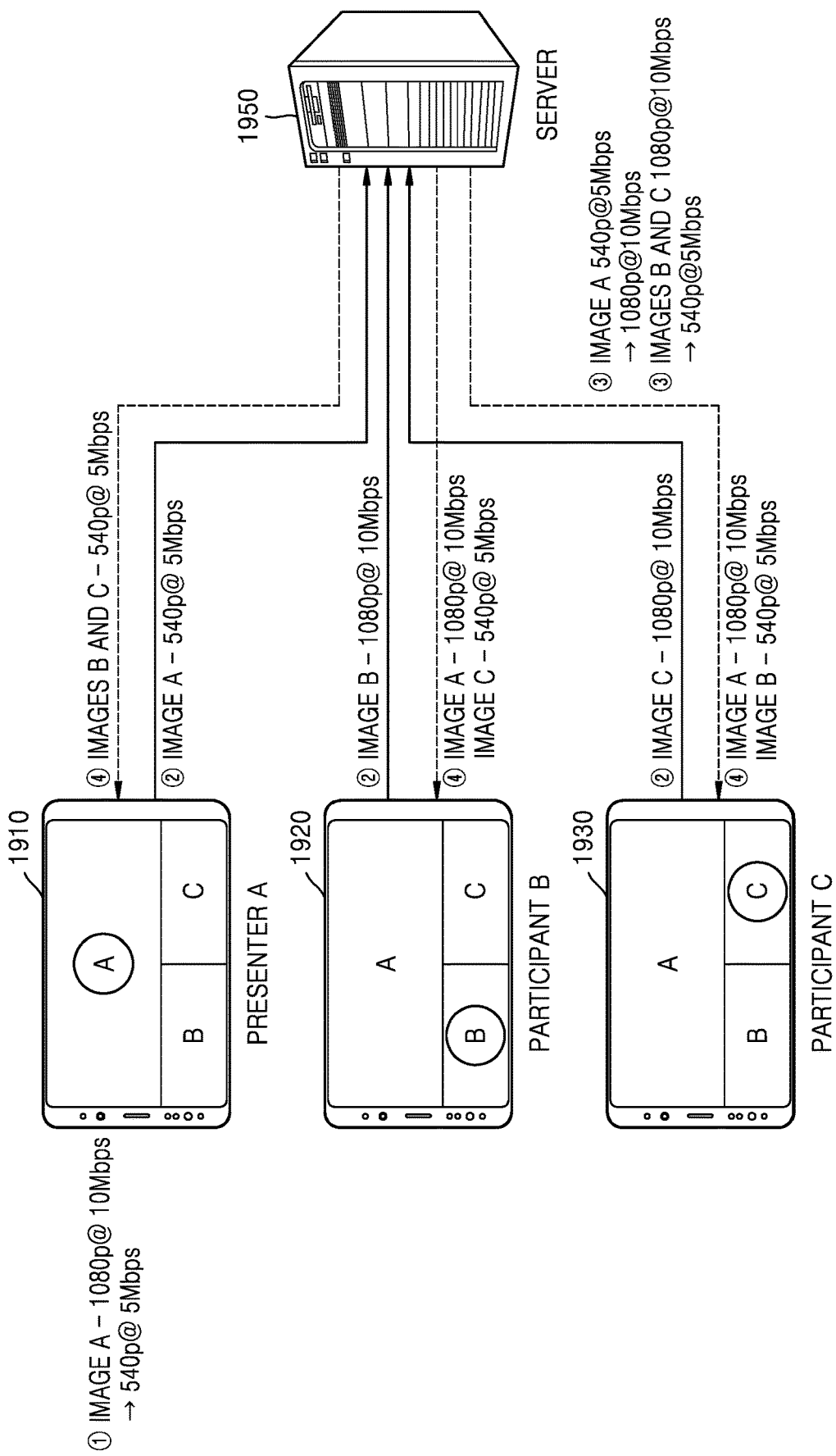
FIG. 19 is a view for explaining a data transmission relationship between an electronic device supporting AI downscaling and AI upscaling, an electronic device not supporting AI downscaling and AI upscaling, and a server supporting AI downscaling and AI upscaling, in a video conference according to an embodiment.

FIG. 19 is a view for explaining a data transmission relationship between an electronic device supporting AI downscaling and AI upscaling, an electronic device not supporting AI downscaling and AI upscaling, and a server supporting AI downscaling and AI upscaling, in a video conference according to an embodiment.

In FIG. 19, it is assumed that an electronic device 1920 of participant (listener) B and an electronic device 1930 of participant (listener) C do not support AI downscaling and AI upscaling and an electronic device 1910 of participant (presenter) A supports AI downscaling and AI upscaling.

Referring to FIG. 19, because the electronic device 1920 of the participant (listener) B and the electronic device 1930 of the participant (listener) C among three electronic devices in the video conference do not support AI downscaling, the electronic device 1920 of the listener B and the electronic device 1930 of the listener C transmit a video conference original image to a server 1950 without changes. However, because the electronic device 1910 of the participant (presenter) A supports AI downscaling, the electronic device 1910 of the presenter A transmits an AI downscaled image to the server 1950. In addition, because the server 1950 also supports AI downscaling, the server 1950 performs AI downscaling on respective original images of the electronic device 1920 of the listener B and the electronic device 1930 of the listener C to obtain AI downscaled images, and transmits the obtained AI downscaled images to the other participants. Thus, usage of uploading data for the video conference image of the electronic device of the presenter A is reduced, and usage of downloading data for the video conference images of the electronic devices of the listeners B and C is reduced.

Because the participant A is a presenter, the video conference image of the electronic device of the presenter A has high importance and the participants B and C, who are listeners, do not support AI upscaling. Thus, the server 1950 reconstructs an image by performing AI upscaling on an AI downscaled image received from the electronic device 1910 of the presenter A, and transmits the reconstructed image to the electronic device 1920 of the listener B and the electronic device 1930 of the listener C both not supporting AI upscaling. The server 1950 performs AI downscaling on the original image obtained from the electronic device 1920 of the listener B and transmits an AI downscaled image to the electronic device 1910 of the presenter A and the electronic device 1930 of the listener C. The server 1950 performs AI downscaling on the original image obtained from the electronic device 1930 of the listener C and transmit an AI downscaled image to the electronic device 1910 of the presenter A and the electronic device 1920 of the listener B.

In detail, the electronic device 1910 of the presenter A transmits, to the server 1950, image data and AI data for a first image of 540p and 5 Mbps obtained by applying AI downscaling to an original image of 1080p and 10 Mbps, the electronic device 1920 of the listener B transmits image data for the original image of 1080p and 10 Mbps to the server 1950, and the electronic device 1930 of the listener C transmits the image data for the original image of 1080p and 10 Mbps to the server 1950.

The server 1950 transmits, to the electronic device 1910 of the presenter A, image data and AI data for a first image of 540p and 5 Mbps to which an original image of 1080p and 10 Mbps of the electronic device of the listener B is AI downscaled, and transmits, to the electronic device 1910 of the presenter A, image data and AI data for a first image of 540p and 5 Mbps to which an original image of 1080p and 10 Mbps of the electronic device of the listener C is AI downscaled. The server 1950 transmits, to the electronic device 1920 of the listener B, image data for a third image of 1080p and 10 Mbps to which the server 1950 AI-upscales the first image of 540p and 5 Mbps of the participant A, who is a highly important presenter, and image data for a first image of 540p and 5 Mbps to which the server 1950 AI-downscales an original image of 1080p and 10 Mbps of the electronic device of the listener C, and the server 1950 transmits, to the electronic device 1930 of the listener C, image data for a third image of 1080p and 10 Mbps to which the server 1950 AI-upscales the first image of 540p and 5 Mbps of the participant A, who is a highly important presenter, and image data for a first image of 540p and 5 Mbps to which the server 1950 AI-downscales an original image of 1080p and 10 Mbps of the electronic device of the listener B.

Because images of the listeners B and C other than a presenter are of relatively low importance, the electronic device 1910 of the presenter A displays the received first image of 540p and 5 Mbps of the listener B and the received first image of 540p and 5 Mbps of the listener C without performing AI upscaling based on the importance information.

Because an image of the participant A, who is a presenter, is of high importance and the image of the listener C is of low importance, the electronic device 1920 of the listener B receives and displays image data of a third image of 1080p and 10 Mbps to which the server 1950 instead of the electronic device 1920 of the listener B AI-upscales the first image of 540p and 5 Mbps of the presenter A, and receives and displays the image data of the first image of 540p and 5 Mbps of the listener C.

Because an image of the participant A, who is a presenter, is of high importance and the image of the listener B is of low importance, the electronic device 1930 of the listener C receives and displays image data of a third image of 1080p and 10 Mbps to which the server 1950 instead of the electronic device 1930 of the listener C AI-upscales the first image of 540p and 5 Mbps of the presenter A, and receives and displays the image data of the first image of 540p and 5 Mbps of the listener B.

When the listener B is changed to a presenter and the presenter A is changed to a listener due to a change in importance, because the electronic device 1920 of the participant B who has changed to a presenter does not support AI upscaling, a 1080p original image of the presenter B is not AI downscaled by the server 1950 and image data of the 1080p original image of the presenter B is transmitted to the electronic device 1930 of the listener C without changes, and image data and AI data for a 540p first image to which the server 1950 AI downscales the 1080p original image are transmitted to the electronic device 1910 of the listener A. The electronic device 1930 of the listener C reconstructs the 1080p original image from the original image data and displays the reconstructed 1080p original image, and the electronic device 1910 of the listener A displays the 1080p third image restored by AI upscaling the AI downscaled first image based on the importance. A detailed example of this case will be described later with reference to FIG. 21.

Figure 20:
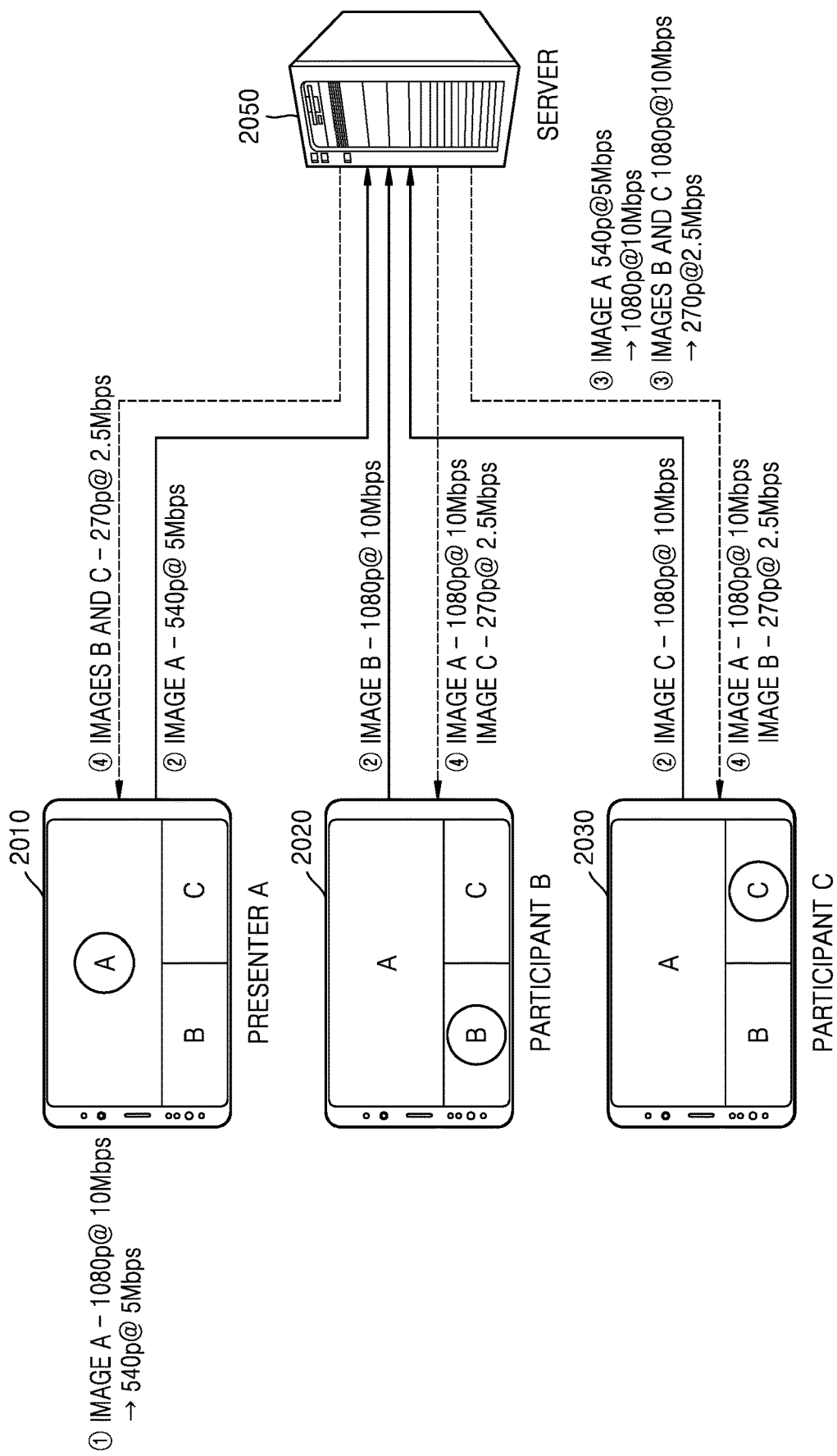
FIG. 20 is a view for explaining a data transmission relationship between an electronic device supporting AI downscaling and AI upscaling, an electronic device not supporting AI downscaling and AI upscaling, and a server supporting AI downscaling and AI upscaling, in a video conference according to another embodiment.

FIG. 20 is a view for explaining a data transmission relationship between an electronic device supporting AI downscaling and AI upscaling, an electronic device not supporting AI downscaling and AI upscaling, and a server supporting AI downscaling and AI upscaling, in a video conference according to another embodiment.

In FIG. 20, it is assumed that an electronic device 2020 of participant (listener) B and an electronic device 2030 of participant (listener) C do not support AI downscaling and AI upscaling and an electronic device 2010 of participant (presenter) A supports AI downscaling and AI upscaling.

Referring to FIG. 20, because only the electronic device 2010 of the participant (presenter) among three electronic devices in the video conference and a server 2050 managing the video conference support AI downscaling and the respective electronic devices 2020 and 2030 of the remaining participants (listeners) B and C do not transmit AI downscaling and AI upscaling, the electronic device 2020 of the listener B and the electronic device 2030 of the listener C transmit original images to the server 2050 without changes. However, the electronic device 2010 of the presenter A transmits an AI downscaled image to the server 2050, the server 2050 also obtains AI downscaled images by performing AI downscaling on the original images of the electronic device 2020 of the listener B and the electronic device 2030 of the listener C, and transmits the obtained AI downscaled images to the other participants, so that usage of uploading data of the electronic device of the participant A is reduced and usage of uploading data of the electronic devices of the other participants B and C is reduced. Because an image of the participant A, who is a presenter, is of high importance, it is AI downscaled by only ½. Because images of the remaining listeners B and C are of relatively low importance, they are AI downscaled by ¼. Thus, an image of relatively high importance has a relatively small degree of AI downscaling, so information loss is small and accordingly important information is better reconstructed, and an image of relatively low importance is relatively more AI downscaled, and thus data usage may be more reduced.

In detail, the electronic device 2010 of the presenter A transmits, to the server 2050, image data and AI data for a first image of 540p and 5 Mbps obtained by applying AI downscaling to an original image of 1080p and 10 Mbps, the electronic device 2020 of the listener B transmits image data for the original image of 1080p and 10 Mbps to the server 2050, and the electronic device 2030 of the listener C transmits the image data for the original image of 1080p and 10 Mbps to the server 2050. The server 2050 transmits, to the electronic device 2010 of the presenter A, image data and AI data for a first image of 270p and 2.5 Mbps to which an original image of 1080p and 10 Mbps of the listener B is AI downscaled, and transmits, to the electronic device 2010 of the presenter A, image data and AI data for a first image of 270p and 2.5 Mbps to which an original image of 1080p and 10 Mbps of the listener C is AI downscaled.

The server 2050 transmits, to the electronic device 2020 of the listener B, image data for a third image of 1080p and 10 Mbps to which the server 2050 AI-upscales the first image of 540p and 5 Mbps of the participant A, who is a highly important presenter, and image data for a first image of 270p and 2.5 Mbps of the listener C, and the server 2050 transmits, to the electronic device 2030 of the listener C, image data for a third image of 1080p and 10 Mbps to which the server 2050 AI-upscales the first image of 540p and 5 Mbps of the participant A, who is a highly important presenter, and image data for a first image of 270p and 2.5 Mbps of the listener B.

Because images of the listeners B and C other than the presenter A are of relatively low importance, the electronic device 2010 of the presenter A displays a received first image of 270p and 2.5 Mbps of the listener B and a received first image of 270p and 2.5 Mbps of the listener C without performing AI upscaling on the received first images based on importance information. Because an image of the participant A, who is a presenter, is of high importance and an image of the listener C is of low importance, the electronic device 2020 of the listener B not supporting AI upscaling receives and displays image data of a third image of 1080p and 10 Mbps to which the server 2050 instead of the electronic device 2020 of the listener B AI upscales a first image of 540p and 5 Mbps of the presenter A, and receives and displays image data of a first image of 270p and 2.5 Mbps of the listener C. Because the image of participant A, who is a presenter, is of high importance and the image of the listener B is of low importance, the electronic device 2030 of the listener C not supporting AI upscaling receives and displays image data of a third image of 1080p and 10 Mbps to which the server 2050 instead of the electronic device 2030 of the listener C AI upscales a first image of 540p and 5 Mbps of the presenter A, and receives and displays image data of a first image of 270p and 2.5 Mbps of the listener B.

As another example, even when the electronic devices of all participants support AI downscaling and AI upscaling as shown in FIG. 18, the degree of AI downscaling may vary according to importance. In other words, an image of a presenter with high importance is AI downscaled by only ½, and an image of a listener with low importance is AI downscaled by ¼. The image of the presenter with high importance may be reconstructed as an original image, and the image of the listener with low importance may be reconstructed as an image with a resolution of ½ that is twice the resolution of an AI downscaled image.

Figure 21:
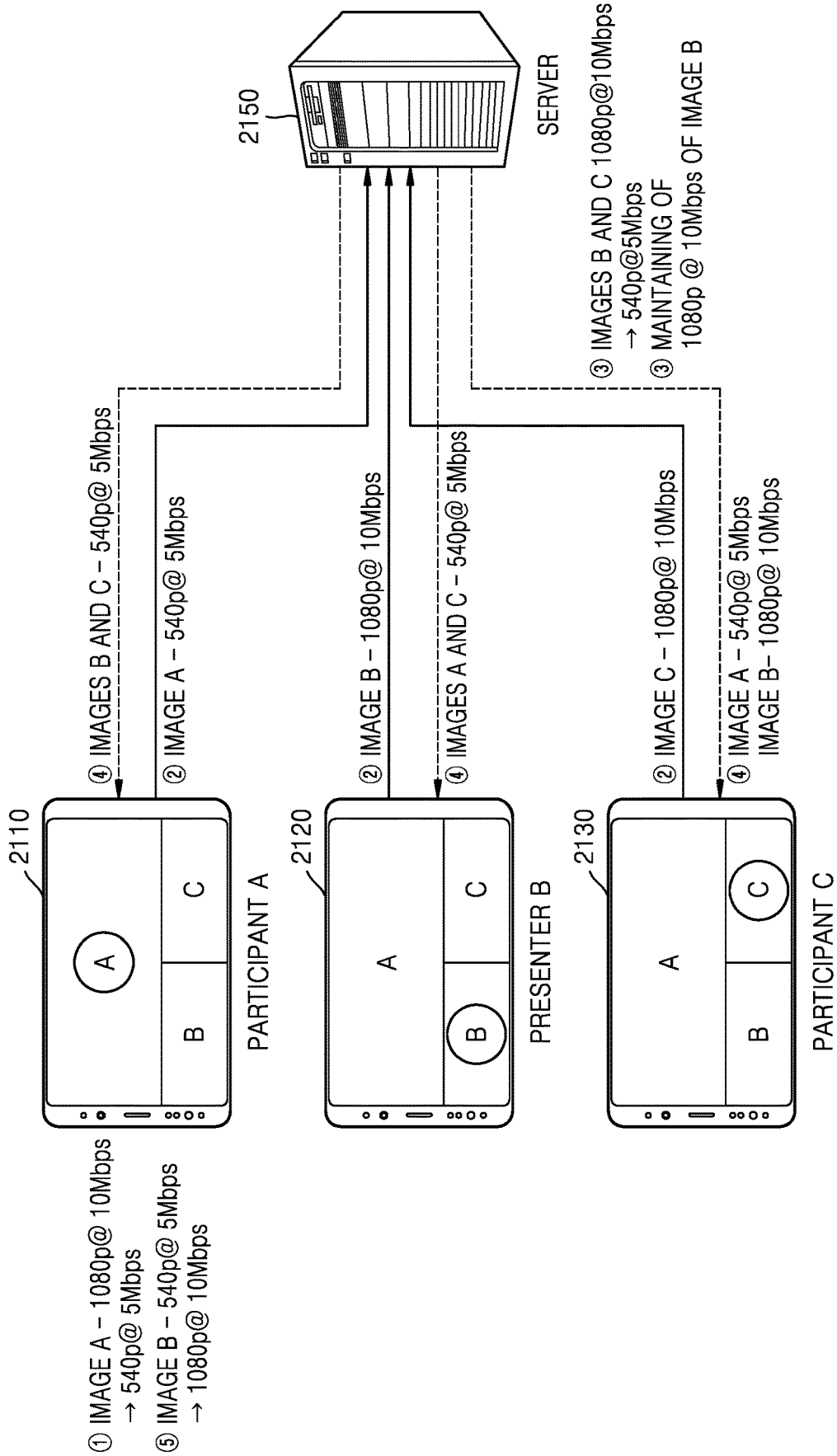
FIG. 21 is a view for explaining a data transmission relationship between an electronic device supporting AI downscaling and AI upscaling, an electronic device not supporting AI downscaling and AI upscaling, and a server supporting AI downscaling and AI upscaling, in a video conference according to another embodiment.

FIG. 21 is a view for explaining a data transmission relationship between an electronic device supporting AI downscaling and AI upscaling, an electronic device not supporting AI downscaling and AI upscaling, and a server supporting AI downscaling and AI upscaling, in a video conference according to another embodiment.

In FIG. 21, it is assumed that an electronic device 2120 of participant (presenter) B and an electronic device 2130 of participant (listener) C do not support AI downscaling and AI upscaling and an electronic device 2110 of participant (listener) A supports AI downscaling and AI upscaling.

Referring to FIG. 21, because only the electronic device 2110 of the participant (listener) A among three electronic devices in the video conference and a server 2150 managing the video conference support AI downscaling and the respective electronic devices 2120 and 2130 of the remaining participants (listeners) B and C do not transmit AI downscaling and AI upscaling, the electronic device 2020 of the listener B and the electronic device 2130 of the listener C transmit original images to the server 2150 without changes. However, the electronic device 2110 of the listener A transmits an AI downscaled image to the server 2150, the server 2150 also obtains AI downscaled images by performing AI downscaling on the original images of the electronic device 2120 of the listener B and the electronic device 2130 of the listener C, and transmits the obtained AI downscaled images to the other participants, so that usage of uploading data of the electronic device of the participant A is reduced and usage of uploading data of the electronic devices of the other participants B and C is reduced.

Because the electronic device 2110 of the listener A supports AI downscaling, a video conference image of the listener A is AI downscaled by the electronic device 2110 of the listener A, and an AI downscaled image is transmitted to the server 2150. Because the electronic device 2120 of the presenter B and the electronic device 2130 of the listener C do not support AI downscaling, an original image of the presenter B and an original image of the listener C are transmitted to the server 2150.

The server 2150 transmits an AI downscaled image received from the electronic device 2110 of the listener A to the electronic device 2120 of the presenter B and the electronic device 2130 of the listener C. The server 2150 transmit, to the electronic device 2110 of the presenter A and the electronic device 2120 of the listener B, a first image to which the server 2150 AI downscales the original image received from the electronic device 2130 of the listener C. Because the participant B is a presenter and thus is highly important, the server 2150 transmits, to the electronic device 2110 of the listener A supporting AI upscaling, an image to which the server 2150 AI downscales the original image received from the electronic device 2120 of the presenter B, and the server 2150 transmits the original image received from the electronic device 2120 of the presenter B to the electronic device 1730 of the listener C, which does not support AI upscaling, without changes.

In detail, the electronic device 2110 of the listener A transmits, to the server 2150, image data and AI data for a first image of 540p and 5 Mbps obtained by applying AI downscaling to an original image of 1080p and 10 Mbps, the electronic device 2120 of the representer B transmits image data for the original image of 1080p and 10 Mbps to the server 2150, and the electronic device 2130 of the presenter C transmits the image data for the original image of 1080p and 10 Mbps to the server 2150.

The server 2150 transmits, to the electronic device 2110 of the listener A, image data and AI data of a first image of 540p and 5 Mbps to which an original image of 1080p and 10 Mbps of the listener B is AI downscaled, and transmits, to the electronic device 2110 of the listener A, image data and AI data of a first image of 540p and 5 Mbps to which an original image of 1080p and 10 Mbps of the listener C is AI downscaled.

The server 2150 transmits, to the electronic device 2120 of the presenter B, image data of a first image of 540p and 5 Mbps of the listener A and image data of a first image of 540p and 5 Mbps of the listener C, and the server 2150 transmits the image data of the first image of 540p and 5 Mbps of the listener A and the image data of the original image of 1080p and 10 Mbps of the participant B, who is a highly important presenter, without performing AI downscaling the image data of the original image to the electronic device 1730 of the listener C.

Because the electronic device 2110 of the listener A supports AI upscaling, a third image of 1080p and 10 Mbps of the presenter B to which the first image of 540p and 5 Mbps of the presenter B transmitted as a result of AI downscaling by the server 2150 is AI upscaled based on the importance information is displayed, and the first image of 540p and 5 Mbps of the listener C transmitted as a result of AI downscaling by the server 2150 does not undergo AI upscaling based on the importance information and is displayed as it is.

Because the electronic device 2120 of the presenter B does not support AI upscaling, the first image of 540p and 5 Mbps of the listener A transmitted as a result of AI downscaling by the electronic device 2110 of the listener A, and the first image of 540p and 5 Mbps of the listener C transmitted as a result of AI downscaling by the server 2150 are displayed.

Because the electronic device 2130 of the listener C does not support AI upscaling, the first image of 540p and 5 Mbps of the participant A transmitted as a result of AI downscaling by the electronic device 2110 of the listener A, and the original image of 1080p and 10 Mbps of the presenter B are displayed.

Examples of the above-described electronic device may include various types of devices capable of reproducing an image, such as a smartphone, a tablet PC, a wearable device, a notebook computer, and a desktop PC.

Figure 22:
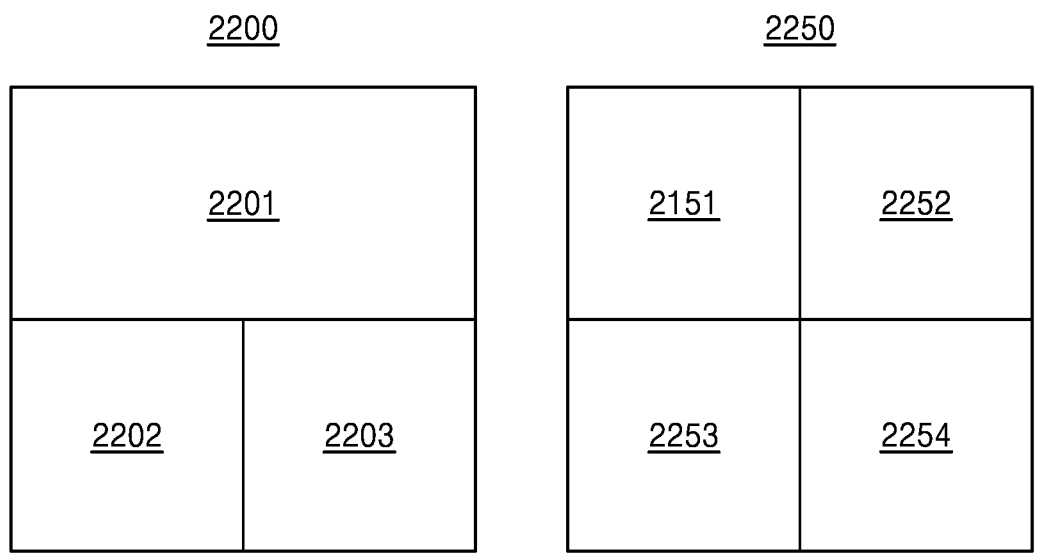
FIG. 22 is a view for explaining a layout of a video conference image displayed on an electronic device participating in a video conference, and the importance of the video conference image.

FIG. 22 is a view for explaining the layout of a video conference image displayed on an electronic device participating in a video conference, and the importance of the video conference image.

Referring to FIG. 22, according to an embodiment, when there are three electronic devices participating in a video conference and the type of video conference is presentation, a presenter in the video conference is determined to have high importance, an electronic device 2200 of a video conference participant displays an image of the presenter in a largest area 2201, and displays images of remaining listeners in remaining areas 2202 and 2203.

According to another embodiment, when there are four electronic devices participating in a video conference and the type of video conference is discussion, the importance of the electronic devices participating in the video conference are determined to be equally all presenters, and thus video conference images in the electronic device 2250 participating in the video conference are displayed in equal areas 2251, 2252, 2253, and 2254.

According to another embodiment, when there are four electronic devices participating in the video conference and the type of video conference is presentation, a presenter is determined to have high importance in the video conference, and the electronic device 2250 participating in the video conference displays a video conference image in the equal areas 2251, 2252, 2253, and 2254 while the video conference video of the presenter has a higher quality than the video conference images of the other listeners.

Figure 23:
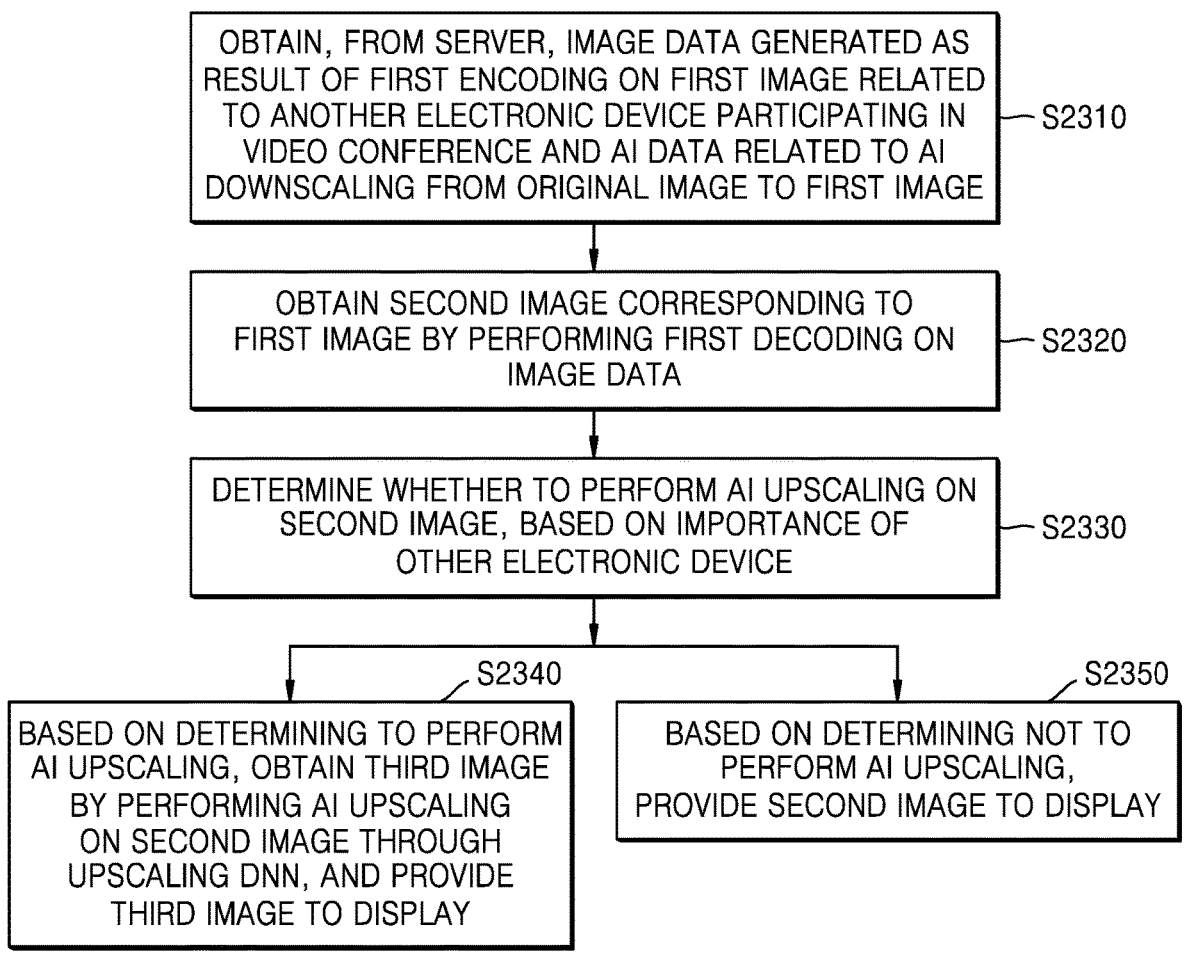
FIG. 23 is a flowchart of a method, performed by an electronic device participating in a video conference, of AI upscaling, during the video conference, a video conference image according to the importance of another electronic device participating in the video conference, according to an embodiment.

FIG. 23 is a flowchart of a method, performed by an electronic device participating in a video conference, of AI upscaling a video conference image according to the importance of another electronic device participating in the video conference, during the video conference, according to an embodiment.

In operation S2310, image data generated as a result of first encoding on a first image related to the other electronic device participating in the video conference, and AI data related to AI downscaling from an original image to the first image are obtained from a server.

According to an embodiment, the first image may be either an image to which the original image is AI downscaled by the server or an image to which the original image is AI downscaled by the other electronic device.

In operation S2320, the image data undergoes first decoding to obtain a second image corresponding to the first image.

In operation S2330, it is determined whether to perform AI upscaling on the second image, based on the importance of the other electronic device.

According to an embodiment, the importance may be checked from the AI data.

According to an embodiment, when it is determined that the user of the electronic device of different importance is the presenter, it is determined to perform AI upscaling, and when the user of the electronic device of different importance indicates that the user is the listener, it may be determined not to perform the AI upscaling.

According to an embodiment, when the importance indicates a presenter, AI upscaling may be determined to be performed, and, when the importance is changed as a listener during the video conference, AI upscaling may be determined to be not performed.

In operation S2340, when it is determined to perform AI upscaling, the second image is AI upscaled through an upscaling DNN to obtain a third image, and the third image is provided to a display.

In operation S2350, when it is determined not to perform AI upscaling, the second image is provided to the display.

According to an embodiment, the importance of a user of an electronic device who initially establishes the video conference may be initially set as a presenter.

According to an embodiment, the importance may be set as a presenter when the importance is high, and may be set as a listener when the importance is low.

According to an embodiment, the importance may be changed according to an input received by an electronic device participating in a video conference or another electronic device participating in a video conference.

According to an embodiment, an input received by the other electronic device may be either an input for activating a raising hand function of the other electronic device or an input for requesting a presentation permission from the other electronic device, and an input received by the electronic device may be an input for magnifying a video conference image for the other electronic device.

According to an embodiment, the input received by the electronic device or the other electronic device may be an input of changing the type of video conference.

According to an embodiment, the importance may be determined according to at least one of the number of video conference participants or the type of video conference.

According to an embodiment, the type of video conference may be either presentation or discussion.

According to an embodiment, the original image may have a size of 1080p, and the first image may have a size of 540p.

According to an embodiment, the original image may have a size of 1080p, and the first image may have a size of 270p.

According to an embodiment, when the original image has a size of 1080p and the importance indicates that the user of the electronic device is a presenter, the first image may have a size of 540p, and, when the importance indicates that the user of the electronic device is a listener, the first image may have a size of 270p.

According to an embodiment, the DNN setting information of the downscaling DNN may be obtained through joint training between the downscaling DNN and an upscaling DNN for performing AI upscaling on the first image.

According to an embodiment, DNN setting information for performing AI upscaling on a second image is obtained based on AI data from among a plurality of pieces of DNN setting information, and the upscaling DNN may operate with the obtained DNN setting information.

According to an embodiment, one piece of DNN setting information for performing AI upscaling on a second image stored in an electronic device may be obtained based on the AI data, and the upscaling DNN may operate with the obtained DNN setting information.

Figure 24:
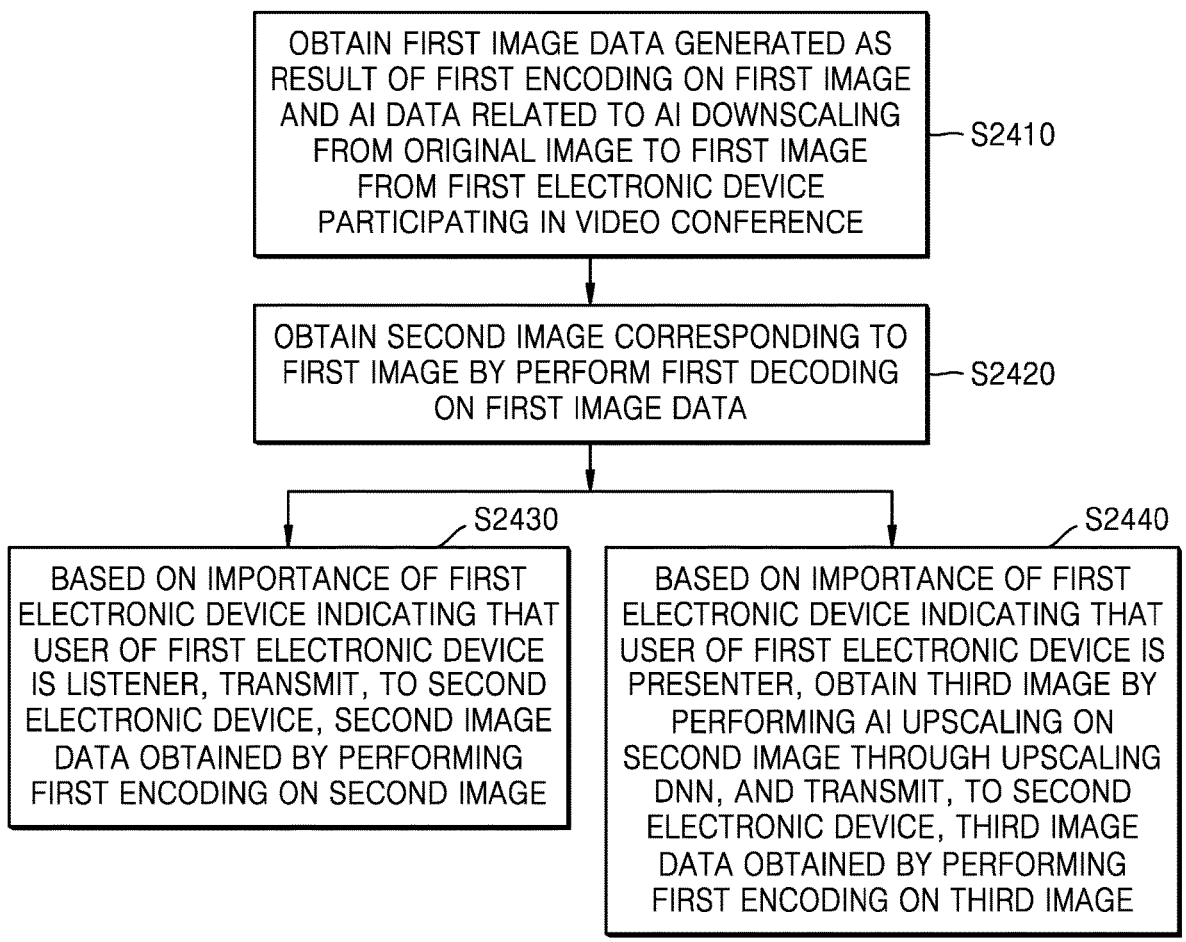
FIG. 24 is a flowchart of a method, performed by a server managing a video conference, of obtaining an AI downscaled image from an electronic device participating in the video conference, determining whether AI upscaling is supported, according to importance information of the electronic device, performing AI upscaling on a video conference image, and transmitting a result of the AI upscaling to another electronic device.

FIG. 24 is a flowchart of a method, performed by a server managing a video conference, of obtaining an AI downscaled image from an electronic device participating in the video conference, determining whether AI upscaling is supported, according to importance information of the electronic device, performing AI upscaling on a video conference image, and transmitting a result of the AI upscaling to another electronic device.

In operation S2410, the server 1500 obtains first image data generated as a result of first encoding on a first image and AI data related to AI downscaling from an original image to the first image from a first electronic device participating in the video conference. Because the first electronic device transmits the AI data related to the AI downscaling, it may be seen that the first electronic device is an electronic device that supports AI downscaling.

In operation S2420, the server 1500 performs first decoding on the first image data to obtain a second image corresponding to the first image.

In operation S2430, when the importance indicates that a user of the first electronic device is a listener, the server 1500 transmits, to a second electronic device, second image data obtained by performing first encoding on the second image.

In operation S2440, when the importance indicates that the user of the first electronic device is a presenter, the server 1500 obtains a third image by performing AI upscaling on the second image through an upscaling DNN, and transmits, to the second electronic device, third image data obtained by performing first encoding on the third image. Because the server 1500 performs AI upscaling by determining whether to perform AI upscaling instead, the second electronic device is an electronic device that does not support AI upscaling.

According to an embodiment, the importance of the first electronic device may be checked from the AI data.

According to an embodiment, the importance of a user of an electronic device who establishes the video conference may be initially set as a presenter.

According to an embodiment, the importance may be changed according to an input received by the first or second electronic device participating in a video conference.

According to an embodiment, an input received by the second electronic device may be either an input for activating a raising hand function of the second electronic device or an input for requesting a presentation permission from the second electronic device, and an input received by the first electronic device may be an input for magnifying a video conference image for the second electronic device.

According to an embodiment, the input received by the first electronic device or the second electronic device may be an operation of changing the type of video conference.

According to an embodiment, the importance may be determined according to at least one of the number of video conference participants or the type of video conference.

According to an embodiment, the type of video conference may be either presentation or discussion.

According to an embodiment, the original image may have a size of 1080p, and the first image may have a size of 540p.

According to an embodiment, the original image may have a size of 1080p, and the first image may have a size of 270p.

According to an embodiment, when the original image has a size of 1080p and the importance indicates that the user of the first electronic device is a presenter, the first image may have a size of 540p, and, when the importance indicates that the user of the electronic device is a listener, the first image may have a size of 270p.

According to an embodiment, the first electronic device may support AI downscaling, and the second electronic device may not support AI upscaling.

According to an embodiment, the server 1600 may obtain fourth image data by performing first encoding on the original image from a third electronic device. The server 1600 may obtain the original image by performing first decoding on the fourth image data. When the importance of the third electronic device indicates a listener, the server 1600 may obtain a first image by performing AI downscaling on the original image by using a downscaling DNN, and may transmit to the second electronic device fifth image data obtained by performing first encoding on the first image. When the importance of the third electronic device indicates a presenter, the server 1600 may transmit, to the second electronic device, the fourth image data or image data obtained by newly performing first encoding on the original image. In this case, the third electronic device does not support AI downscaling, and the second electronic device does not support AI upscaling.

According to another embodiment, when the second electronic device supports AI upscaling, the server 1600 may obtain the first image by performing AI downscaling on the original image using the downscaling DNN, and may transmit, to the second electronic device, the fifth image data obtained by performing first encoding on the first image and AI data related to the AI downscaling.

According to an embodiment, the DNN setting information of the downscaling DNN may be obtained through joint training between the downscaling DNN and an upscaling DNN for performing AI upscaling on the first image.

According to an embodiment, DNN setting information for performing AI upscaling on a second image is obtained based on AI data from among a plurality of pieces of DNN setting information, and the upscaling DNN may operate with the obtained DNN setting information.

According to an embodiment, one piece of DNN setting information for performing AI upscaling on a second image stored in a server may be obtained based on the AI data, and the upscaling DNN may operate with the obtained DNN setting information.

According to an embodiment, whether the second electronic device supports AI upscaling may be determined according to presence or absence of the AI data obtained from the second electronic device.

According to an embodiment, whether the second electronic device supports AI upscaling may be determined according to AI downscaling support information obtained from the second electronic device.

The above-described embodiments of the disclosure can be written as computer-executable programs or instructions, and the written computer-executable programs or instructions can be stored in a medium.

The medium may continuously store the computer-executable programs or instructions, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a ROM, a random-access memory (RAM), and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 200 or AI encoding apparatus 600 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software. For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An electronic device configured to be in a video conference by using artificial intelligence (AI), the electronic device comprising:
   a display; and
   a processor configured to execute one or more instructions stored in the electronic device,
   wherein the processor is configured to execute the one or more instructions to:
      obtain, from a server, first image data generated as a result of first encoding a first image related to a first electronic device in the video conference, and first AI data related to AI downscaling from a first original image to the first image;
      obtain, from the server, second image data generated as a result of the first encoding a second image related to a second electronic device in the video conference, and second AI data related to AI downscaling from a second original image to the second image;
      obtain a third image corresponding to the first image by performing first decoding on the first image data, and fourth image corresponding to the second image by performing the first decoding on the second image data;
      based on an importance of the first electronic device indicating that a user of the first electronic device is a presenter, obtain a fifth image by performing AI upscaling on the third image through an upscaling deep neural network (DNN), and provide the fifth image to the display; and based on an importance of the second electronic device indicating that a user of the second electronic device is a listener, obtain a sixth image by performing AI downscaling on the fourth image through an downscaling deep neural network (DNN), and provide the sixth image to the display.

2. The electronic device of claim 1, wherein the importance of the first electronic device is checked from the first AI data, and the importance of the second electronic device is checked from the second AI data.

3. The electronic device of claim 1, wherein the first image is an image to which the server AI-downscales the first original image or an image to which the first electronic device AI-downscales the first original image.

4. The electronic device of claim 1, wherein
   based on the importance of the first electronic device being changed, during the video conference, to indicate that the user of the first electronic device is the listener, it is determined that the AI upscaling is not performed.

5. The electronic device of claim 1, wherein importance of the electronic device that establishes the video conference is initially set as the presenter.

6. A video conference image processing method performed by an electronic device in a video conference by using artificial intelligence (AI), the video conference image processing method comprising:
- obtaining, from a server, first image data generated as a result of first encoding a first image related to a first electronic device in the video conference, and first AI data related to AI downscaling from a first original image to the first image;
- obtaining, from the server, second image data generated as a result of the first encoding a second image related to a second electronic device in the video conference, and second AI data related to AI downscaling from a second original image to the second image;
- obtaining a third image corresponding to the first image by performing first decoding on the first image data, and fourth image corresponding to the second image by performing the first decoding on the second image data;
- based on an importance of the first electronic device indicating that a user of the first electronic device is a presenter, obtaining a fifth image by performing AI upscaling on the third image through an upscaling deep neural network (DNN), and provide the fifth image to a display; and
- based on an importance of the second electronic device indicating that a user of the second electronic device is a listener, obtaining a sixth image by performing AI downscaling on the fourth image through an downscaling deep neural network (DNN), and provide the sixth image to the display.

7. A server managing a video conference by using artificial intelligence (AI), the server comprising a processor configured to execute one or more instructions stored in the server,
wherein the processor is configured to execute the one or more instructions to:
- obtain, from a first electronic device in the video conference, first image data generated as a result of first encoding a first image, and first AI data related to the AI downscaling from a first original image to the first image;
- obtain, from a second electronic device in the video conference, second image data generated as a result of the first encoding a second image, and second AI data related to AI downscaling from a second original image to the second image
- obtain a third image corresponding to the first image by performing first decoding on the first image data, and fourth image corresponding to the second image by performing the first decoding on the second image data;
- based on an importance of the first electronic device indicating that a user of the first electronic device is a presenter, obtain a fifth image by performing AI upscaling on the third image through an upscaling deep neural network (DNN), and transmit the fifth image to a third electronic device; and
- based on an importance of the second electronic device indicating that a user of the second electronic device is a listener, obtain a sixth image by performing AI downscaling on the fourth image through a downscaling deep neural network (DNN), and transmit the sixth image to the third electronic device.

8. The server of claim 7, wherein the importance of the first electronic device is checked from the first AI data related to the AI downscaling.

9. The server of claim 7, wherein the first electronic device is configured to support AI downscaling.

10. The server of claim 7, wherein the second electronic device is configured not to support AI upscaling.

11. The server of claim 7, wherein the processor is further configured to execute the one or more instructions to:
- obtain third image data by performing first encoding on a third original image from a fourth electronic device;
- obtain the third original image by performing first decoding on the third image data;
- based on importance of the fourth electronic device indicating that a user of the fourth electronic device is the listener, obtain the first image by performing AI downscaling on the first original image by using the downscaling DNN, and transmit fourth image data obtained by performing first encoding on the first image to the third electronic device; and
- based on the importance of the fourth electronic device indicating that the user of the first electronic device is the presenter, transmit the third image data to the third electronic device.

12. The server of claim 11, wherein the fourth electronic device is configured not to support AI downscaling.

13. The server of claim 11, wherein, based on the third electronic device being configured to support AI upscaling, the processor is further configured to obtain the first image by performing AI downscaling on the first original image by using the downscaling DNN, and transmit, to the third electronic device, the third image data obtained by performing first encoding on the first image and the first AI data related to the AI downscaling.

* * * * *